(12) United States Patent
Aoki

(10) Patent No.: US 10,288,855 B2
(45) Date of Patent: May 14, 2019

(54) ATTACHMENT OPTICAL SYSTEM, IMAGE CAPTURING OPTICAL SYSTEM, AND IMAGE CAPTURING APPARATUS

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/634,311

(22) Filed: Jun. 27, 2017

(65) Prior Publication Data

US 2018/0003929 A1   Jan. 4, 2018

(30) Foreign Application Priority Data

Jun. 29, 2016 (JP) .................................. 2016-128332
Jun. 2, 2017  (JP) .................................. 2017-109596

(51) Int. Cl.

| G02B 13/00 | (2006.01) |
| G02B 13/20 | (2006.01) |
| G02B 27/00 | (2006.01) |
| G03B 17/14 | (2006.01) |
| G02B 7/02  | (2006.01) |
| H04N 5/225 | (2006.01) |
| G02B 15/20 | (2006.01) |
| G03B 17/56 | (2006.01) |

(52) U.S. Cl.
CPC ............ *G02B 13/20* (2013.01); *G02B 7/023* (2013.01); *G02B 13/0055* (2013.01); *G02B 13/0075* (2013.01); *G02B 27/0068* (2013.01); *G03B 17/14* (2013.01); *H04N 5/2253* (2013.01); *H04N 5/2254* (2013.01); *G02B 15/20* (2013.01); *G03B 17/565* (2013.01)

(58) Field of Classification Search
CPC ................ G02B 13/20; G02B 13/0055; G02B 13/0075; G02B 5/021; G02B 5/0263; G02B 27/0068; G02B 13/003; G02B 5/02; G03B 17/14; G03B 17/565
USPC ................................................... 359/672–675
See application file for complete search history.

(56) References Cited

U.S. PATENT DOCUMENTS

| 6,501,909 B1 * | 12/2002 | Nishimura ............... G02B 7/10 396/74 |
| 8,233,222 B2 * | 7/2012  | Lee ........................ G02B 15/14 359/672 |

(Continued)

FOREIGN PATENT DOCUMENTS

JP   H08-248310 A   9/1996

*Primary Examiner* — Jordan M Schwartz
(74) *Attorney, Agent, or Firm* — Carter, DeLuca & Farrell LLP

(57) ABSTRACT

An attachment optical system detachably attached to an image capturing optical system, includes a first lens provided with a first aspherical surface including a plurality of concave portions and convex portions that are formed in a rotation direction with respect to an optical system, and a second lens provided with a second aspherical surface including a plurality of concave portions and convex portions that are formed in a rotation direction with respect to the optical axis, and a distance between the first aspherical surface and the second aspherical surface in an optical axis direction changes by relatively rotating the first lens and the second lens around the optical axis.

26 Claims, 45 Drawing Sheets

(56) References Cited

U.S. PATENT DOCUMENTS

| | | | | |
|---|---|---|---|---|
| 8,675,285 B2* | 3/2014 | Obrebski | ............... | G02B 15/04 |
| | | | | 359/672 |
| 2017/0102515 A1* | 4/2017 | Du | ........................ | G02B 7/16 |
| 2018/0196256 A1* | 7/2018 | Walter | ................. | G02B 26/06 |

* cited by examiner

ATTACHMENT OPTICAL SYSTEM, IMAGE CAPTURING OPTICAL SYSTEM, AND IMAGE CAPTURING APPARATUS

BACKGROUND OF THE INVENTION

Field of the Invention

The present invention relates to an image capturing optical system capable of controlling imaging performance.

Description of the Related Art

In recent years, especially in photographing using a digital camera or a video camera, needs for expressions such as an effect of intentionally blurring the background of an object, thereby enhancing the object to be photographed, and a so-called soft focus effect where the entire screen is softly blurring are increasing.

Japanese Patent Laid-open No. 8-248310 discloses an aberration variable lens that achieves a so-called soft focus effect by changing an amount of a spherical aberration generated by changing an air space of a predetermined lens unit in an optical system. According to the configuration of Japanese Patent Laid-Open No. 8-248310, it is possible to obtain an effect of blurring the entire screen. However, in the configuration of Japanese Patent Laid-open No. 8-248310, it is not possible to perform continuous control from a resolution state to a blurred state with respect to the background while maintaining the resolution state of the object. Furthermore, it is not possible to obtain a sufficient soft focus effect.

BRIEF SUMMARY OF THE INVENTION

The present invention provides an attachment optical system, an image capturing optical system, and an image capturing apparatus that can perform continuous control from a resolution state to a blurred state with respect to a background while maintaining the resolution state of an object with a compact and simple configuration.

An attachment optical system as one aspect of the present invention is detachably attached to an image capturing optical system, includes a first lens provided with a first aspherical surface including a plurality of concave portions and convex portions that are formed in a rotation direction with respect to an optical system, and a second lens provided with a second aspherical surface including a plurality of concave portions and convex portions that are formed in a rotation direction with respect to the optical axis, and a distance between the first aspherical surface and the second aspherical surface in an optical axis direction changes by relatively rotating the first lens and the second lens around the optical axis.

An image capturing optical system as another aspect of the present invention includes a first lens provided with a first aspherical surface including a plurality of concave portions and convex portions that are formed in a rotation direction with respect to an optical system, and a second lens provided with a second aspherical surface including a plurality of concave portions and convex portions that are formed in a rotation direction with respect to the optical axis, and a distance between the first aspherical surface and the second aspherical surface in an optical axis direction changes by relatively rotating the first lens and the second lens around the optical axis.

An image capturing apparatus as another aspect of the present invention includes the image capturing optical system and an image pickup device configured to receive an optical image formed via the image capturing optical system.

Further feature of the present invention will become apparent from the following description of exemplary embodiments with reference to the attached drawings.

DESCRIPTION OF THE EMBODIMENTS

Figure 1:
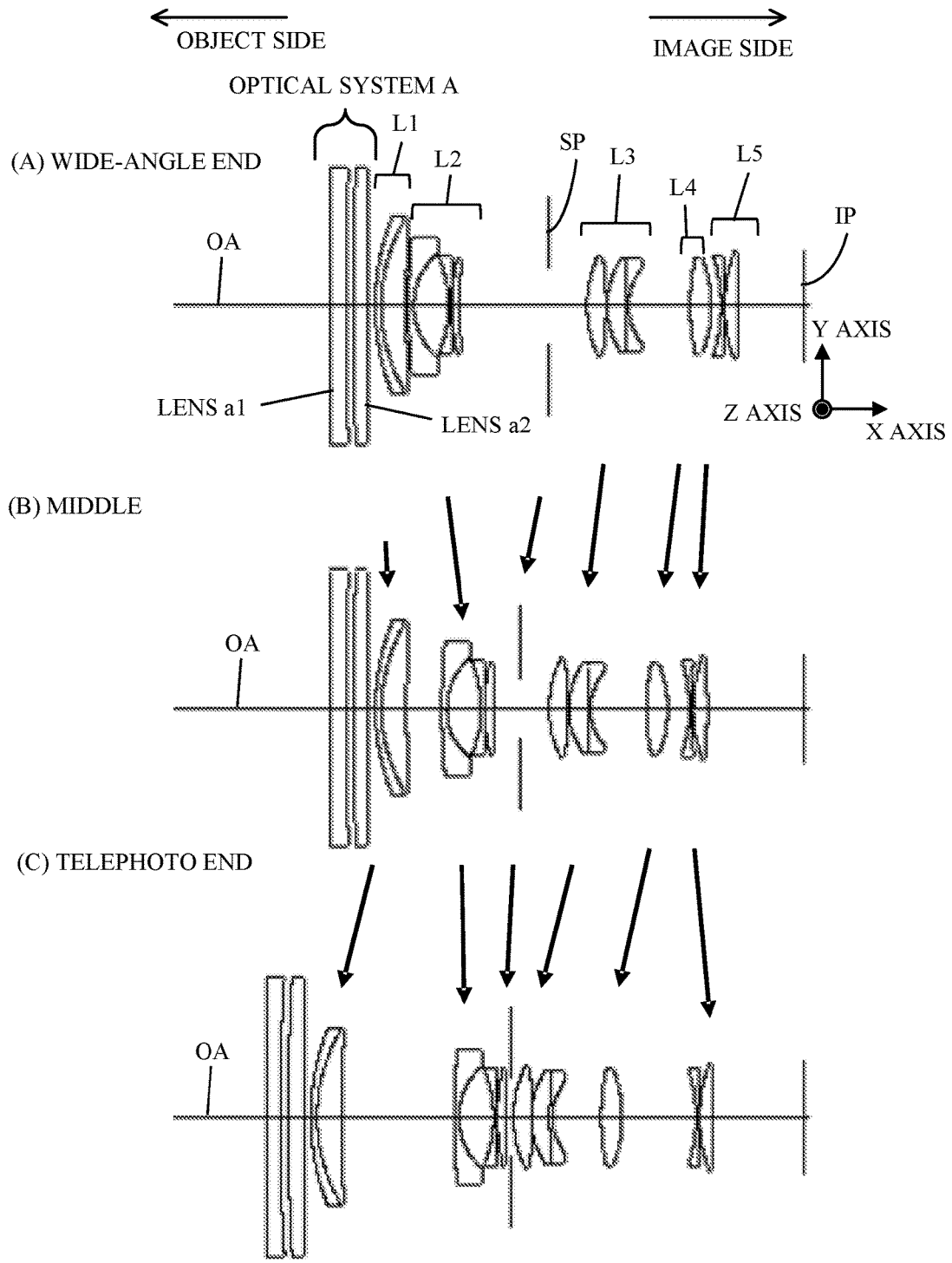
FIG. 1 is a cross-sectional view of lenses of an image capturing optical system in Embodiment 1.

Exemplary embodiments of the present invention will be described below with reference to the accompanied drawings.

An image capturing optical system (or attachment optical system detachably attached to the image capturing optical system) of the present embodiment has a first lens and a second lens. The first lens has a first aspherical surface including a plurality of concave portions and convex portions formed in a rotation direction with respect to an optical axis. The second lens has a second aspherical surface including a plurality of concave portions and convex portions formed in the rotation direction with respect to the optical axis. An optical system A is constituted by at least the first lens and the second lens. By relatively rotating the first lens and the second lens around the optical axis, a distance in an optical axis direction between the first aspherical surface and the second aspherical surface changes. In other words, by relatively rotating the first lens and the second lens around the optical axis, the field curvature of the image capturing optical system changes. With such a configuration, it is possible to change an optical path length of the light beam passing through the inside of the optical system A. Further, it is possible to achieve a reference state where satisfactory imaging performance is maintained over the entire screen. In addition, it is possible to continuously change the imaging performance from a satisfactory state to a state sufficiently blurred depending on a relative rotation amount between the first lens and the second lens.

Preferably, in this embodiment, by relatively rotating the first lens and the second lens around the optical axis, a distance in the optical axis direction in a first region does not change, and a distance in the optical axis in a second region different from the first region changes. More preferably, the first region is a region including the optical axis (i.e., region around the center), and the second region is a region (i.e., peripheral region) that is farther from the optical axis than the first region. Preferably, each of the first aspherical surface and the second aspherical surface has a planer shape or a spherical shape in the first region. With such a configuration, it is possible to suppress paraxial change in focal length and astigmatism at the screen center portion, which are generated when the optical lens (the first lens or the second lens) is rotated.

Preferably, the center portions of the first aspherical surface and the second aspherical surface are perpendicular to the optical axis (i.e., a normal direction of the center portion is parallel to the optical axis direction). With such a configuration, it is possible to suppress a shift of the center image point occurring when the optical lens is rotated.

Preferably, the first aspherical surface and the second aspherical surface have the same shape in a predetermined phase (reference state) obtained by rotating around the optical axis. With such a configuration, it is possible to make the optical path lengths of the light beams passing through the inside of the optical system A substantially the same, and it is possible to achieve the reference state where satisfactory imaging performance is maintained over the entire screen. In addition, when the aspherical surface is formed by molding, the manufacturing cost can be reduced by making the shapes of the first aspherical surface and the second aspherical surface the same.

Preferably, the first lens and the second lens can integrally move in a direction substantially perpendicular to the optical axis. With such a configuration, it is possible to move a good resolution region inside the screen to an arbitrary position from the center part of the screen.

Preferably, the image capturing optical system of this embodiment includes a focus unit (focus lens unit) that moves in the optical axis direction when focusing (for taking an object of a finite distance from infinity). With such a configuration, it is possible to perform photography that can be adapted to an object distance desired to be photographed from the infinity to the finite distance.

Preferably, in the first aspherical surface and the second aspherical surface, convex portions (hill portions) and concave portions (valley portions) are repeatedly arranged at a predetermined cycle along the rotation direction. Preferably, a combination of the convex portion and the concave portion as one unit, the number K1 of the units including the combination of the convex portion and the concave portion included in the first aspherical surface satisfies conditional expression (1X) below. Further, the number K2 of the units including the combination of the convex portion and the concave portion included in the second aspherical surface satisfies conditional expression (1Y) below.

$$3 \leq K1 \leq 10 \tag{1X}$$

$$3 \leq K2 \leq 10 \tag{1Y}$$

When the upper limit of conditional expression (1X) or conditional expression (1Y) is exceeded, the shape of the aspherical surface becomes too complicated, and it is not preferable because it is difficult to control the imaging performance or it is difficult to manufacture the aspherical surface. On the other hand, when the lower limit of conditional expression (1X) or conditional expression (1Y) is exceeded, symmetry in the rotation direction of the blurring direction of the peripheral portion of the screen when at least one lens is rotated is reduced, resulting in an unnatural image which is not preferable.

Preferably, conditional expression (2X) below is satisfied, where ΔH1 is a maximum value of sag (sag amount) in the first aspherical surface, and DA is a distance on the optical axis between the object side lens surface of the first lens and the image side lens surface of the second lens. Further, conditional expression (2Y) below is satisfied, where ΔH2 is a maximum value of sag (sag amount) in the second aspherical surface. The sag corresponds to a distance between a perpendicular line standing from the vertex of the lens surface with respect to the optical axis and the lens surface and it is a parameter that varies depending on a distance from the optical axis.

$$0.005 < |\Delta H1/DA| < 0.500 \tag{2X}$$

$$0.005 < |\Delta H2/DA| < 0.500 \tag{2Y}$$

When the upper limit of conditional expression (2X) or conditional expression (2Y) is exceeded, an aspherical amount of the aspherical surface becomes too large, and in the reference state where at least one lens is not rotated, and it is difficult to achieve satisfactory imaging performance in the entire screen, which is not preferable. On the other hand, when the lower limit of conditional expression (2X) or conditional expression (2Y) is exceeded, the aspherical amount of the aspherical surface becomes too small, and a change amount of imaging performance when at least one lens is rotated with respect to the reference state becomes too small and it is difficult to obtain a sufficient blur amount, which is not preferable.

Preferably, conditional expression (3X) below is satisfied, where ΔK1 is a maximum value of a difference of heights of the convex portion and the concave portion at the same diameter position of the first aspherical surface. Preferably, conditional expression (3Y) below is satisfied, where ΔK2 is a maximum value of a difference of heights of the convex portion and the concave portion at the same diameter position of the second aspherical surface.

$$0.010 < |\Delta K1/DA| < 1.000 \tag{3X}$$

$$0.010 < |\Delta K2/DA| < 1.000 \tag{3Y}$$

When the upper limit of conditional expression (3X) or conditional expression (3Y) is exceeded, an amount of the shape difference at the same diameter position of the aspherical surface is too large, it is difficult to achieve good imaging performance on the entire screen in the reference state where at least one lens is not rotated or it is difficult to manufacture, which is not preferable. On the other hand, when the lower limit of conditional expression (3X) or conditional expression (3Y) is exceeded, an amount of the shape difference at the same diameter position of the aspherical surface is too small, and accordingly a change amount of the imaging performance when at least one lens is rotated with respect to the reference state is too small and thus it is difficult to obtain a sufficient blur amount, which is not preferable.

Preferably, conditional expression (4) below is satisfied, where D is a distance on the optical axis between the first aspherical surface and the second aspherical surface.

$$0.020 < |D/DA| < 1.000 \tag{4}$$

When the upper limit of conditional expression (4) is exceeded, a distance between the two aspherical surfaces becomes too large, and it is difficult to achieve satisfactory imaging performance over the entire screen in the reference state where at least one lens is not rotated, which is not preferable. On the other hand, when the lower limit of conditional expression (4) is exceeded, the distance between the two aspherical surfaces becomes too small, and there is a possibility that both of them may interfere according to the phase of rotation, which is not preferable.

Preferably, conditional expression (5) is satisfied, where fA is a focal length (combined focal length) of the optical system A (first lens and second lens).

$$|DA/fA| < 0.020 \tag{5}$$

When the upper limit of conditional expression (5) is exceeded, the refractive power of the optical system A becomes too strong, and it is difficult to achieve satisfactory imaging performance over the entire screen in the reference state where at least one lens is not rotated, or the optical system A becomes too thick, which leads to an increase in size of the entire image capturing optical system, which is not preferable.

Preferably, conditional expression (6) below is satisfied, where K1h is a maximum aspherical amount of the first aspherical surface at a height h from the optical axis in a radial direction, and K2h is a maximum aspheric amount of the second aspherical surface at the height h from the optical axis in the radial direction.

$$0.8<|K2h|/|K1h|<3.0 \quad (6)$$

In each embodiment, conditional expression (6) is satisfied at any heights h smaller than an effective diameter of the aspherical surface having the smaller effective diameter of the first aspherical surface and the second aspherical surface.

With such a configuration, field curvature and astigmatism generated in the first aspherical surface can be satisfactorily corrected by the second aspherical surface.

When the upper limit of conditional expression (6) is exceeded, the field curvature and the astigmatism generated in the first aspherical surface are excessively corrected, which is not preferable. When the lower limit of conditional expression (6) is exceeded, it is not preferable because it is difficult to sufficiently correct the filed curvature and the astigmatism occurring in the first aspherical surface.

More preferably, conditional expressions (1) to (6) satisfy conditional expressions (1a) to (6a), respectively.

$$3 \leq K \leq 8 \quad (1Xa)$$

$$3 \leq K \leq 8 \quad (1Ya)$$

$$0.007<|\Delta H1/DA|<0.450 \quad (2Xa)$$

$$0.007<|\Delta H2/DA|<0.450 \quad (2Ya)$$

$$0.014<|\Delta K1/DA|<0.900 \quad (3Xa)$$

$$0.014<|\Delta K2/DA|<0.900 \quad (3Ya)$$

$$0.025<|D/DA|<0.950 \quad (4a)$$

$$|DA/fA|<0.018 \quad (5a)$$

$$0.9<|K2h|/|K1h|<2.8 \quad (6a)$$

More preferably, conditional expressions (1) to (6) satisfy conditional expressions (1b) to (6b), respectively.

$$4 \leq K \leq 6 \quad (1Xb)$$

$$4 \leq K \leq 6 \quad (1Yb)$$

$$0.009<|\Delta H1/DA|<0.400 \quad (2Xb)$$

$$0.009<|\Delta H2/DA|<0.400 \quad (2Yb)$$

$$0.018<|\Delta K1/DA|<0.800 \quad (3Xb)$$

$$0.018<|\Delta K2/DA|<0.800 \quad (3Yb)$$

$$0.030<|D/DA|<0.900 \quad (4b)$$

$$|DA/fA|<0.016 \quad (5b)$$

$$1.0<|K2h|/|K1h|<2.6 \quad (6b)$$

Preferably, the optical system A (the first lens and the second lens) is disposed closest to the object side of the image capturing optical system. With such a configuration, it is possible to increase the difference between passing regions of an axial light beam and an off-axis light beam in the optical system A. As a result, when at least one lens is rotated, an amount of generation of the astigmatism can be mainly controlled in accordance with the amount of rotation, and it is possible to increase the difference between the imaging performance at the center of the screen and imaging performance on the periphery in the screen. Further, the optical system A can be easily detachable.

Preferably, the optical system A (one of the first lens and the second lens) is disposed closest to the image plane side (or a position near the image plane) of the image capturing optical system. With such a configuration, it is possible to increase the difference between the passing regions of the axial light beam and the off-axis light beam in the optical system A. As a result, when at least one lens is rotated, the amount of generation of the astigmatism can be mainly controlled in accordance with the amount of rotation, and it is possible to increase the difference between the imaging performance at the center of the screen and the imaging performance on the periphery in the screen. Further, the optical system A can be easily detachable. In addition, the effective diameter of the optical system A can be suppressed, which contributes to reduction in size of the entire image capturing optical system.

Preferably, the image capturing optical system of this embodiment includes an aperture stop. One of the first lens and the second lens is disposed adjacent to the aperture stop. With such a configuration, a width of the axial light beam widely spreads inside the optical system A and the difference between the difference of the passing regions of the on-axis light beam and the off-axial light beam can be reduced. As a result, when at least one lens is rotated, the amount of generation of the spherical aberration can be mainly controlled in accordance with the amount of rotation. Therefore, it is possible to obtain a so-called soft focus effect enabling blurring of the entire screen substantially uniformly.

Hereinafter, the image capturing optical system in Embodiments 1 to 6 (Numerical examples 1 to 6) of the present invention will be described.

Embodiment 1

First, referring to FIG. 1, an image capturing optical system in Embodiment 1 (Numerical example 1) of the present invention will be described. FIG. 1 is a cross-sectional view of lenses (A) at the wide-angle end, (B) at the middle position, and (C) at the telephoto end of a zoom position of the image capturing optical system of Numerical example 1. The image capturing optical system of this embodiment is a zoom lens having a zoom ratio of 3.94 and an aperture ratio of about 1.85 to 2.88.

In the cross-sectional view of FIG. 1, symbol L1 denotes a first lens unit having a positive refractive power, symbol L2 denotes a second lens unit having a negative refractive power, symbol L3 denotes a third lens unit having a positive refractive power, symbol L4 denotes a positive refractive power, and symbol L5 denotes a fifth lens unit having a negative refractive power. Symbol SP denotes an F number determination member (aperture stop) that acts as an aperture stop for determining (limiting) a full-open F number (Fno) light beam. Symbol IP is an image plane where an imaging plane of an image sensor (photoelectric conversion element, or image pickup device) such as a CCD sensor and a CMOS sensor is placed when used as an image capturing optical system of a video camera or a digital still camera.

When used as an image capturing optical system of a silver salt film camera, a photosensitive surface corresponding to a film surface is placed.

In the zoom lens of FIG. 1, at the time of zooming, at the telephoto end relative to the wide-angle end, the zoom lens (the first lens unit L1, the second lens unit L2, the third lens unit L3, the fourth lens unit L4, and the fifth lens unit L5) moves so as to widen a space between the first lens unit L1 and the second lens unit L2. Further, the zoom lens moves so as to narrow a space between the second lens unit L2 and the third lens unit L3, and it moves so as to narrow a space between the third lens unit L3 and the fourth lens unit L4. Further, the zoom lens moves so as to widen a space between the fourth lens unit L4 and the fifth lens unit L5. The aperture stop SP moves independently of each lens unit.

At the telephoto end, compared to the case of the wide-angle end, the first lens unit L1, the third lens unit L3, the fourth lens unit L4, and the fifth lens unit L5 are located on the object side, and the second lens unit L2 is located on the image side. The first lens unit L1 moves with a locus convex toward the image side, and the fifth lens unit L5 moves with a locus convex toward the object side. Focus adjustment (focusing) is performed by appropriately moving the fourth lens unit L4 (focus lens unit). As described above, the image capturing optical system of this embodiment achieves reduction in size and increase in variable power at the same time by properly moving each lens unit.

An optical system A is located closest to the object side of the image capturing optical system and it moves integrally with the first lens unit L1 during zooming. The optical system A is composed of two optical lenses of a lens a1 (first lens) and a lens a2 (second lens) in order from the object side. Each of the image side surface (first aspherical surface) of the lens a1 and the object side surface (second aspherical surface) of the lens a2 has an aspherical surface shape including a plurality of concave portions and convex portions formed in the rotation direction with respect to the optical axis OA (X axis).

Figure 2:
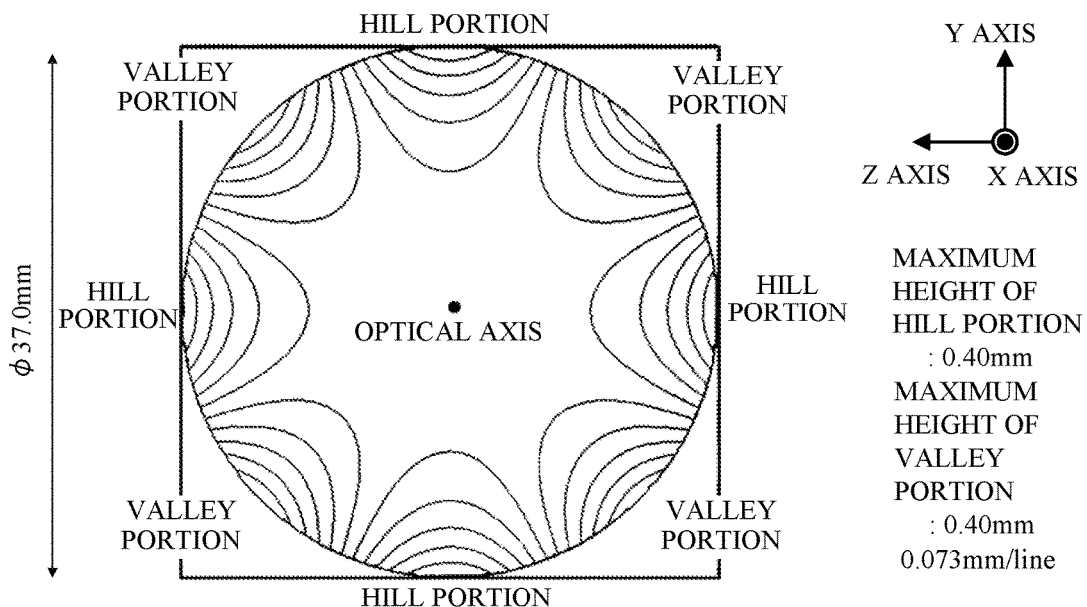
FIG. 2 is an image side surface shape of a lens a1 in Embodiment 1 (reference state).
Figure 3A:
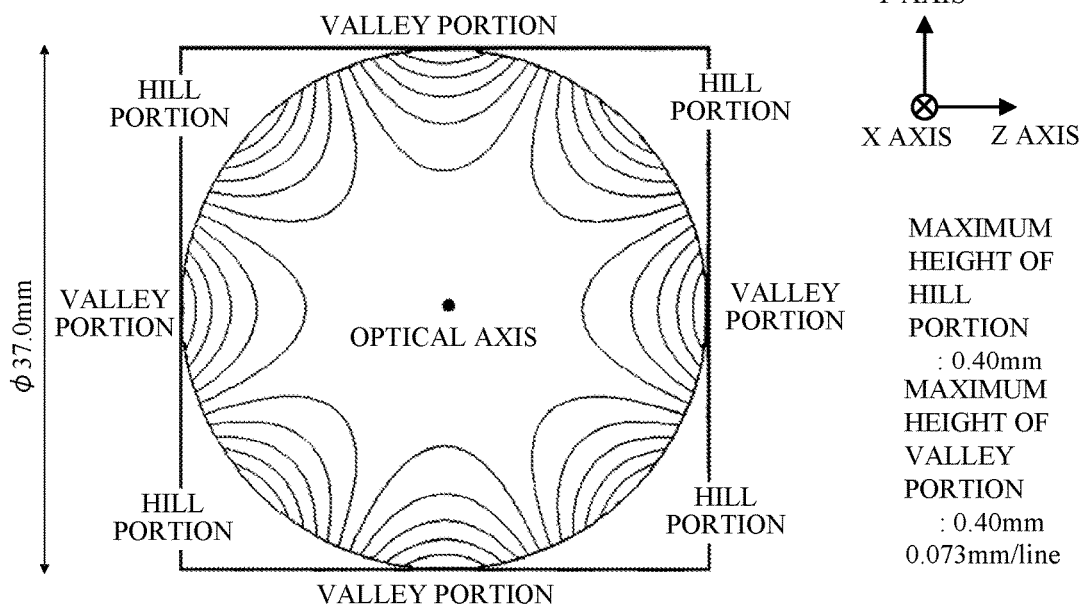
FIG. 3A is an object side surface shape of a lens a2 in Embodiment 1 (reference state).

Next, referring to FIG. 2 and FIGS. 3A to 3C, the image side surface shape of the lens a1 and the object side surface shape of the lens a2 in this embodiment will be described. FIGS. 2 and 3A illustrate contour maps of the image side surface shape of the lens a1 and the object side surface shape of the lens a2, respectively, in the reference state. As illustrated in FIGS. 2 and 3A, a center portion (first region, or region around the center) of each of the lenses a1 and a2 is a planar shape. On the other hand, in a peripheral portion (second region) of each of the lenses a1 and a2, hill portions (convex portions) and valley portions (concave portions) are periodically formed alternately around the surface center (circumferential direction). The surface shapes of the lenses a1 and a2 have substantially the same shape when the phases of the hill portions or the valley portions around the surface center are aligned. Further, the position relation (phase state) of the lenses a1 and a2 illustrated in FIGS. 2 and 3A is defined as a reference state. In the reference state, phases (phase states in the circumferential direction) with respect to the surface center of the hill portions and the valley portions of the lenses a1 and a2 are arranged to be aligned. In the reference state, the surface center of each of the lenses a1 and a2 and the position of the optical axis OA coincide with each other. In the reference state, a distance between the lens a1 and the lens a2 is substantially constant at any position in the second region. A distance related to the second region is substantially the same as the distance related to the first region.

Figure 3B:
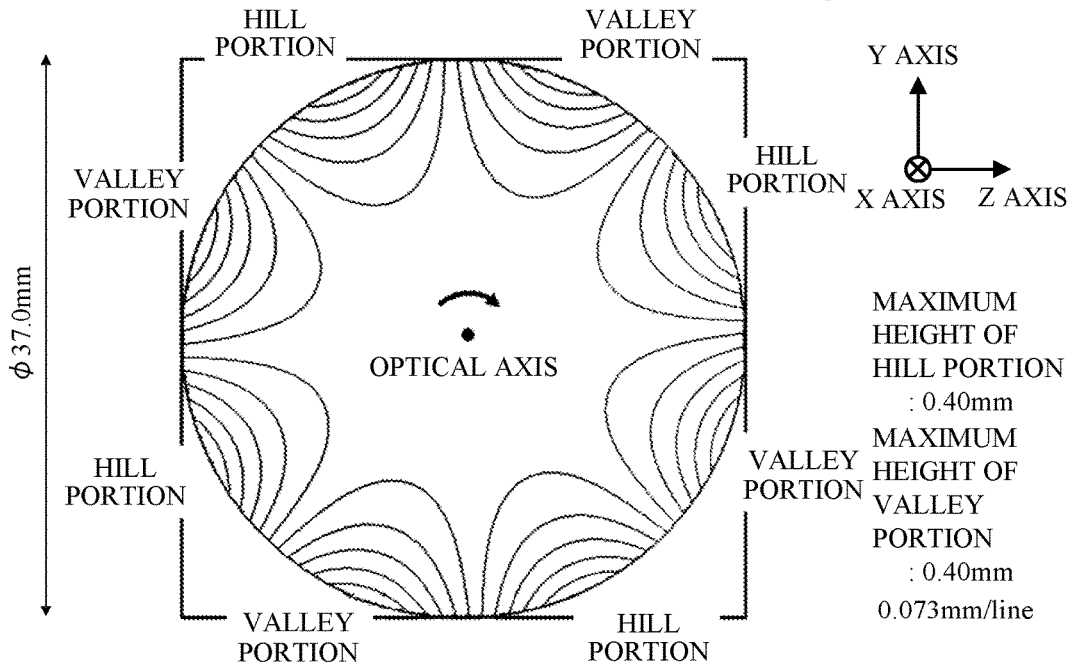
FIG. 3B is the object side surface shape of the lens a2 in Embodiment 1 (state rotated by 20 degrees from the reference state).
Figure 3C:
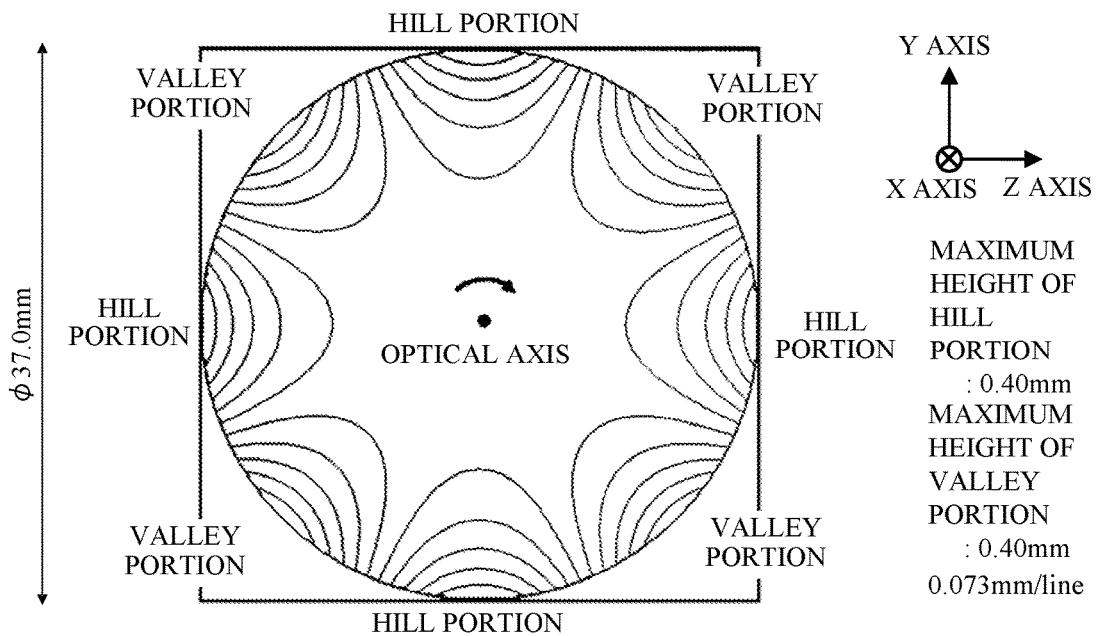
FIG. 3C is the object side surface shape of the lens a2 in Embodiment 1 (state rotated by 45 degrees from the reference state).

FIG. 3B illustrates a contour map of the object side surface shape of the lens a2 in a state where the lens a2 is rotated by 20 degrees around the optical axis with respect to the reference state. FIG. 3C illustrates a contour map of the object side surface shape of the lens a2 in a state where the lens a2 is rotated by 45 degrees around the optical axis with respect to the reference state. The rotation direction is indicated by an arrow in the drawing. In this embodiment, when the lens a2 is rotated by 45 degrees around the optical axis with respect to the reference state, the position relation (phase state) of the lenses a1 and a2 is the most distant from the reference state (i.e., the state is the most different from the reference state). In other words, the hill portion of the lens a1 and the hill portion of the lens a2 correspond to each other, and the valley portion of the lens a1 and the valley portion of the lens a2 correspond to each other. In this state, a distance between the lens a1 and the lens a2 is the smallest at a position where the hill portion of the lens a1 and the hill portion of the lens a2 in the second region face each other (i.e., smaller than a distance related to the first region). On the other hand, the distance between the lens a1 and the lens a2 is the largest at a position where the valley portion of the lens a1 and the valley portion of the lens a2 in the second region face each other (i.e., larger than the distance related to the first region).

Figure 4A:
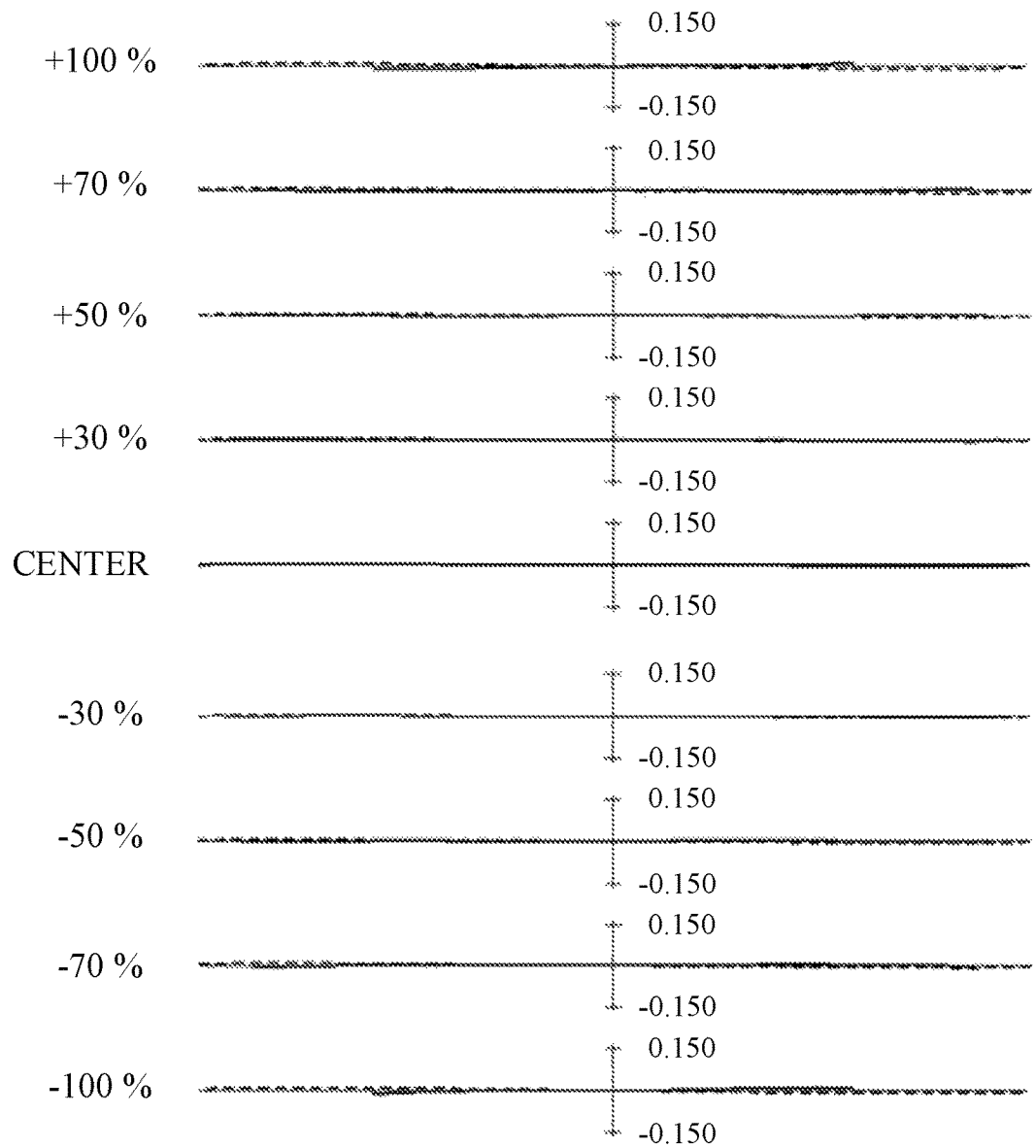
FIG. 4A is a lateral aberration diagram at a wide-angle end in Embodiment 1 (reference state).
Figure 4B:
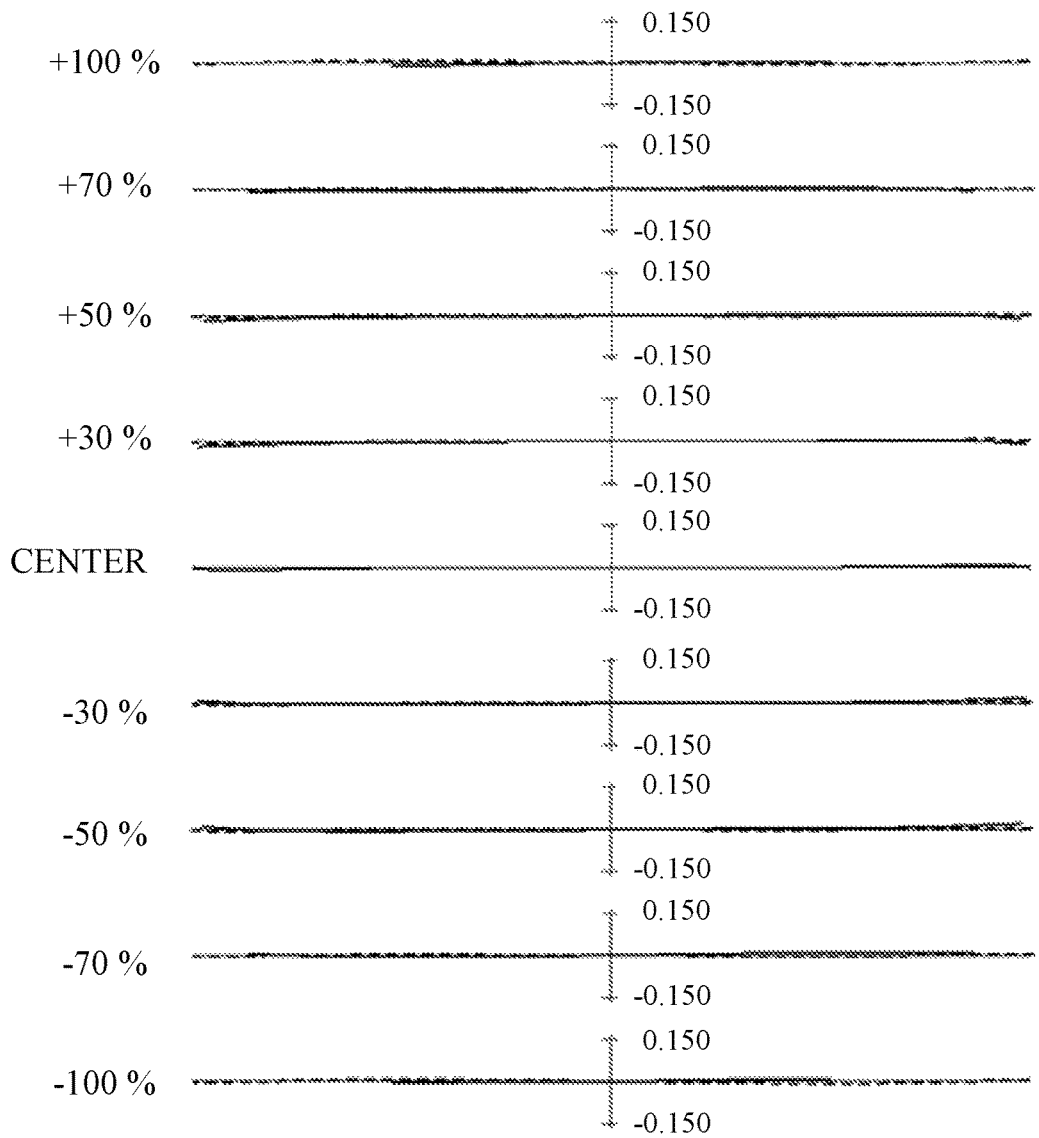
FIG. 4B is a lateral aberration diagram at a telephoto end in Embodiment 1 (reference state).
Figure 5A:
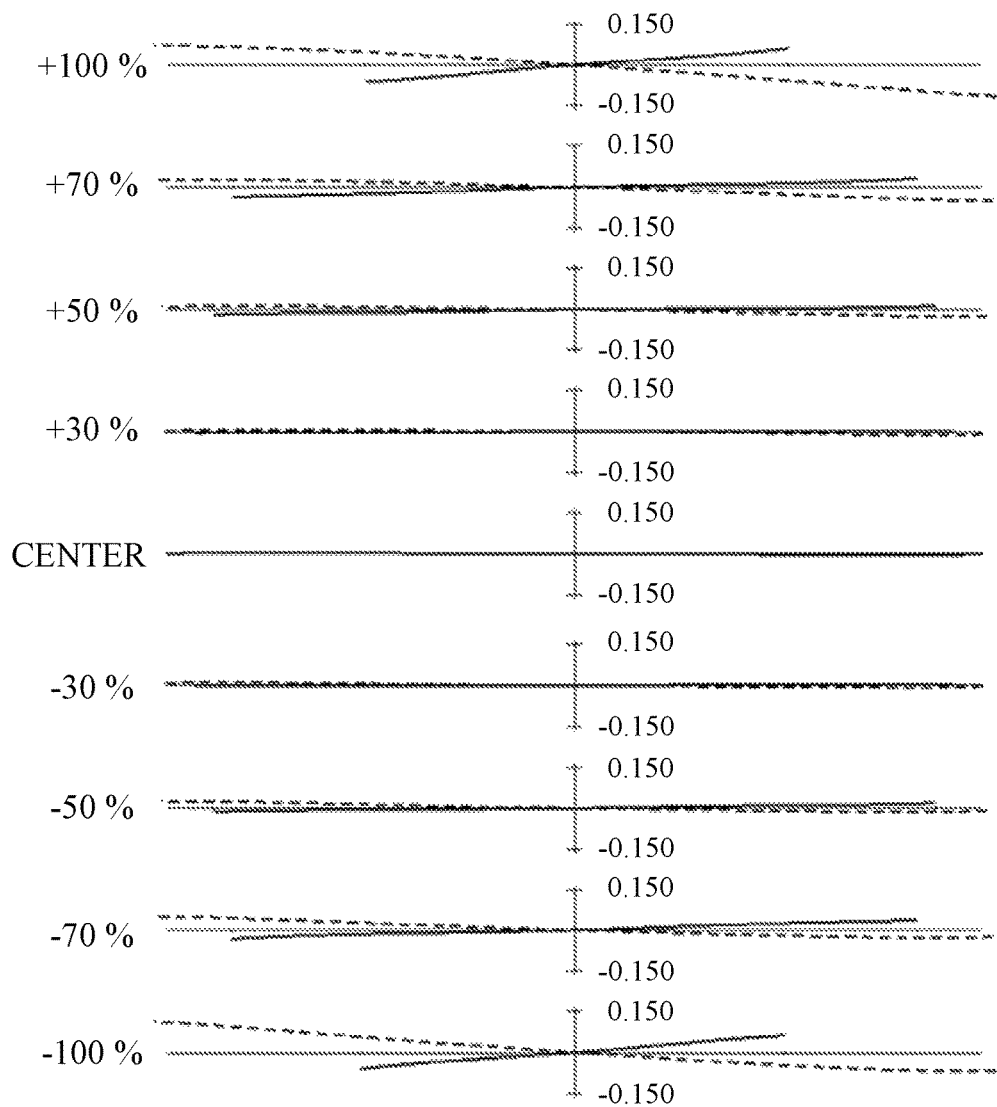
FIG. 5A is a lateral aberration diagram at the wide-angle end in Embodiment 1 (state where the lens a2 is rotated by 20 degrees from the reference state).
Figure 5B:
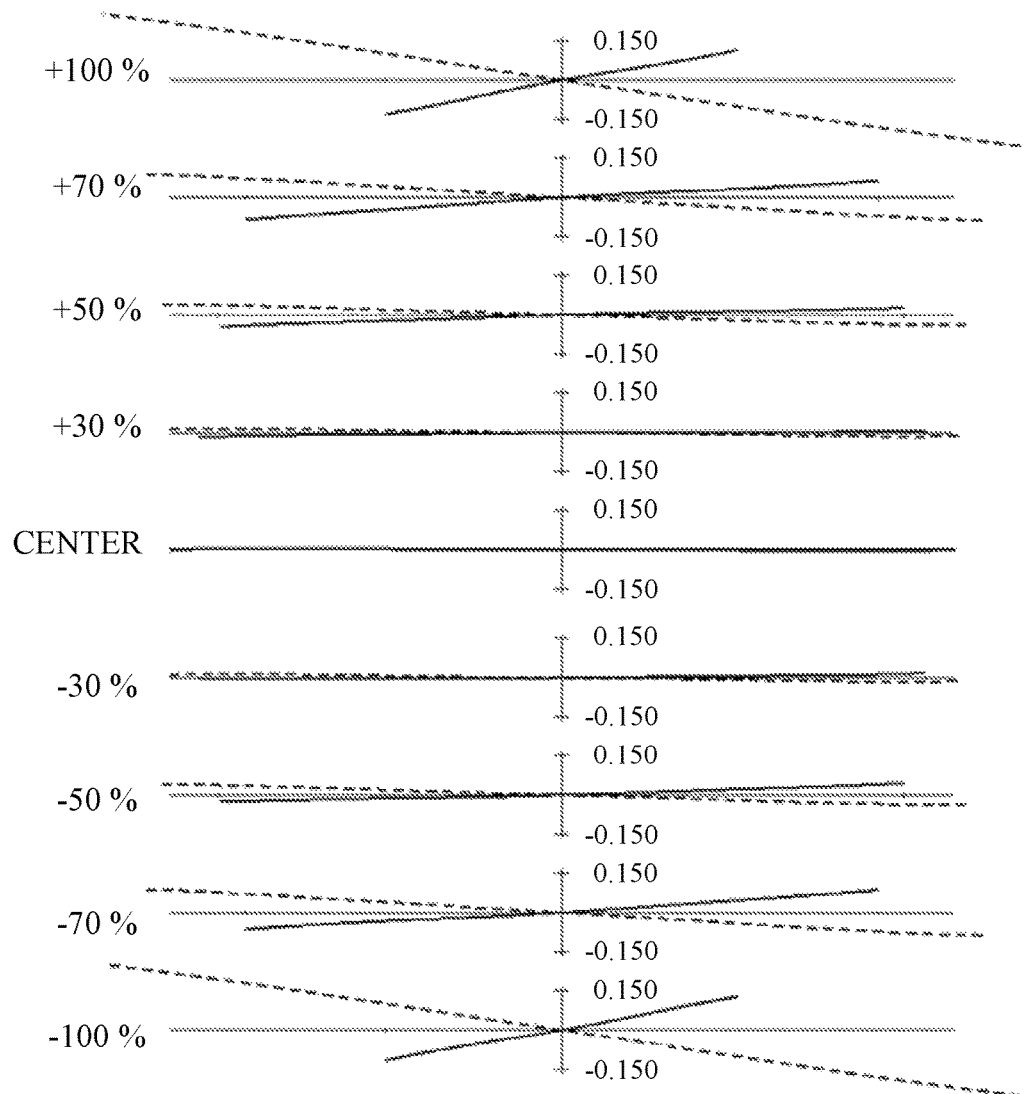
FIG. 5B is a lateral aberration diagram at the wide-angle end in Embodiment 1 (state where the lens a2 is rotated by 45 degrees from the reference state).
Figure 6:
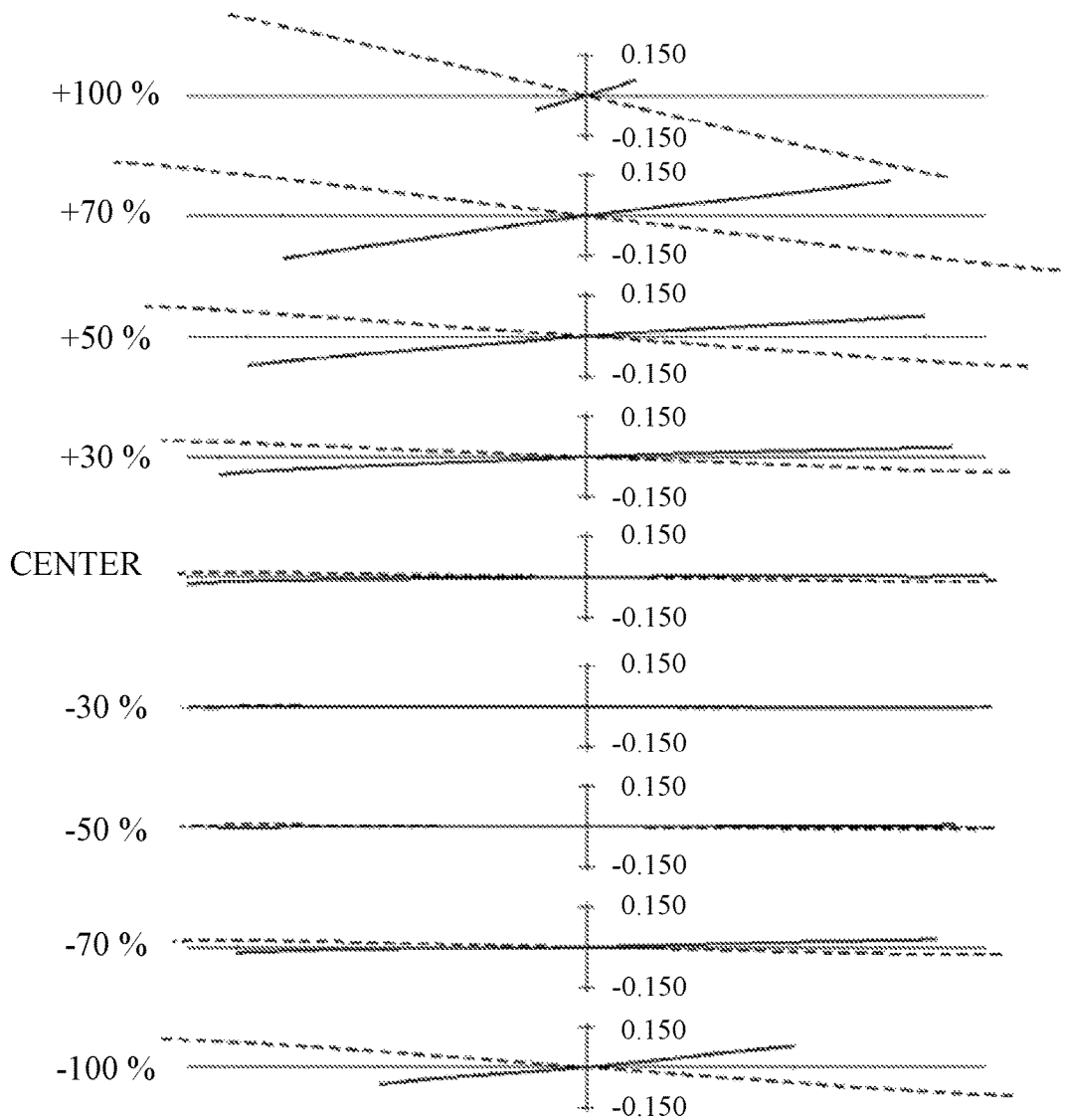
FIG. 6 is a lateral aberration diagram at the wide-angle end in Embodiment 1 (state where the lens a2 is rotated by 45 degrees from the reference state and an optical system A is integrally moved by +4 mm in a Y axis direction).

FIG. 4A is a lateral aberration diagram at the wide-angle end in the reference state. FIG. 4B is a lateral aberration diagram at the telephoto end in the reference state. FIG. 5A is a lateral aberration diagram at the wide-angle end in a state where the lens a2 is rotated by 20 degrees around the optical axis with respect to the reference state. FIG. 5B is a lateral aberration diagram at the wide-angle end in a state where the lens a2 is rotated by 45 degrees around the optical axis with respect to the reference state. FIG. 6 is a lateral aberration diagram at the wide-angle end in a state where the lens a2 is rotated by 45 degrees around the optical axis with respect to the reference state and the optical system A (lenses a1 and a2) is moved by +4 mm in the Y axis direction with respect to the image capturing optical system (the other lens units constituting the image capturing optical system).

In this embodiment, the optical system A is an optical system integrally formed with the image capturing optical system, but it is not limited thereto. The optical system A may be an attachment optical system detachably attached to an image capturing optical system (lens apparatus such as an interchangeable lens). The same applies to other embodiments.

In this embodiment, each of the lenses a1 and a2 has four hill portions (convex portions) and four valley portions (concave portions) alternately formed in the circumferential direction of the lens, but it is not limited thereto. The number of each of the hill portions and the valley portions may be not more than three, or not less than five. In this case, the rotation angle required for continuously controlling the background from the resolution state to the blurred state changes depending on its number.

In this embodiment, the optical system A includes two lenses a1 and a2, but it is not limited thereto. Three or more lenses may be provided. The same applies to other embodiments.

Embodiment 2

Figure 7:
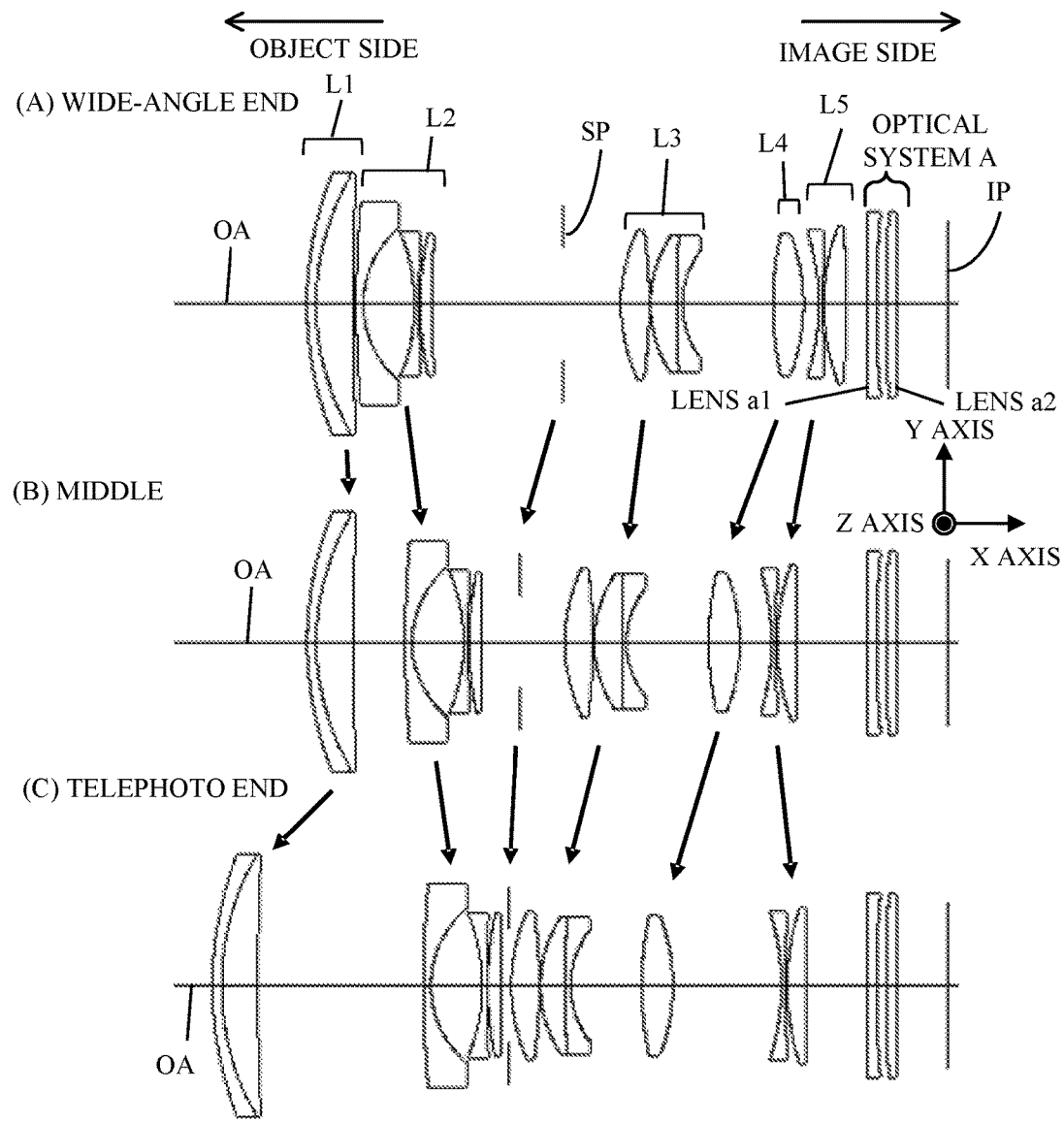
FIG. 7 is a cross-sectional view of lenses of an image capturing optical system in Embodiment 2.

Next, referring to FIG. 7, an image capturing optical system in Embodiment 2 (Numerical example 2) of the present invention will be described. FIG. 7 is a cross-sectional view of lenses (A) at the wide-angle end, (B) at the middle position, and (C) at the telephoto end of the zoom position of the image capturing optical system of Numerical example 2. The image capturing optical system of this embodiment is a zoom lens having a zoom ratio of 3.94 and an aperture ratio of about 1.85 to 2.88.

In the cross-sectional view of the lenses of FIG. 7, symbol L1 denotes a first lens unit having a positive refractive power, symbol L2 denotes a second lens unit having a negative refractive power, symbol L3 denotes a third lens unit having a positive refractive power, symbol L4 denotes a fourth lens unit having a positive refractive power, and symbol L5 denotes a fifth lens unit having a negative refractive power.

In the image capturing optical system (zoom lens) of FIG. 7, at the time of zooming, at the telephoto end compared to the case of the wide-angle end, the zoom lens (the first lens unit L1, the second lens unit L2, the third lens unit L3, the fourth lens unit L4, and the fifth lens L5) moves so as to widen a space between the first lens unit L1 and the second lens unit L2. Further, the zoom lens moves so as to narrow a space between the second lens unit L2 and the third lens unit L3 and moves so as to narrow a space between the third lens unit L3 and the fourth lens unit L4. Further, the zoom lens moves so as to widen a space between the fourth lens unit L4 and the fifth lens unit L5. The aperture stop SP moves independently of each lens unit.

At the telephoto end, compared to the case of the wide-angle end, the first lens unit L1, the third lens unit L3, the fourth lens unit L4, and the fifth lens unit L5 are located on the object side, and the second lens unit L2 is located on the image side. The first lens unit L1 moves with a locus convex toward the image side, and the fifth lens unit L5 moves with a locus convex toward the object side. Focus adjustment (focusing) is performed by appropriately moving the fourth lens unit L4 (focus lens unit). As described above, reduction in size and increase in variable power can be achieved at the same time by properly moving each lens unit.

The optical system A is located on the most image side of the image capturing optical system and it does not move during zooming. Further, the optical system A is composed of two optical lenses of a lens a1 and a2 in order from the object side. Each of the image side surface (first aspherical surface) of the lens a1 and the object side surface (second aspherical surface) of the lens a2 has an aspherical surface shape including a plurality of concave portions and convex portions formed in the rotation direction with respect to the optical axis OA (X axis).

Figure 8:
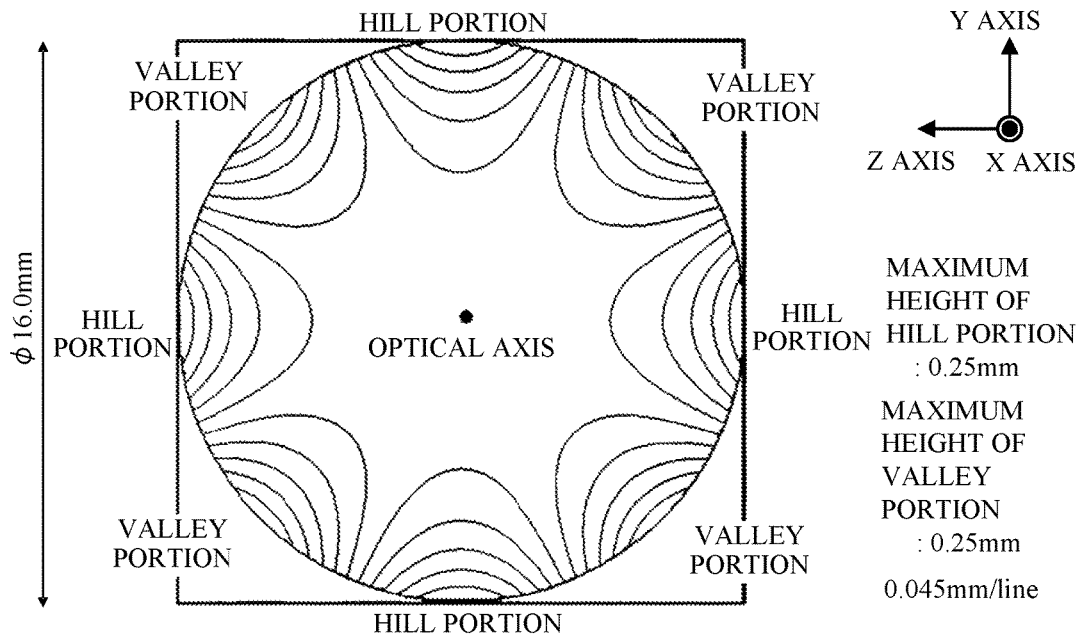
FIG. 8 is an image side surface shape of the lens a1 in Embodiment 2 (reference state).
Figure 9A:
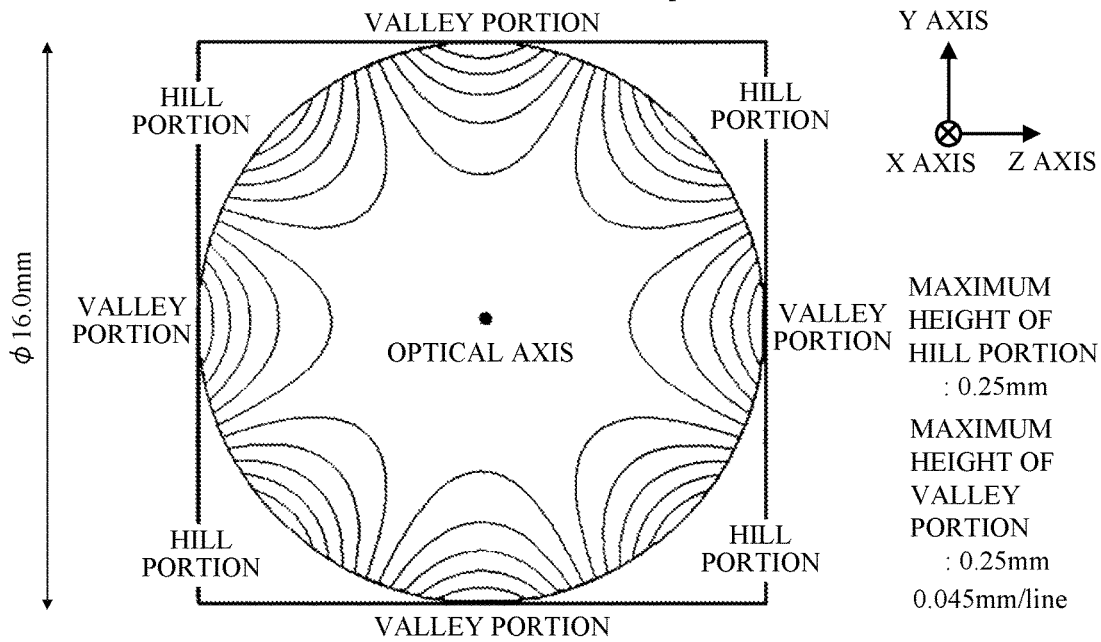
FIG. 9A is an object side surface shape of the lens a2 in Embodiment 2 (reference state).
Figure 9B:
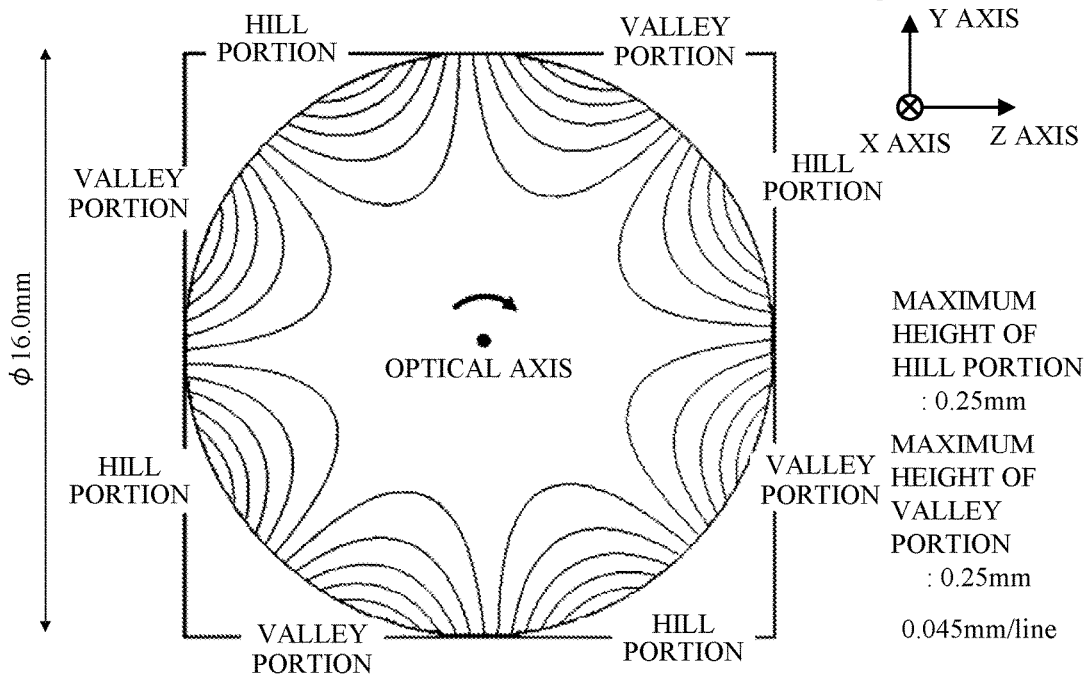
FIG. 9B is the object side surface shape of the lens a2 in Embodiment 2 (state rotated by 20 degrees from the reference state).
Figure 9C:
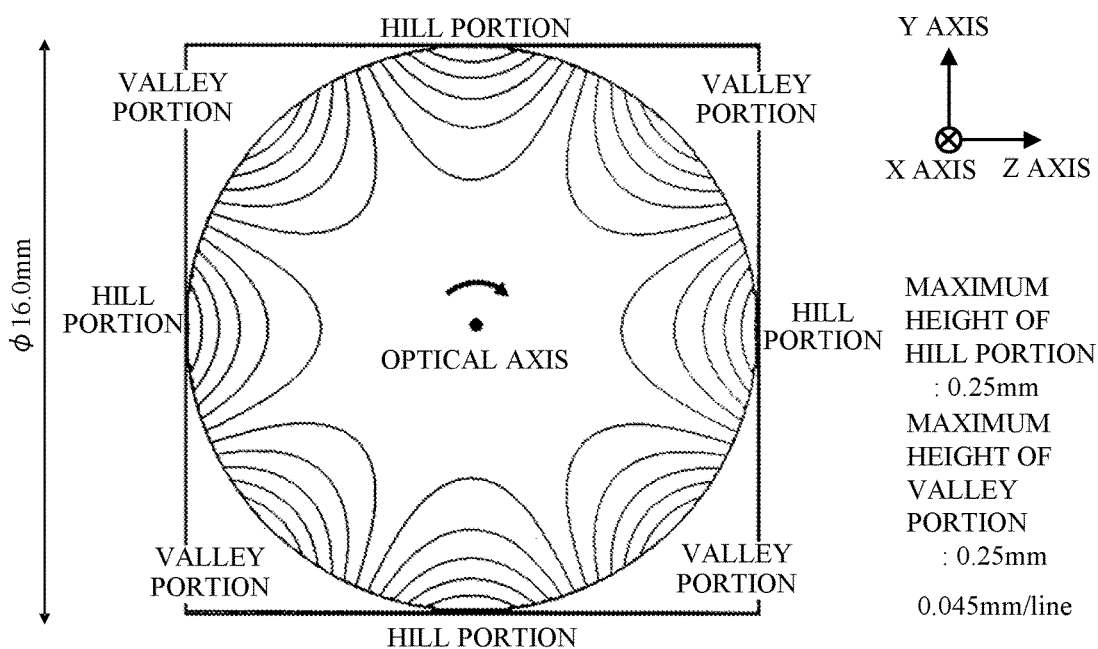
FIG. 9C is the object side surface shape of the lens a2 in Embodiment 2 (state rotated by 45 degrees from the reference state).

FIG. 8 illustrates a contour map of the image side surface shape of the lens a1 in the reference state. FIG. 9A illustrates a contour map of the object side surface shape of the lens a2 in the reference state. FIG. 9B illustrates a contour map of the object side surface shape of the lens a2 in a state where the lens a2 is rotated by 20 degrees around the optical axis with respect to the reference state. FIG. 9C illustrates a contour map of the object side surface shape of the lens a2 in a state where the lens a2 is rotated by 45 degrees around the optical axis with respect to the reference state. The rotation direction is indicated by an arrow in the drawing.

Figure 10A:
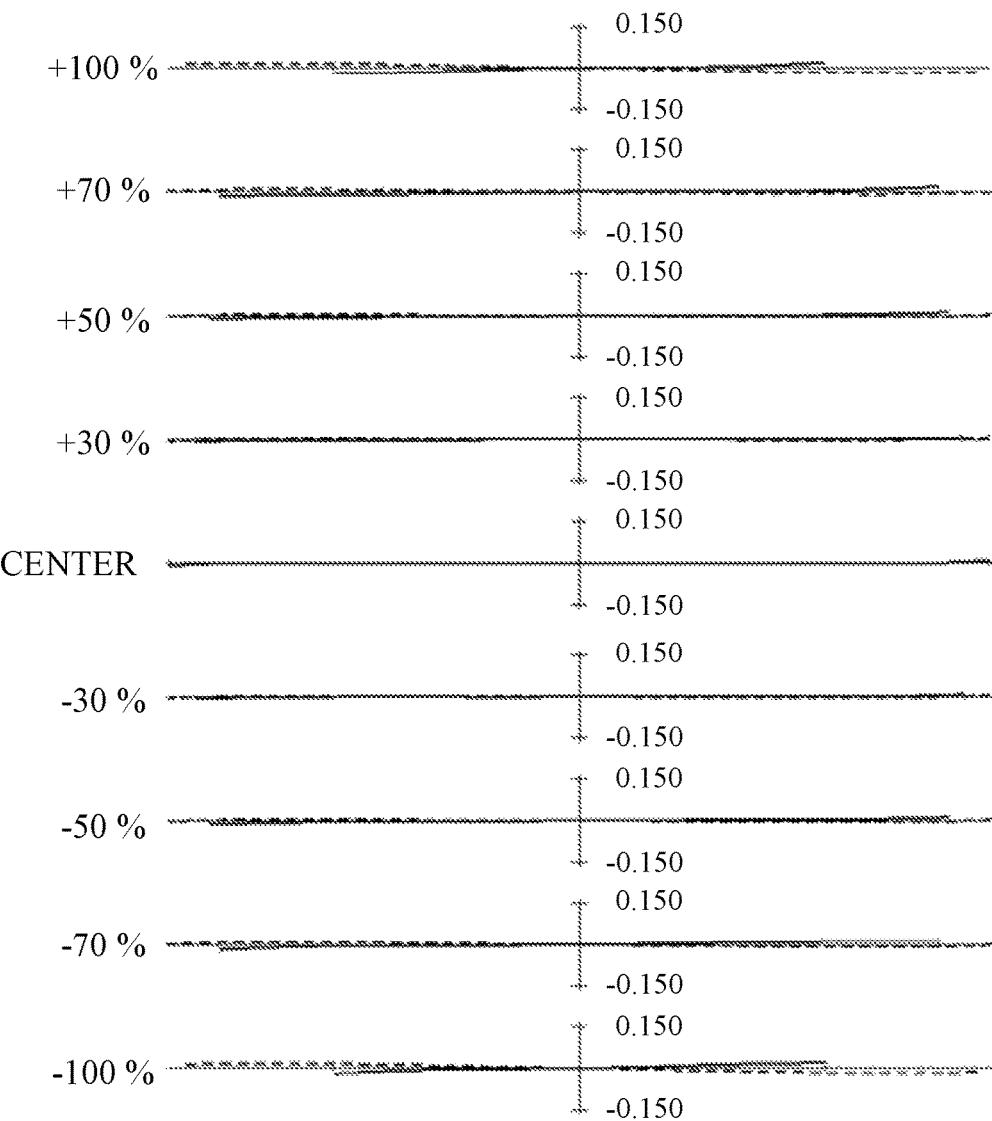
FIG. 10A is a lateral aberration diagram at the wide-angle end in Embodiment 2 (reference state).
Figure 10B:
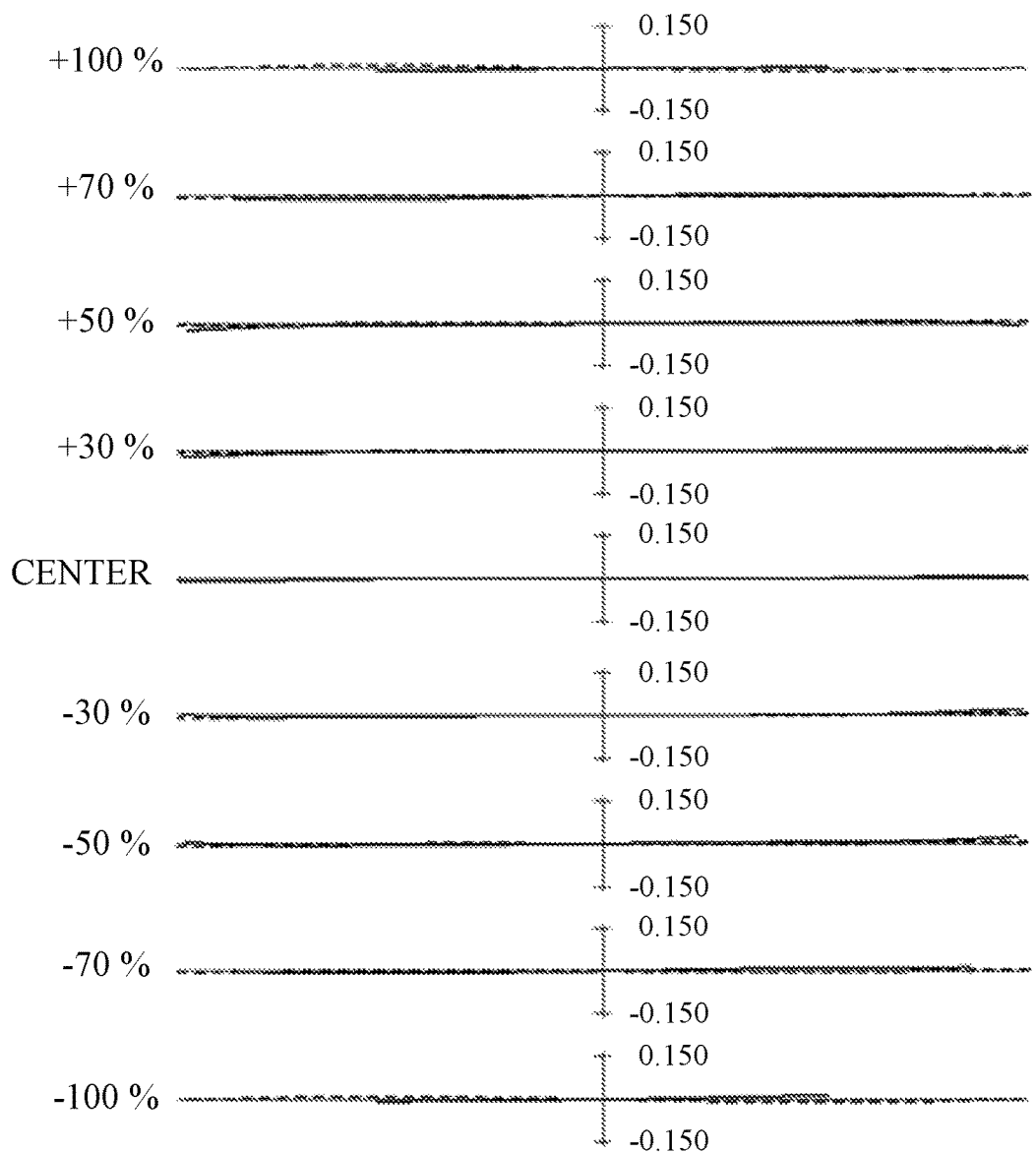
FIG. 10B is a lateral aberration diagram at the telephoto end in Embodiment 2 (reference state).
Figure 11A:
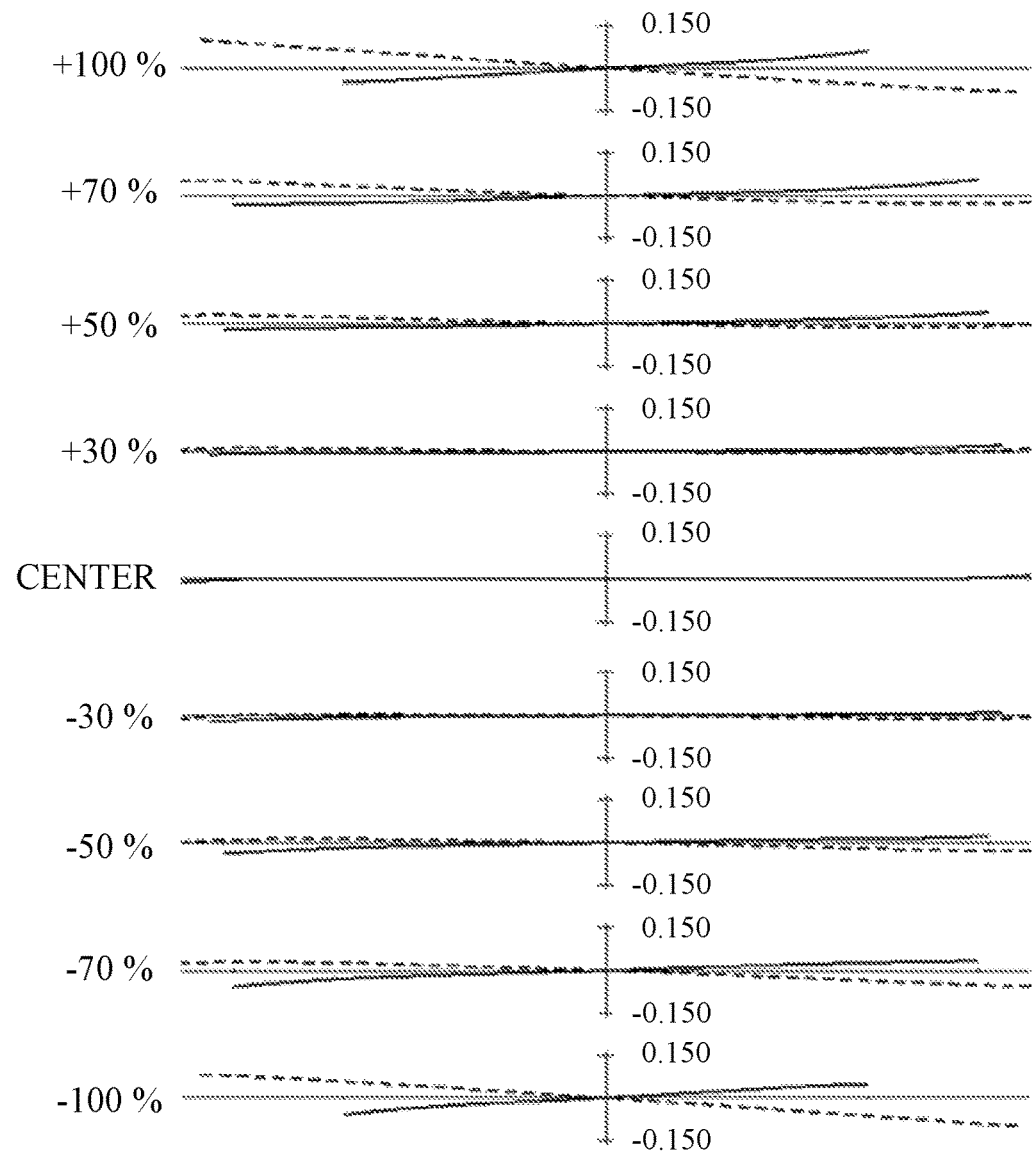
FIG. 11A is a lateral aberration diagram at the wide-angle end in Embodiment 2 (state where the lens a2 is rotated by 20 degrees from the reference state).
Figure 11B:
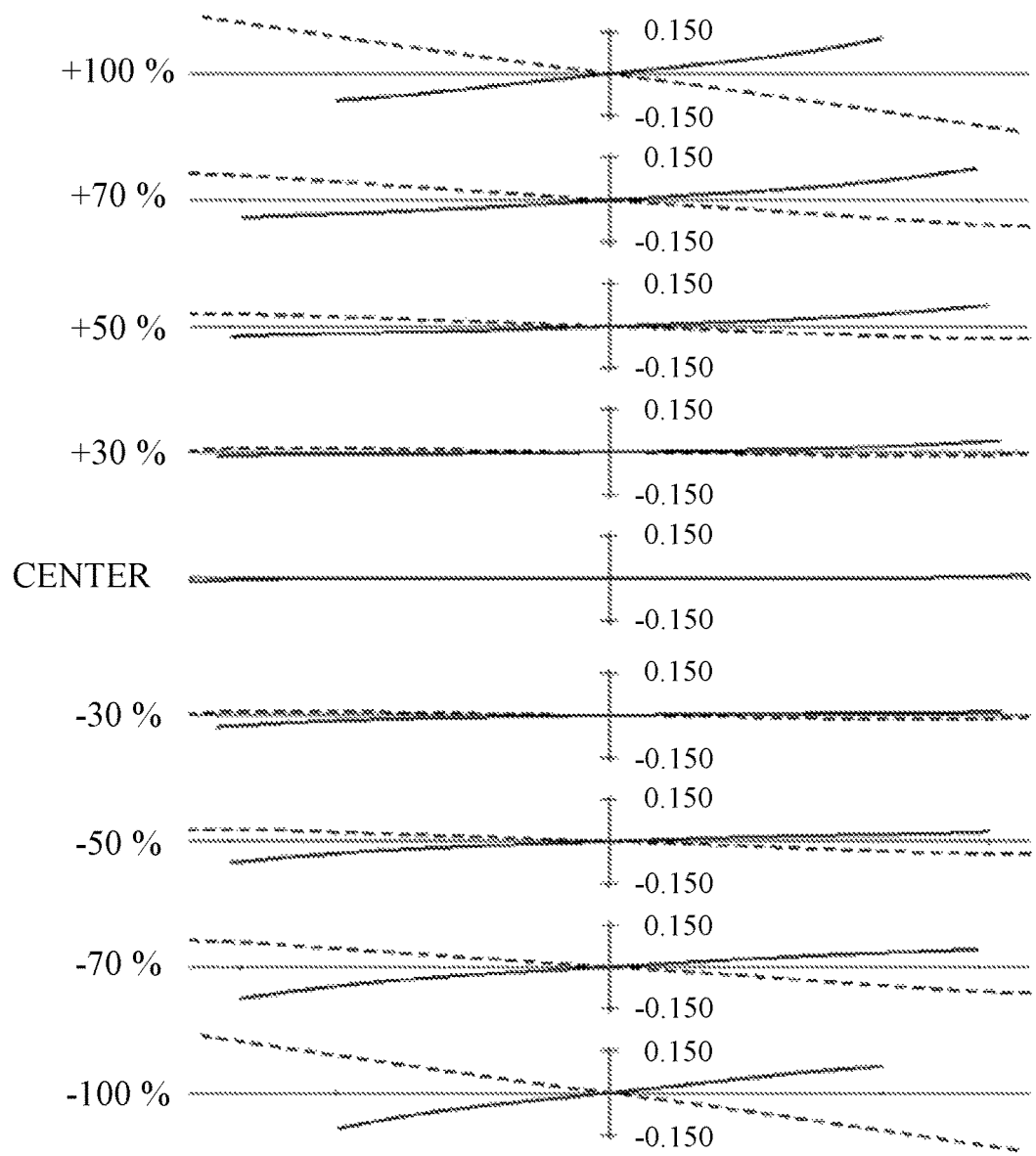
FIG. 11B is a lateral aberration diagram at the wide-angle end in Embodiment 2 (state where the lens a2 is rotated by 45 degrees from the reference state).

FIG. 10A is a lateral aberration diagram at the wide-angle end in the reference state. FIG. 10B is a lateral aberration diagram at the telephoto end in the reference state. FIG. 11A is a lateral aberration diagram at the wide-angle end in a state where the lens a2 is rotated by 20 degrees around the optical axis with respect to the reference state. FIG. 11B is a lateral aberration diagram at the wide-angle end in a state where the lens a2 is rotated by 45 degrees around the optical axis with respect to the reference state.

Embodiment 3

Figure 12:
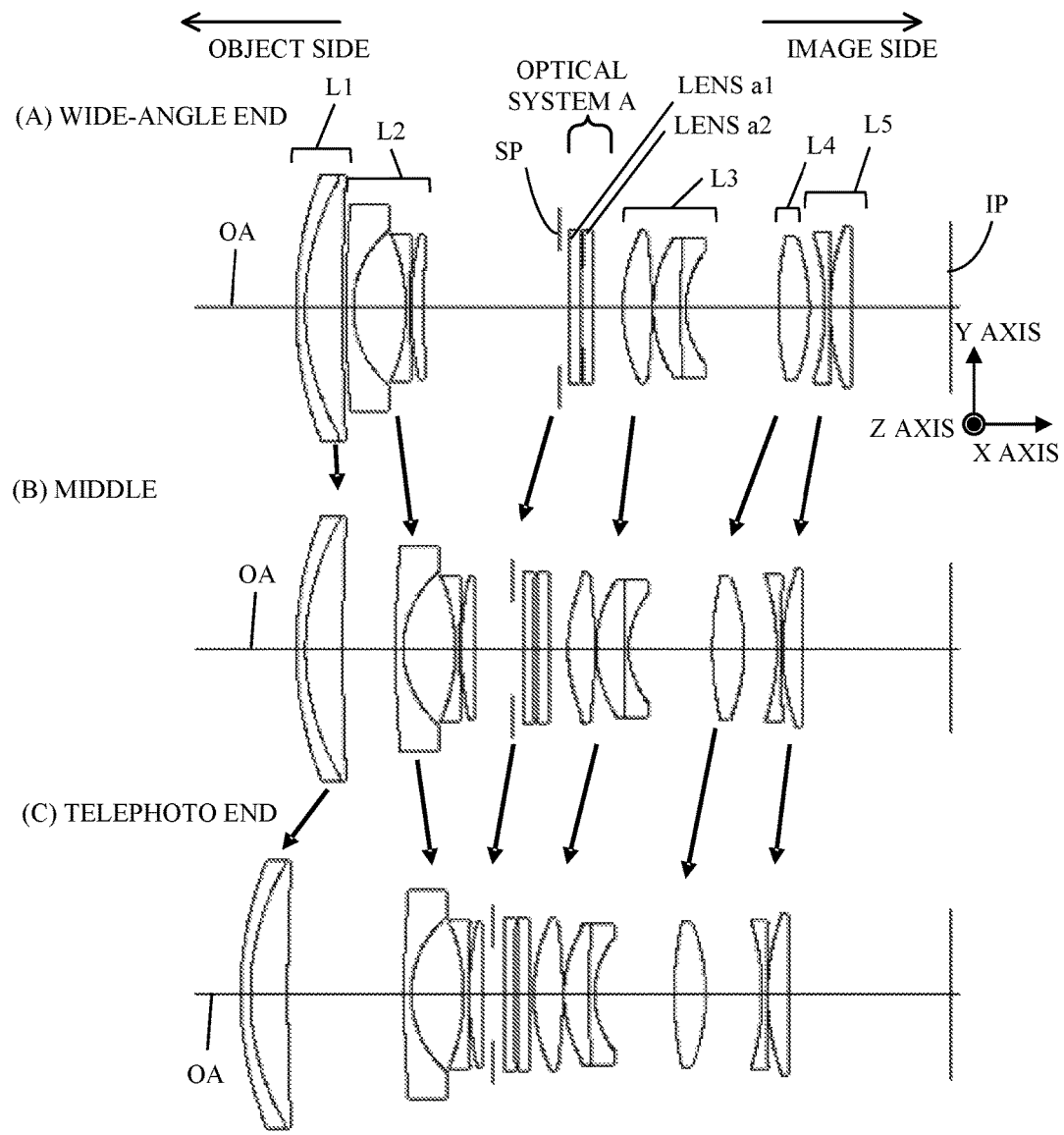
FIG. 12 is a cross-sectional view of lenses of an image capturing optical system in Embodiment 3.

Next, referring to FIG. 12, an image capturing optical system in Embodiment 3 (Numerical example 3) of the present invention will be described. FIG. 12 is a cross-sectional view of lenses (A) at the wide-angle end, (B) at the middle position, and (C) at the telephoto end of the zoom position of the image capturing optical system of Numerical example 2. The image capturing optical system of this embodiment is a zoom lens having a zoom ratio of 2.74 and an aperture ratio of about 1.85 to 2.88.

In the cross-sectional view of FIG. 12, symbol L1 denotes a first lens unit having a positive refractive power, symbol L2 denotes a second lens unit having a negative refractive power, symbol L3 denotes a third lens unit having a positive refractive power, symbol L4 denotes a fourth lens unit having a positive refractive power, and symbol L5 denotes a fifth lens unit having a negative refractive power.

In the zoom lens of FIG. 12, at the time of zooming, at the telephoto end compared to the case of the wide-angle end, the zoom lens (the first lens unit L1, the second lens unit L2, the third lens unit L3, the fourth lens unit L4, and the fifth lens L5) moves so as to widen a space between the first lens unit L1 and the second lens unit L2. Further, the zoom lens moves so as to narrow a space between the second lens unit L2 and the third lens unit L3 and it moves so as to narrow a space between the third lens unit L3 and the fourth lens unit L4. Further, the zoom lens moves so as to widen a space between the fourth lens unit L4 and the fifth lens unit L5. The aperture stop SP moves independently of each lens unit.

At the telephoto end, compared to the case of the wide-angle end, the first lens unit L1, the third lens unit L3, the fourth lens unit L4, and the fifth lens unit L5 are located on the object side, and the second lens unit L2 is located on the image side. The first lens unit L1 moves with a locus convex toward the image side. Focusing is performed by appropriately moving the fourth lens unit L4 (focus lens unit). As described above, reduction in size and increase in variable power can be achieved at the same time by properly moving each lens unit.

The optical system A is located adjacent to the image side of the aperture stop SP and moves integrally with the aperture stop SP during zooming. Further, the optical system A is composed of two optical lenses of a lens a1 and a lens a2 in order from the object side. Each of the image side surface (first aspherical surface) of the lens a1 and the object side surface (second aspherical surface) of the lens a2 has an aspherical surface shape including a plurality of concave portions and convex portions formed in the rotation direction with respect to the optical axis OA (X axis).

Figure 13:
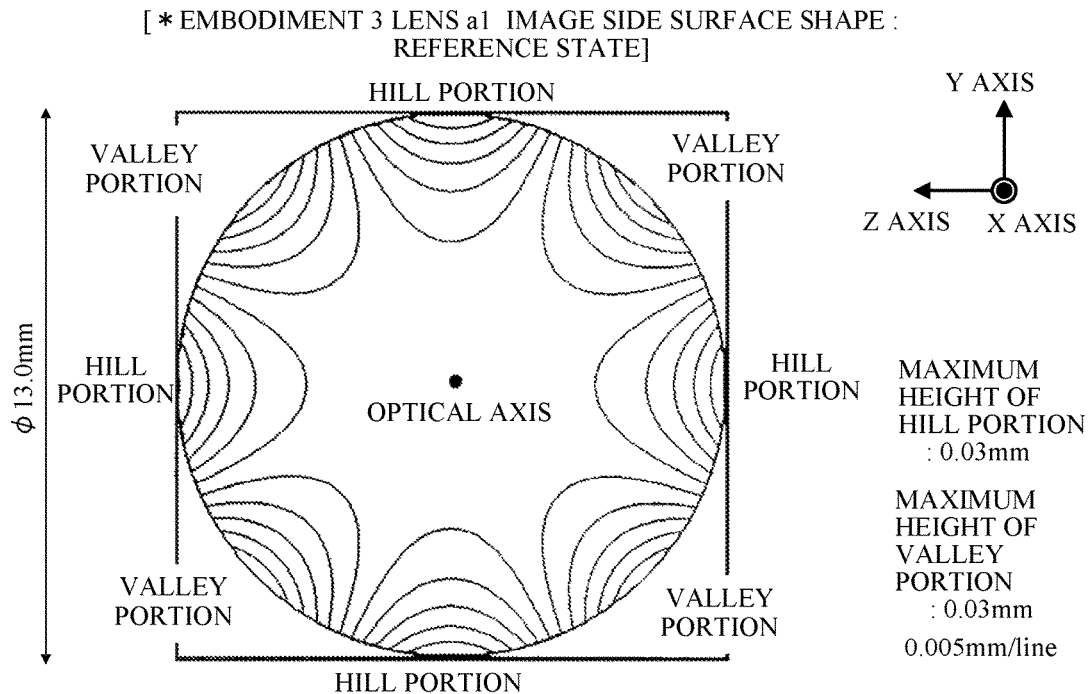
FIG. 13 is an image side surface shape of a lens a1 in Embodiment 3 (reference state).
Figure 14A:
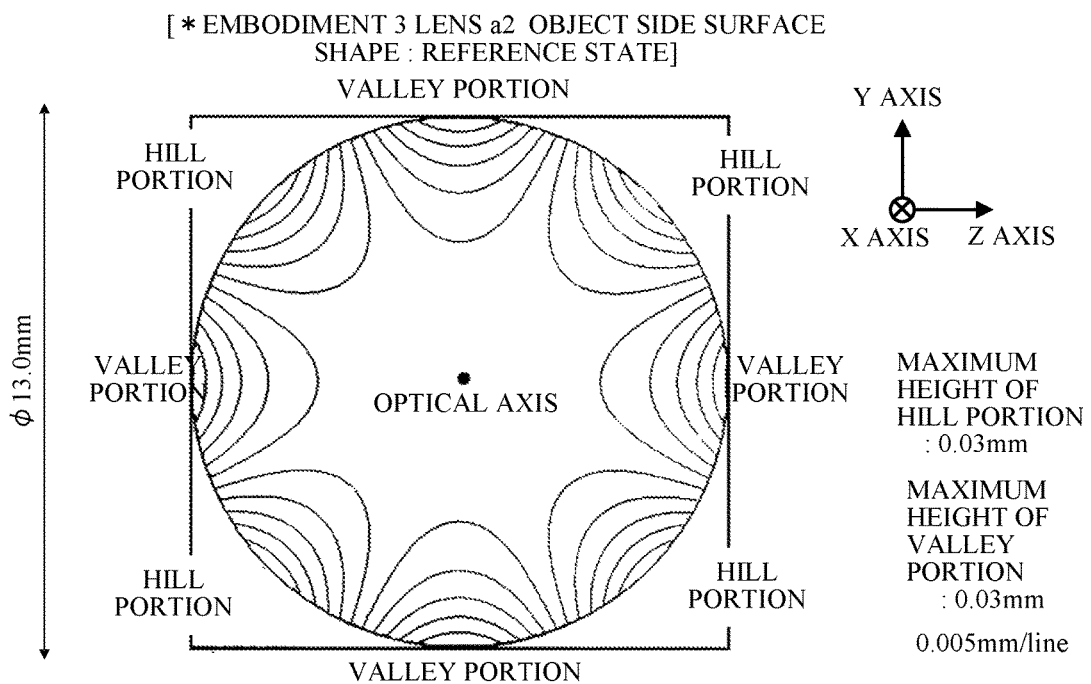
FIG. 14A is an object side surface shape of a lens a2 in Embodiment 3 (reference state).
Figure 14B:
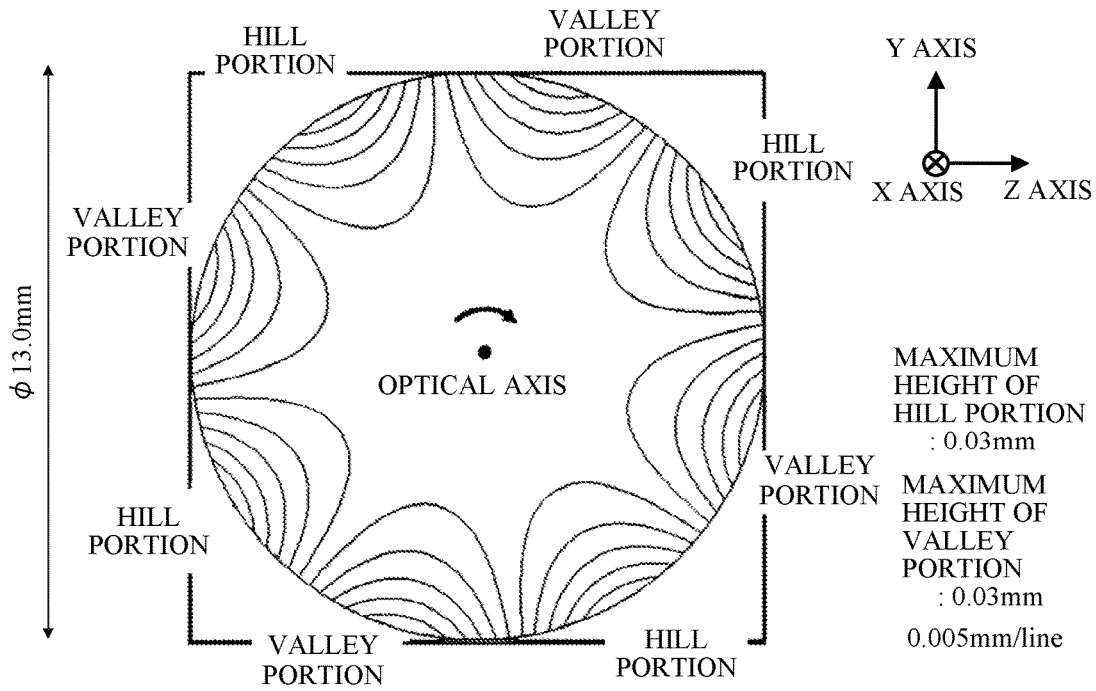
FIG. 14B is the object side surface shape of the lens a2 in Embodiment 3 (state rotated by 15 degrees from the reference state).
Figure 14C:
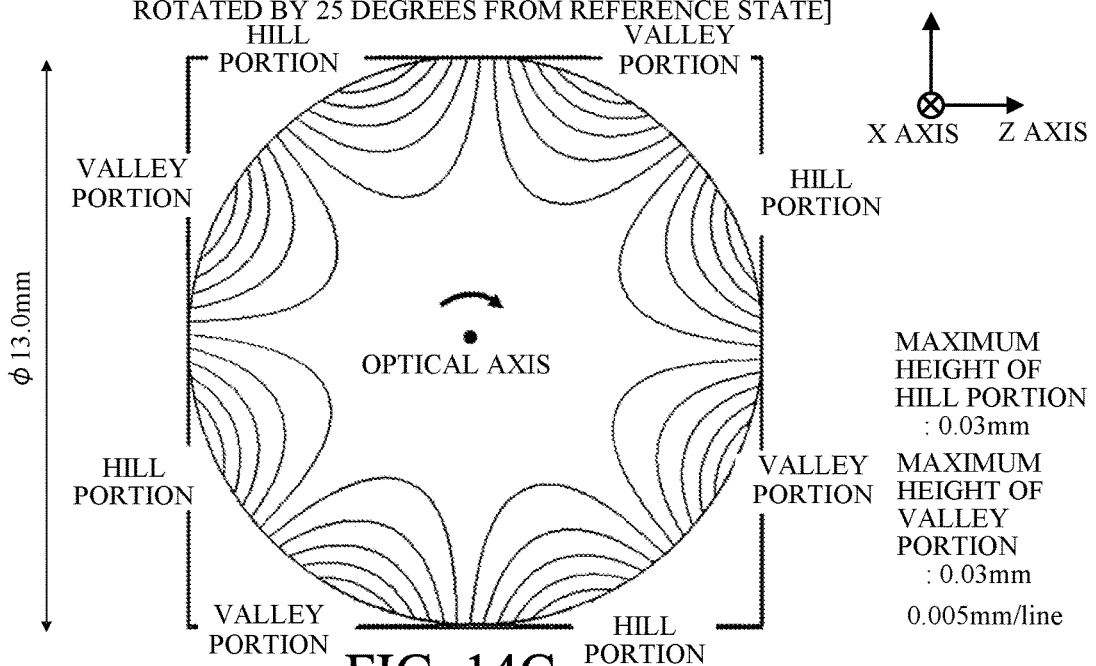
FIG. 14C is the object side surface shape of the lens a2 in Embodiment 3 (state rotated by 25 degrees from the reference state).

FIG. 13 illustrates a contour map of the image side surface shape of the lens a1. FIG. 14A illustrates a contour map of the object side surface shape of the lens a2. FIG. 14B illustrates a contour map of the object side surface shape in a state where the lens a2 is rotated by 15 degrees around the optical axis with respect to the reference state. FIG. 14C illustrates a contour map of the object side surface shape in a state where the lens a2 is rotated by 25 degrees around the optical axis with respect to the reference state. The rotation direction is indicated by an arrow in the drawing.

Figure 15A:
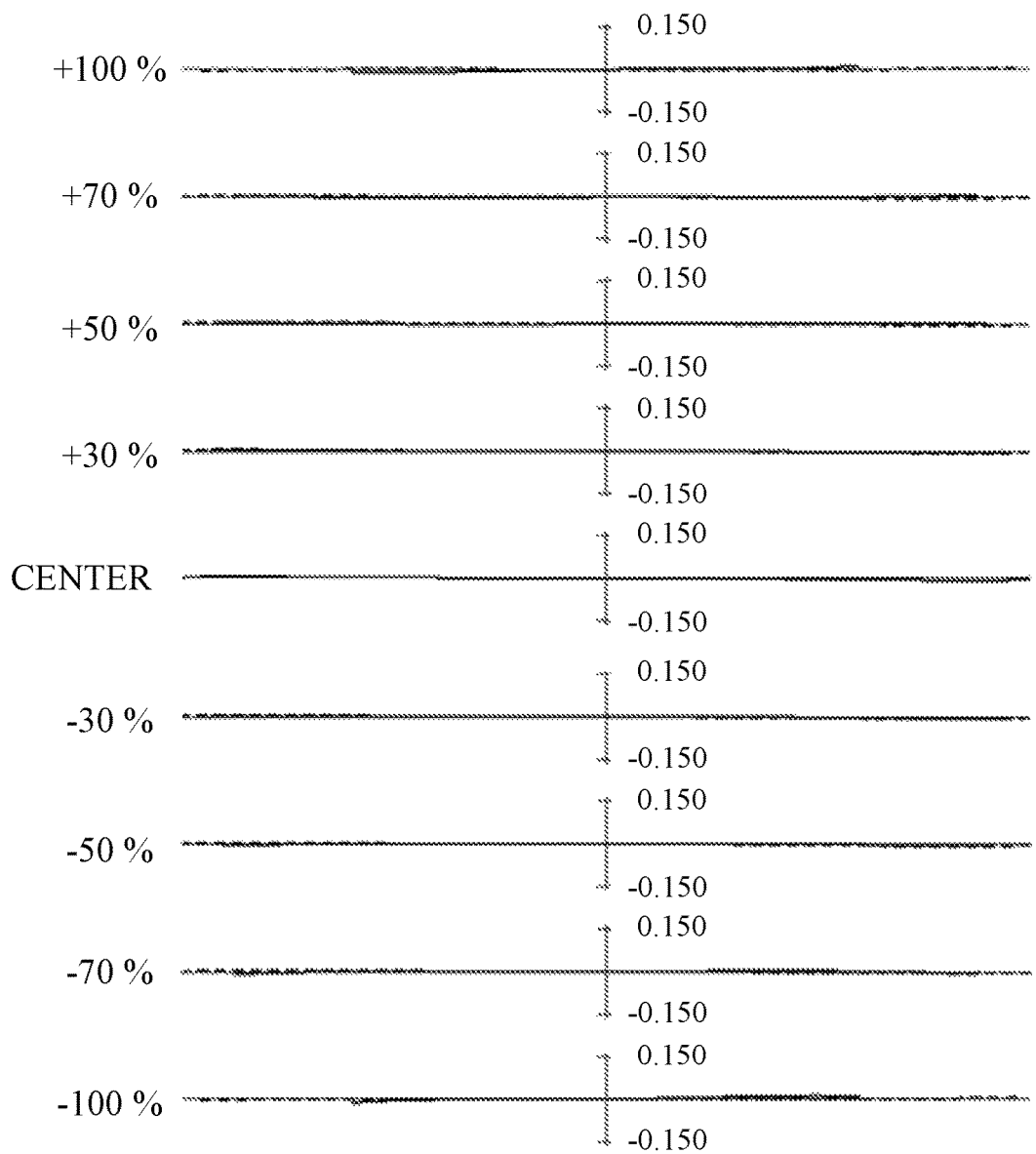
FIG. 15A is a lateral aberration diagram at the wide-angle end in Embodiment 3 (reference state).
Figure 15B:
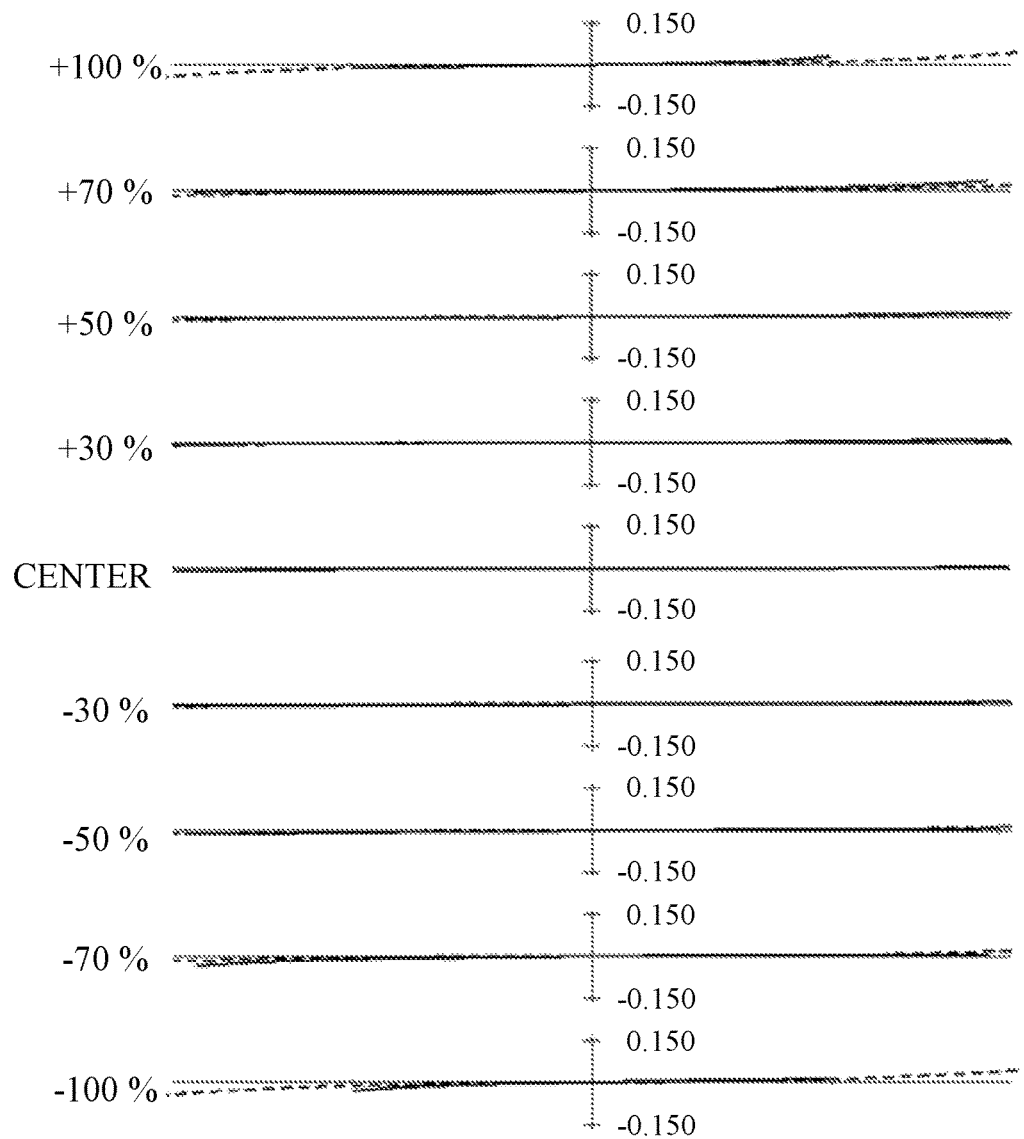
FIG. 15B is a lateral aberration diagram at the telephoto end in Embodiment 3 (reference state).
Figure 16A:
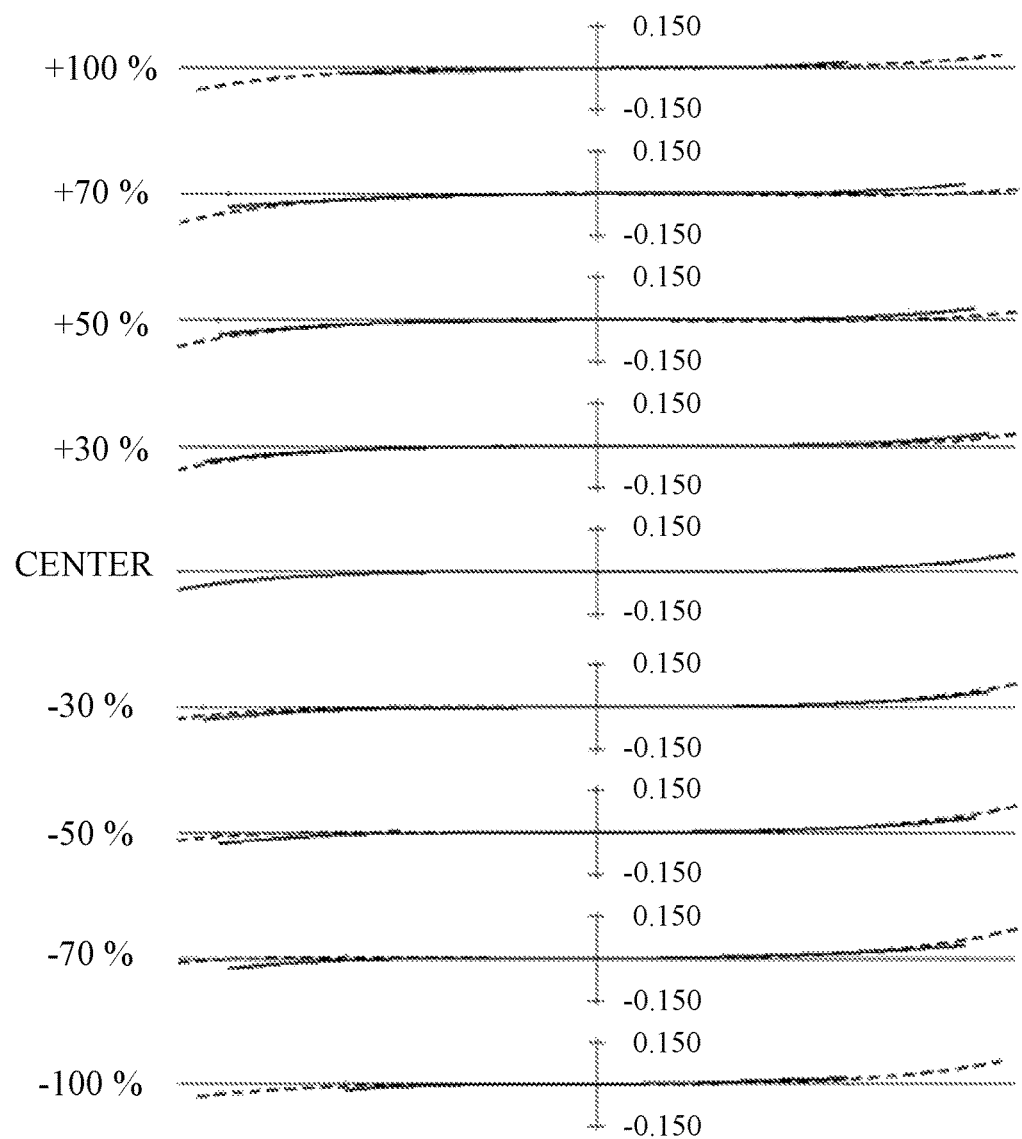
FIG. 16A is a lateral aberration diagram at the wide-angle end in Embodiment 3 (state where the lens a2 is rotated by 15 degrees from the reference state).
Figure 16B:
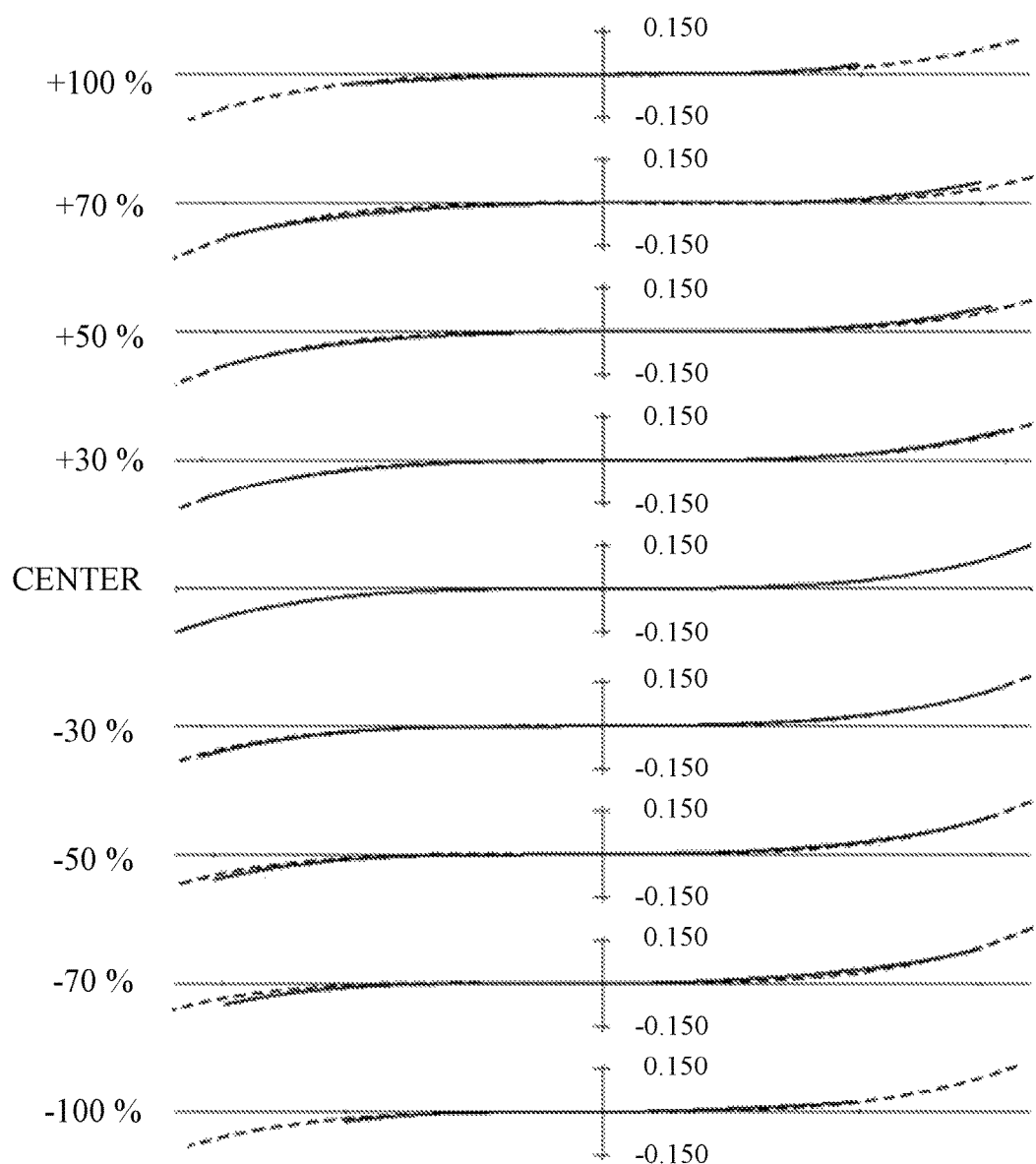
FIG. 16B is a lateral aberration diagram at the wide-angle end in Embodiment 3 (state where the lens a2 is rotated by 25 degrees from the reference state).

FIG. 15A is a lateral aberration diagram at the wide-angle end in the reference state. FIG. 15B is a lateral aberration diagram at the telephoto end in the reference state. FIG. 16A is a lateral aberration diagram at the wide-angle end in a state where the lens a2 is rotated by 15 degrees around the optical axis with respect to the reference state. FIG. 16B is a lateral aberration diagram at the wide-angle end in a state where the lens a2 is rotated by 25 degrees around the optical axis with respect to the reference state.

Embodiment 4

Figure 17:
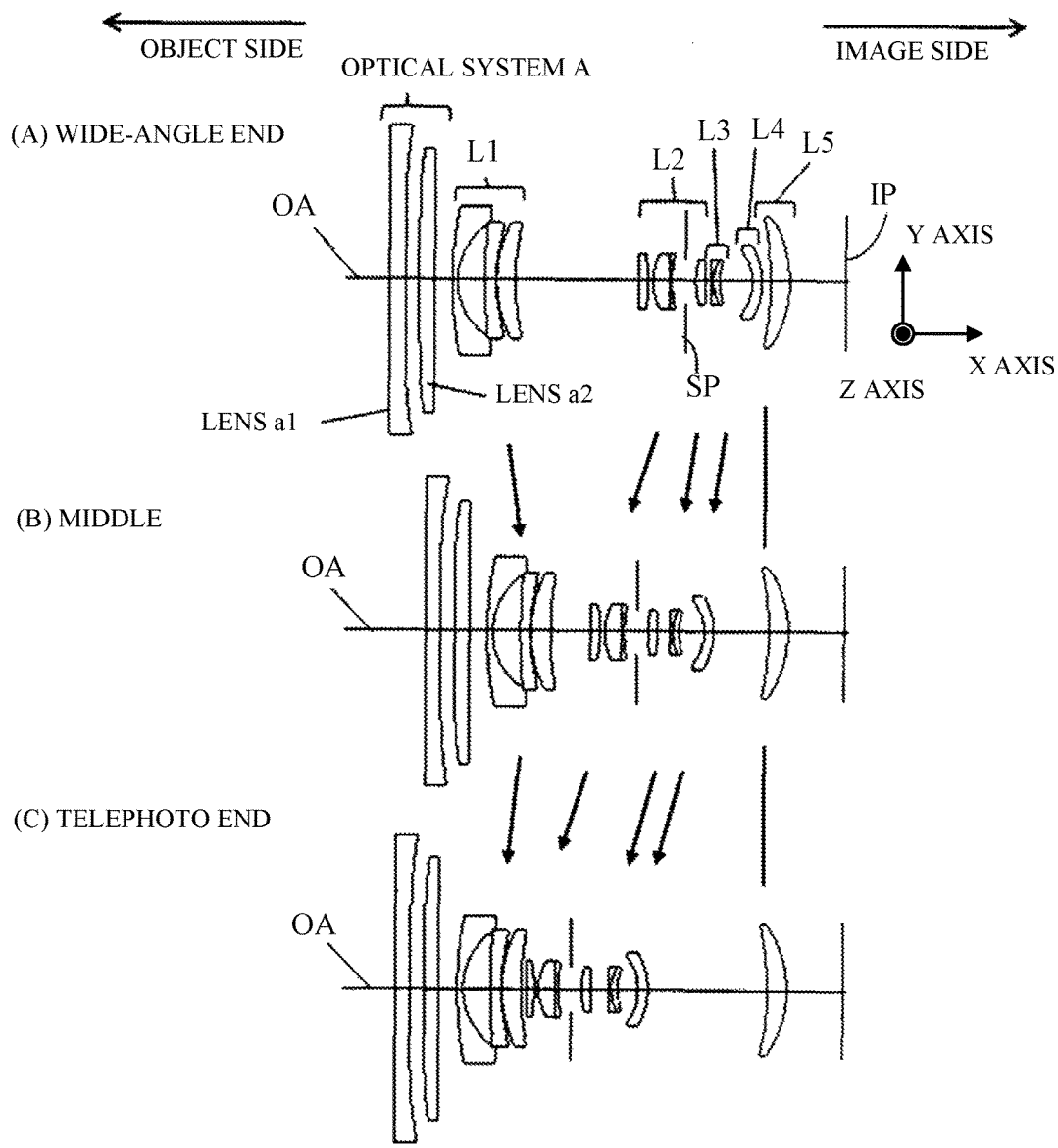
FIG. 17 is a cross-sectional view of lenses of an image capturing optical system in Embodiment 4.

Next, referring to FIG. 17, an image capturing optical system in Embodiment 4 (Numerical example 4) of the present invention will be described. FIG. 17 is a cross-sectional view of lenses (A) at the wide-angle end, (B) at the middle position, and (C) at the telephoto end of the zoom position of the image capturing optical system of Numerical example 4. The image capturing optical system of this embodiment is a zoom lens having a zoom ratio of 2.83 and an aperture ratio of about 3.55 to 6.44.

In the cross-sectional view of the lenses of FIG. 17, symbol L1 denotes a first lens unit having a negative refractive power, symbol L2 denotes a second lens unit having a positive refractive power, symbol L3 denotes a third lens unit having a negative refractive power, symbol L4 denotes a fourth lens unit having a negative refractive power, and symbol L5 denotes a fifth lens unit having a positive refractive power.

In the zoom lens of FIG. 17, at the time of zooming, at the telephoto end relative to the wide-angle end, the zoom lens (the first lens unit L1, the second lens unit L2, the third lens unit L3, and the fourth lens unit L4) moves so as to narrow a space between the first lens unit L1 and the second lens unit L2. Further, the zoom lens moves so as to widen a space between the second lens unit L2 and the third lens unit L3, and it moves so as to narrow a space between the third lens unit L3 and the fourth lens unit L4. Further, the zoom lens moves so as to widen a space between the fourth lens unit L4 and the fifth lens unit L5. The aperture stop SP moves integrally with the second lens unit L2.

At the telephoto end, compared to the case of the wide-angle end, the second lens unit L2, the third lens unit L3, and the fourth lens unit L4 are located on the object side, and the first lens unit L1 is located on the image side. The first lens unit L1 moves with a locus convex toward the image side. Focus adjustment (focusing) is performed by appropriately moving the third lens unit L3 (focus lens unit). As described above, the image capturing optical system of this embodiment achieves reduction in size and increase in variable power at the same time by properly moving each lens unit.

An optical system A is located closest to the object side of the image capturing optical system and moves integrally with the first lens unit L1 during zooming. The optical system A is composed of two optical lenses of a lens a1 (first lens) and a lens a2 (second lens) in order from the object side. Each of the image side surface (first aspherical surface) of the lens a1 and the image side surface (second aspherical surface) of the lens a2 has an aspherical shape including a plurality of concave portions and convex portions formed in a rotation direction with respect to the optical axis OA (X axis).

Figure 18:
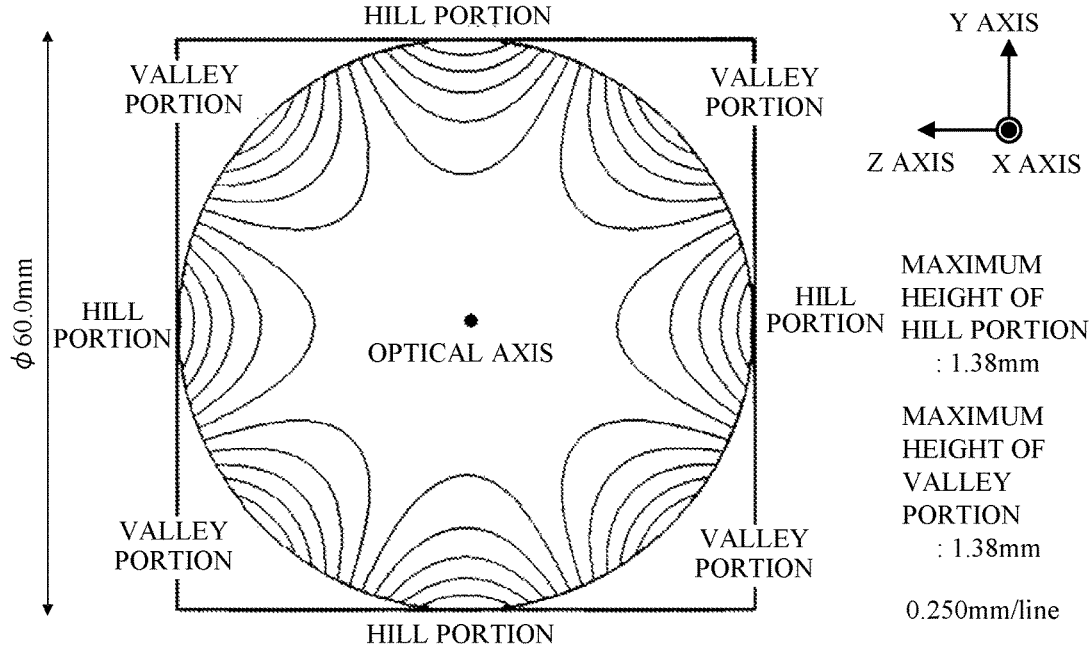
FIG. 18 is an image side surface shape of a lens a1 in Embodiment 4 (reference state).
Figure 19A:
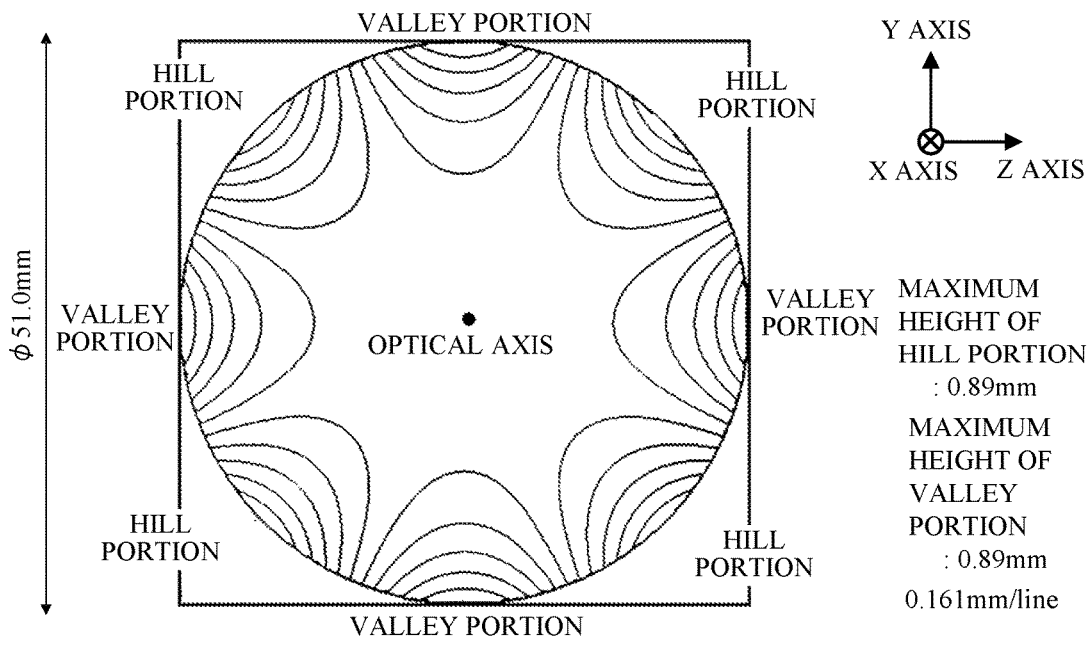
FIG. 19A is an object side surface shape of a lens a2 in Embodiment 4 (reference state).

Next, referring to FIG. 18 and FIGS. 19A to 19C, the image side surface shape of the lens a1 and the object side surface shape of the lens a2 in this embodiment will be described. FIGS. 18 and 19A illustrate the image side surface shape of the lens a1 and the object side surface shape of the lens a2 as contour maps, respectively, in the reference state. As illustrated in FIGS. 18 and 19A, the center portions (first region, or region near the center) of each of the lenses a1 and a2 are substantially planar. On the other hand, hill portions (convex portions) and valley portions (concave portions) are periodically formed alternately around the surface center (circumferential direction) in a peripheral portion (second region) of the lenses a1 and a2. Furthermore, the positional relationship (phase state) of the lenses a1 and a2 illustrated in FIGS. 18 and 19A is defined as a reference state. In the reference state, phases (phase states in the circumferential direction) with respect to the center of the surface of the hill portions and the valley portions of the lenses a1 and a2 are arranged to be aligned. In the reference state, the surface centers of the lenses a1 and a2 and the position of the optical axis OA coincide with each other.

Figure 19B:
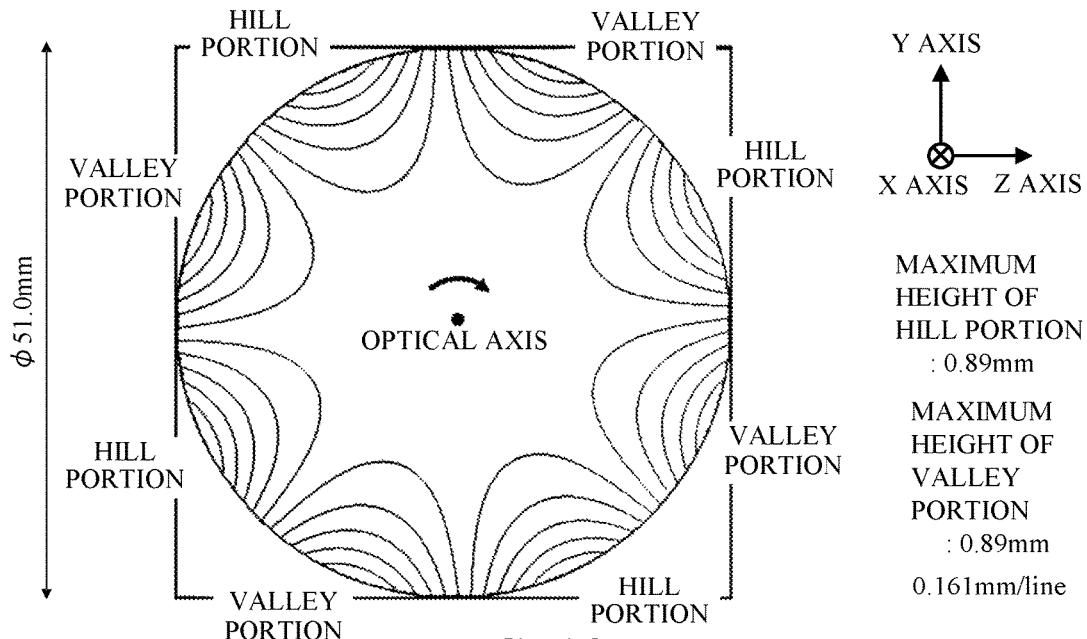
FIG. 19B is the object side surface shape of the lens a2 in Embodiment 4 (state rotated by 20 degrees from the reference state).
Figure 19C:
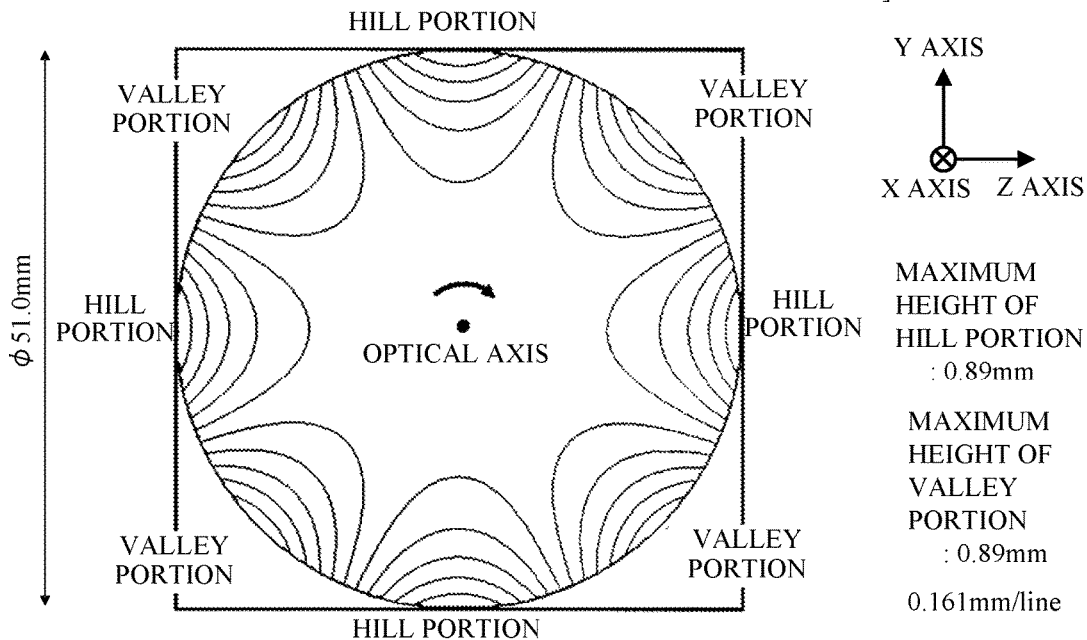
FIG. 19C is the object side surface shape of the lens a2 in Embodiment 4 (state rotated by 45 degrees from the reference state).
Figure 25A:
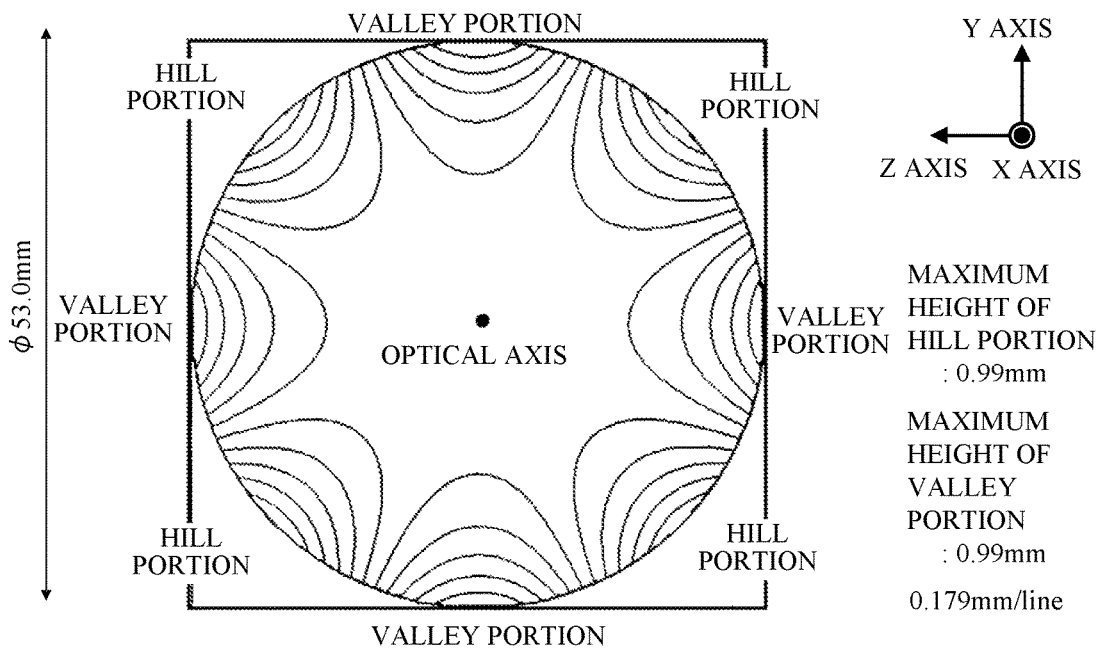
FIG. 25A is an image side surface shape of a lens a2 in Embodiment 5 (reference state).

FIG. 19B illustrates a contour map of the object side surface shape of the lens a2 in a state where the lens a2 is rotated around the optical axis by 20 degrees with respect to the reference state. FIG. 25C illustrates a contour map of the object side surface shape of the lens a2 in a state where the lens a2 is rotated around the optical axis by 45 degrees with respect to the reference state.

Figure 20A:
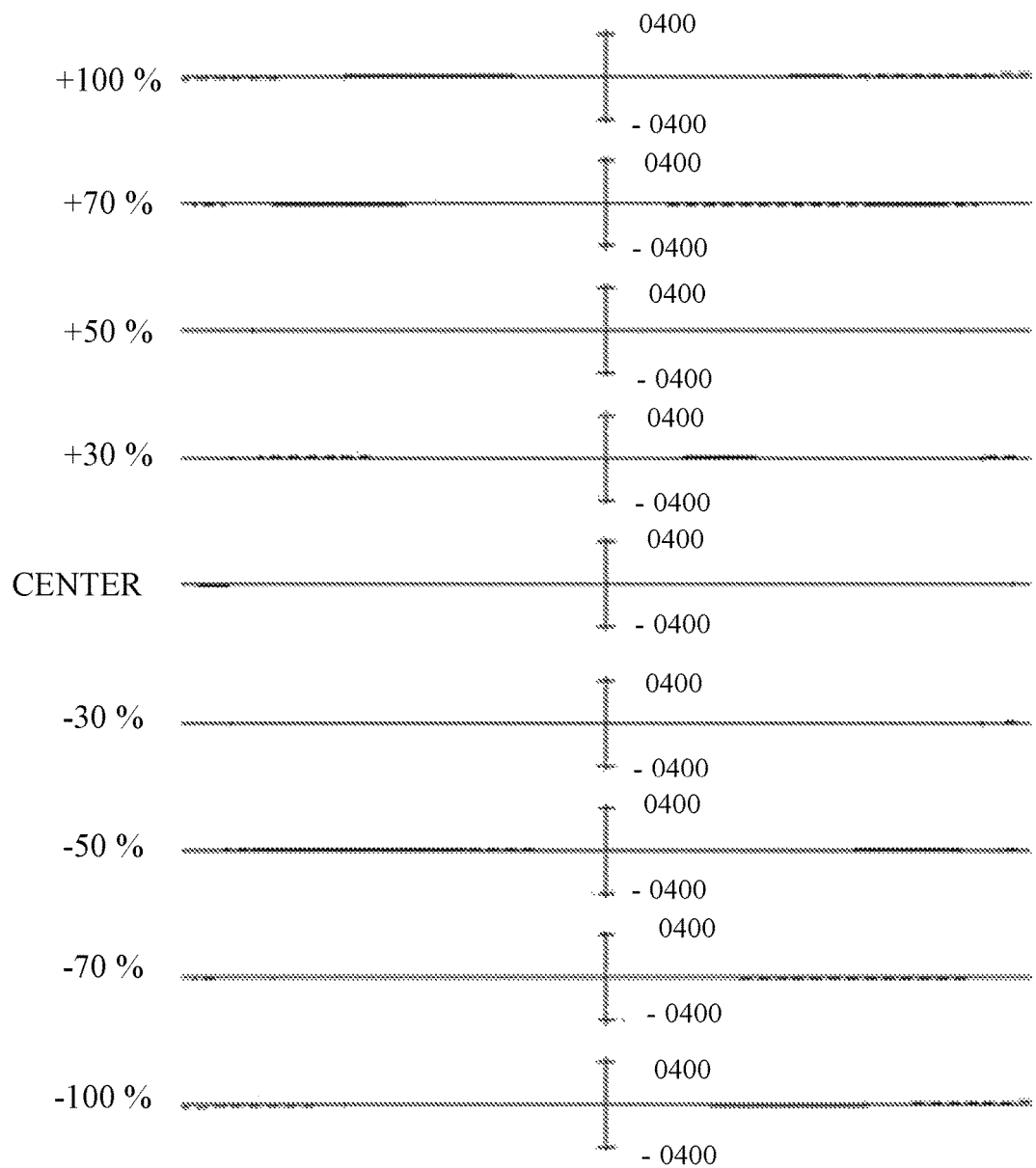
FIG. 20A is a lateral aberration diagram at the wide-angle end in Embodiment 4 (reference state).
Figure 20B:
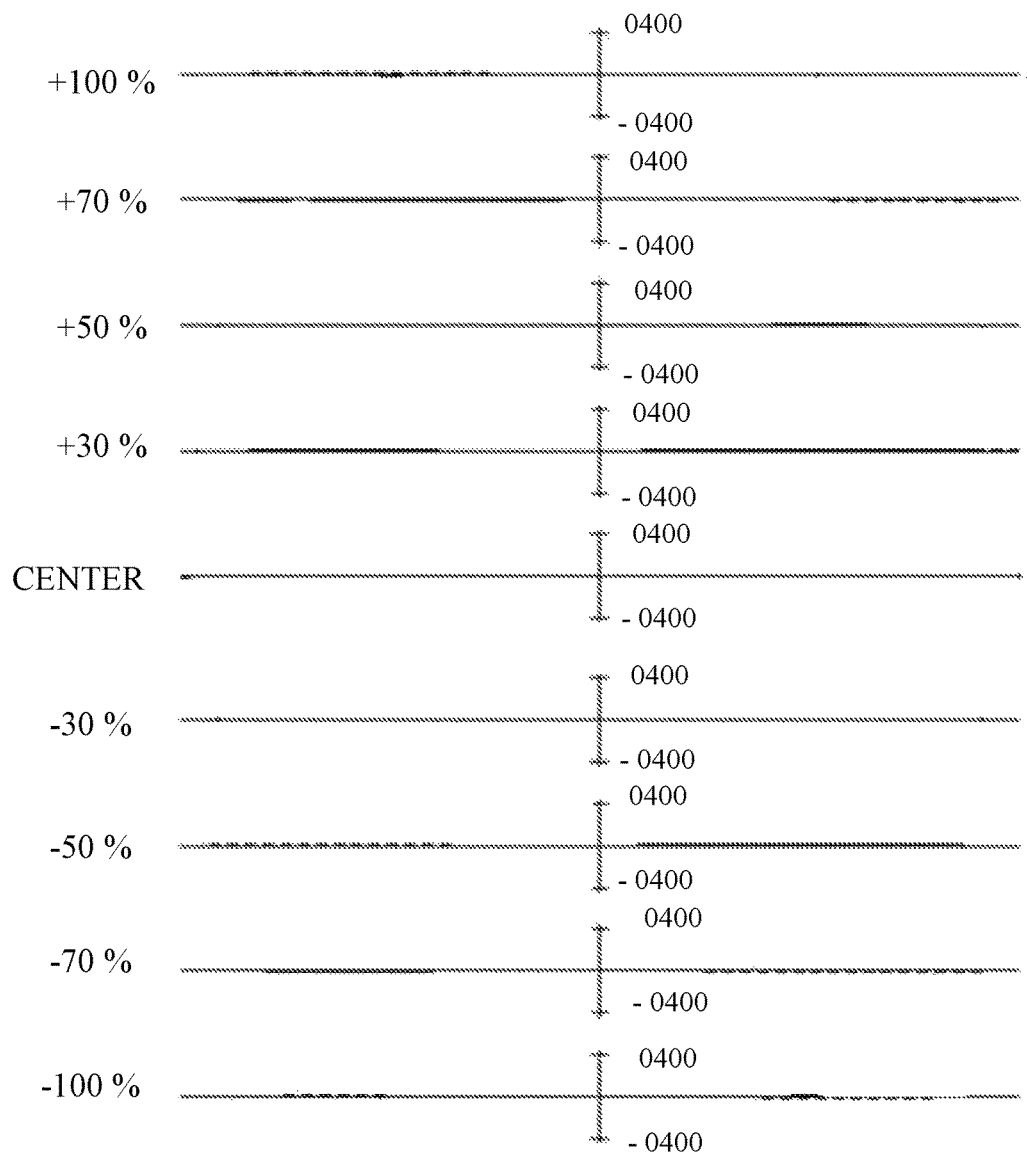
FIG. 20B is a lateral aberration diagram at the telephoto end in Embodiment 4 (reference state).
Figure 21A:
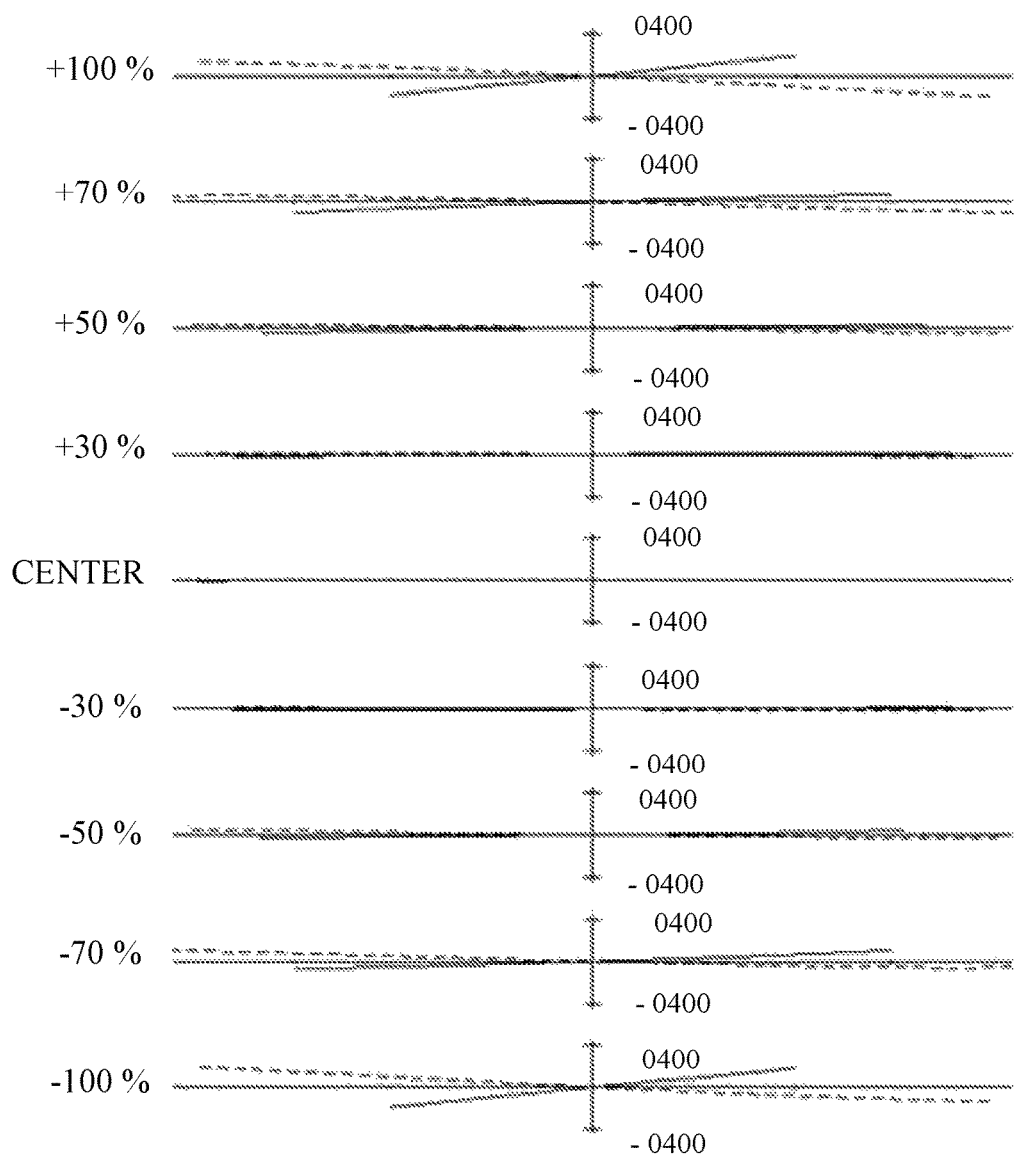
FIG. 21A is a lateral aberration diagram at the wide-angle end in Embodiment 4 (state where the lens a2 is rotated by 20 degrees from the reference state).
Figure 21B:
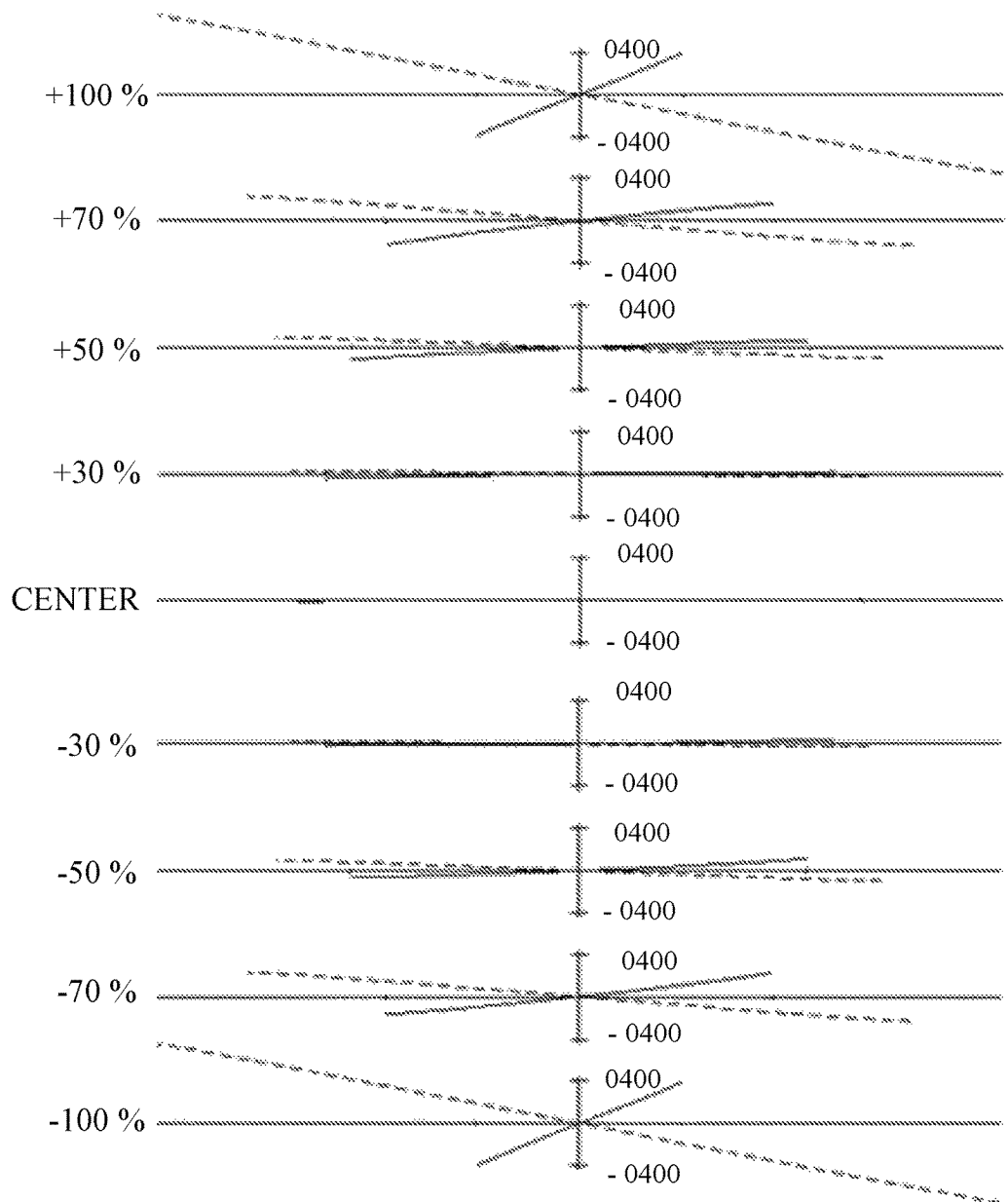
FIG. 21B is a lateral aberration diagram at the wide-angle end in Embodiment 4 (state where the lens a2 is rotated by 45 degrees from the reference state).
Figure 22:
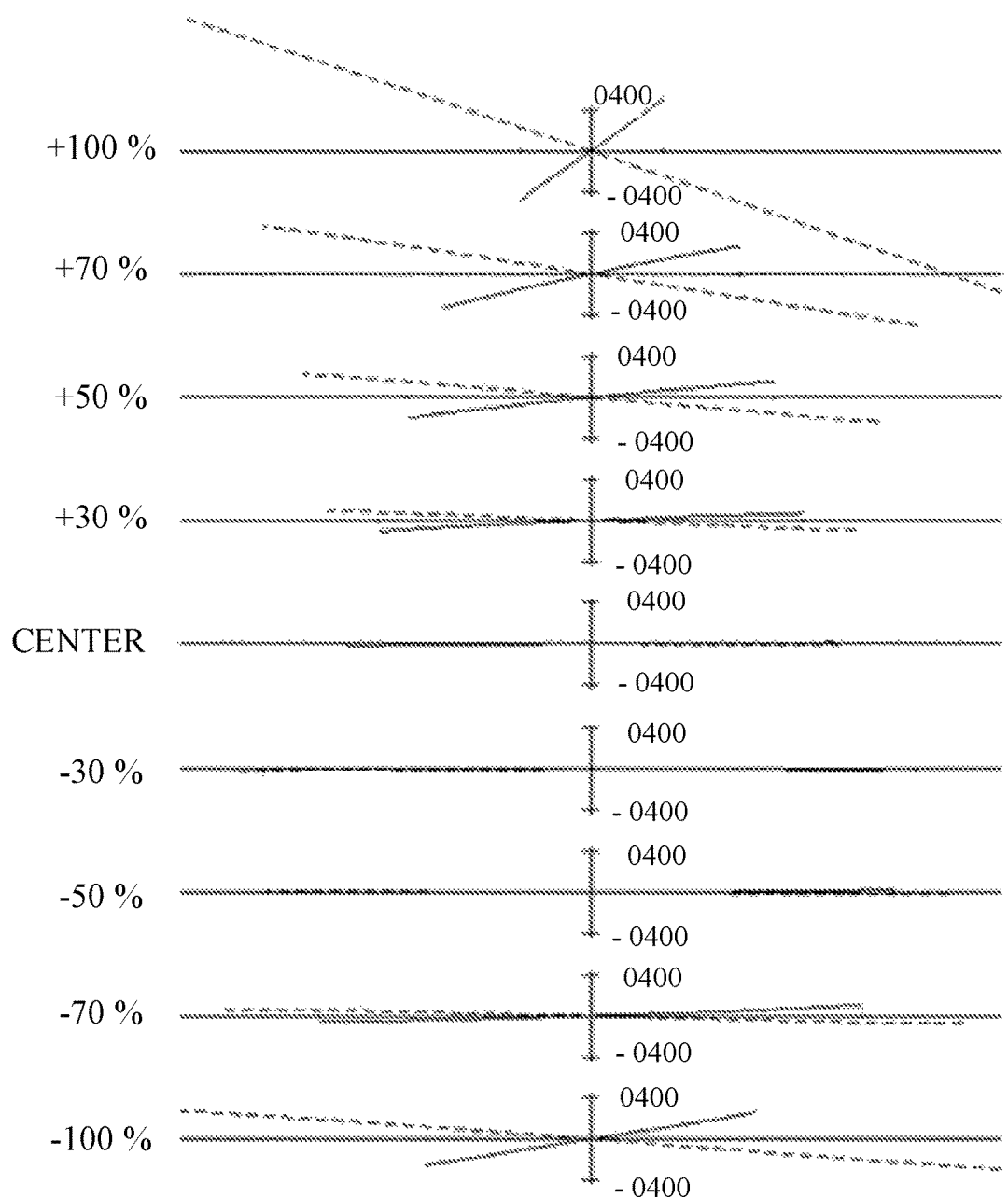
FIG. 22 is a lateral aberration diagram at the wide-angle end in Embodiment 4 (state where the lens a2 is rotated by 45 degrees from the reference state and an optical system A is integrally moved by +6 mm in the Y axis direction).

FIG. 20A is a lateral aberration diagram at the wide-angle end in the reference state. FIG. 20B is a lateral aberration diagram at the telephoto end in the reference state. FIG. 21A is a lateral aberration diagram at the wide-angle end in a state where the lens a2 is rotated by 20 degrees around the optical axis with respect to the reference state. FIG. 21B is a lateral aberration diagram at the wide-angle end in a state where the lens a2 is rotated by 45 degrees around the optical axis with respect to the reference state. FIG. 22 is a lateral aberration diagram at the wide-angle end in a state where the lens a2 is rotated by 45 degrees around the optical axis with respect to the reference state and the optical system A (lenses a1 and a2) is moved by +6 mm in a Y axis direction with respect to the image capturing optical system (the other lens units constituting the image capturing optical system).

Embodiment 5

Figure 23:
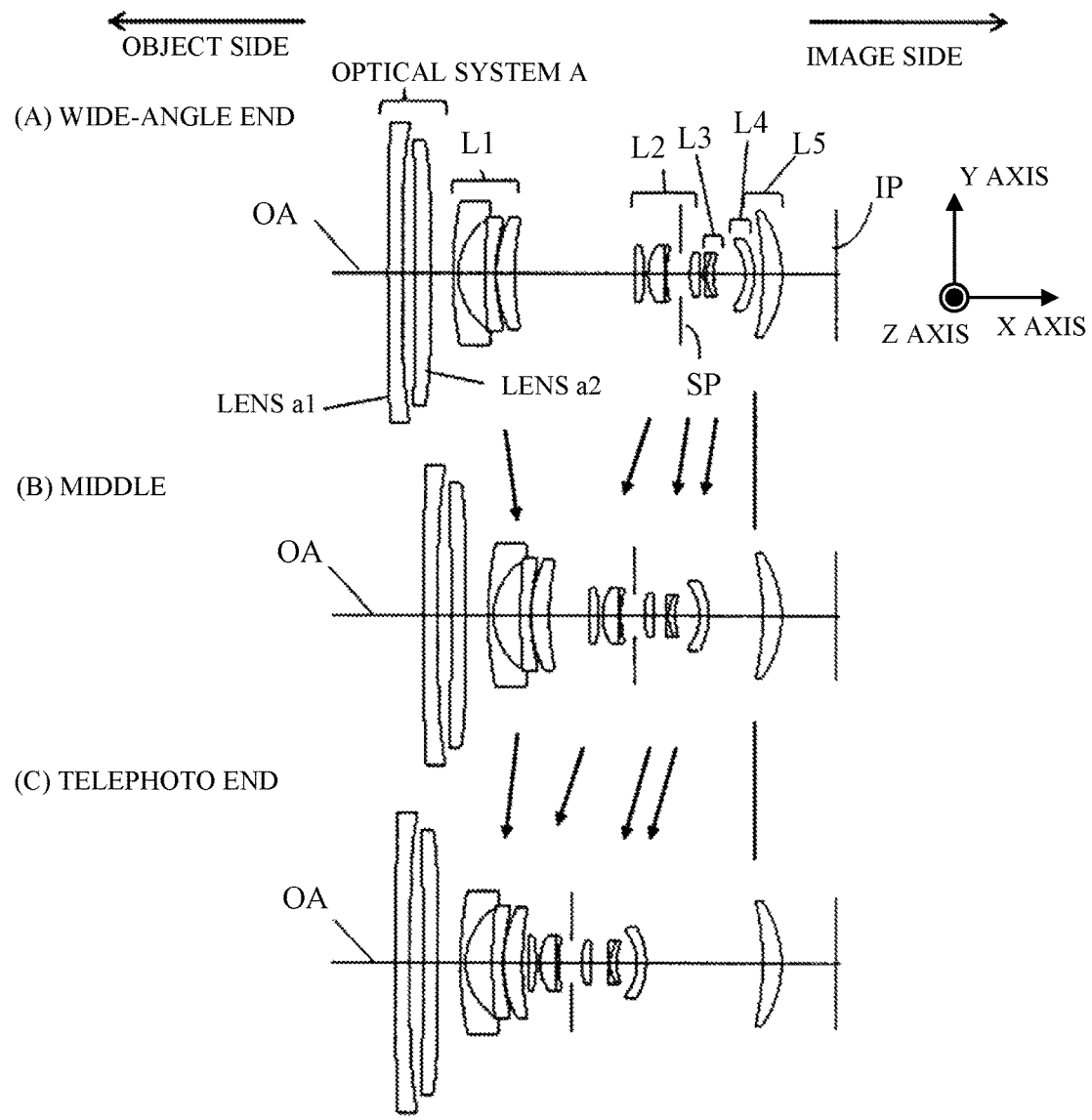
FIG. 23 is a cross-sectional view of lenses of an image capturing optical system in Embodiment 5.

Next, referring to FIG. 23, an image capturing optical system in Embodiment 5 (Numerical example 5) of the present invention will be described. FIG. 23 is a cross-sectional view of lenses at (A) the wide-angle end, (B) at the middle position, and (C) at the telephoto end of the zoom position of the image capturing optical system in Numerical example 5. The image capturing optical system of this embodiment is a zoom lens having a zoom ratio of 2.82 and an aperture ratio of about 3.55 to 6.44.

In the cross-sectional view of lenses of FIG. 23, symbol L1 denotes a first lens unit having a negative refractive power, symbol L2 denotes a second lens unit having a positive refractive power, symbol L3 denotes a third lens unit having a negative refractive power, symbol L4 denotes a fourth lens unit having a negative refractive power, and symbol L5 denotes a fifth lens unit having a positive refractive power.

In the zoom lens of FIG. 23, at the time of zooming, at the telephoto end relative to the wide-angle end, the zoom lens (the first lens unit L1, the second lens unit L2, the third lens unit L3, and the fourth lens unit L4) moves so as to narrow a space between the first lens unit L1 and the second lens unit L2. Further, the zoom lens moves so as to widen a space between the second lens unit L2 and the third lens unit L3 and moves so as to narrow a space between the third lens unit L3 and the fourth lens unit L4. Further, the zoom lens moves so as to widen a space between the fourth lens unit L4 and the fifth lens unit L5. The aperture stop SP moves integrally with the second lens unit L2.

At the telephoto end, compared to the case of the wide-angle end, the second lens unit L2, the third lens unit L3, and the fourth lens unit L4 are located on the object side, and the first lens unit L1 is located on the image side. The first lens unit L1 moves with a locus convex toward the image side. Focus adjustment (focusing) is performed by appropriately moving the third lens unit L3 (focus lens unit). As described above, the image capturing optical system of this embodiment achieves reduction in size and increase in variable power at the same time by properly moving each lens unit.

An optical system A is located closest to the object side of the image capturing optical system and moves integrally with the first lens unit L1 during zooming. The optical system A is composed of two optical lenses of a lens a1 (first lens) and a lens a2 (second lens) in order from the object side. Each of the image side surface (first aspherical surface) of the lens a1 and the image side surface (second aspherical surface) of the lens a2 has an aspherical shape including a plurality of concave portions and convex portions formed in a rotation direction with respect to the optical axis OA (X axis).

Figure 24:
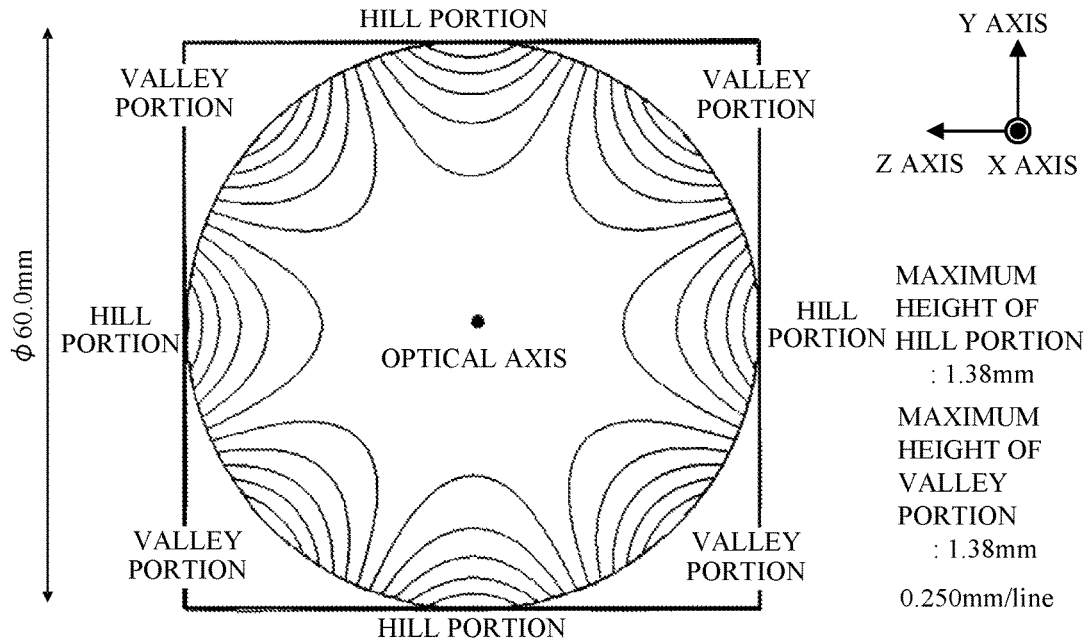
FIG. 24 is an image side surface shape of a lens a1 in Embodiment 5 (reference state).

Next, referring to FIG. 24 and FIGS. 25A to 25C, the image side surface shape of the lens a1 and the image side surface shape of the lens a2 in this embodiment will be described. FIGS. 24 and 25A illustrate the image side surface shape of the lens a1 and the image side surface shape of the lens a2 as contour maps, respectively, in the reference state. As illustrated in FIGS. 24 and 25A, the center portions (first region, or region near the center) of each of the lenses a1 and a2 are substantially planar. On the other hand, hill portions (convex portions) and valley portions (concave portions) are periodically formed alternately around the surface center (circumferential direction) in a peripheral portion (second region) of the lenses a1 and a2. Furthermore, the positional relationship (phase state) of the lenses a1 and a2 illustrated in FIGS. 24 and 25A is defined as a reference state. In the reference state, phases (phase states in the circumferential direction) with respect to the center of the surface of the hill portions and the valley portions of the lenses a1 and a2 are arranged to be aligned. In the reference state, the surface centers of the lenses a1 and a2 and the position of the optical axis OA coincide with each other.

Figure 25B:
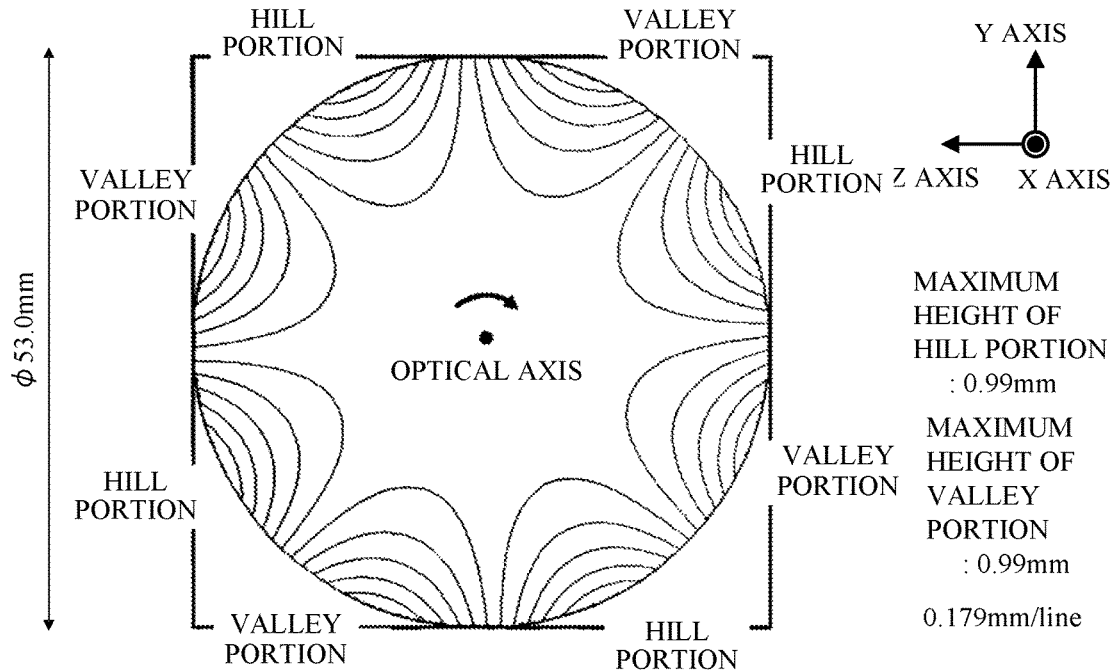
FIG. 25B is the image side surface shape of the lens a2 in Embodiment 5 (state rotated by 20 degrees from the reference state).
Figure 25C:
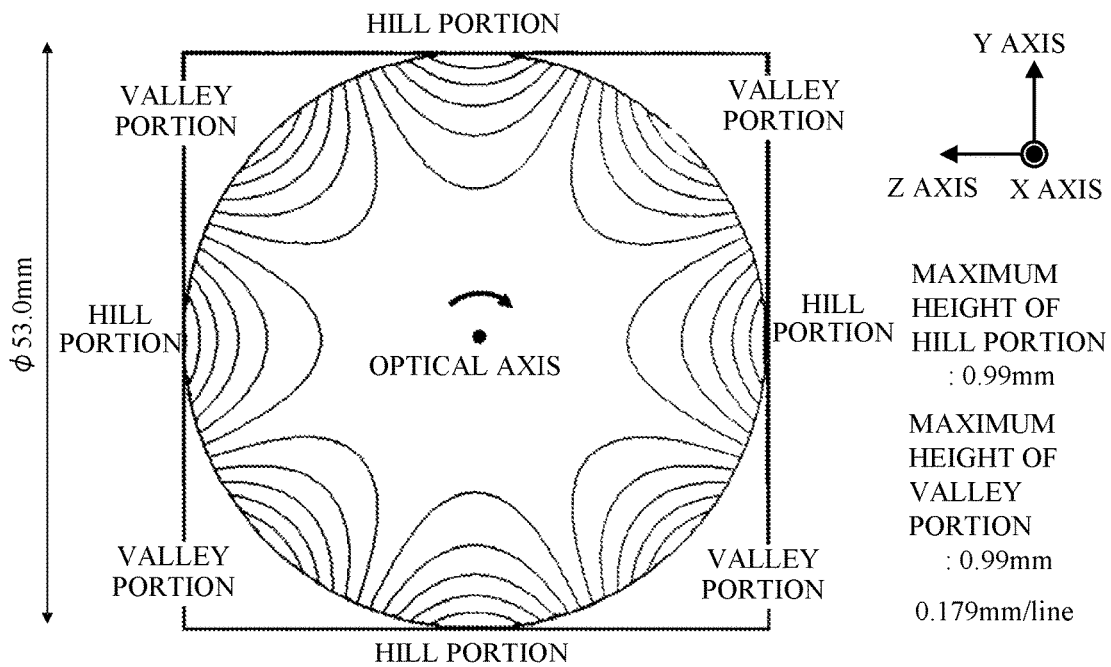
FIG. 25C is the image side surface shape of the lens a2 in Embodiment 5 (state rotated by 45 degrees from the reference state).

FIG. 25B illustrates a contour map of the image side surface shape of the lens a2 in a state where the lens a2 is rotated around the optical axis by 20 degrees with respect to the reference state. FIG. 25C illustrates a contour map of the image side surface shape of the lens a2 in a state where the lens a2 is rotated around the optical axis by 45 degrees with respect to the reference state. The rotation direction is indicated by an arrow in the drawing.

Figure 26A:
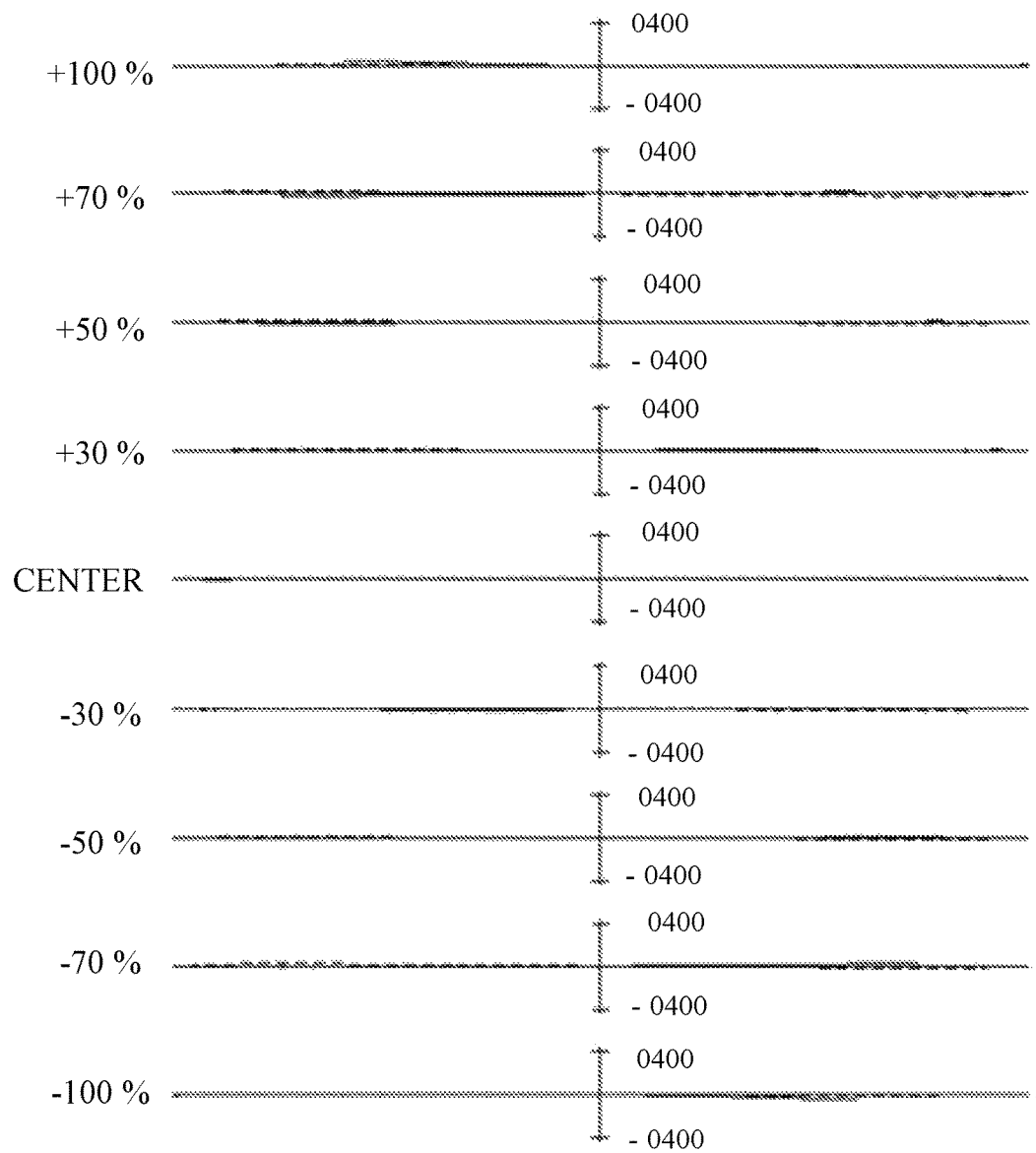
FIG. 26A is a lateral aberration diagram at the wide-angle end in Embodiment 5 (reference state).
Figure 26B:
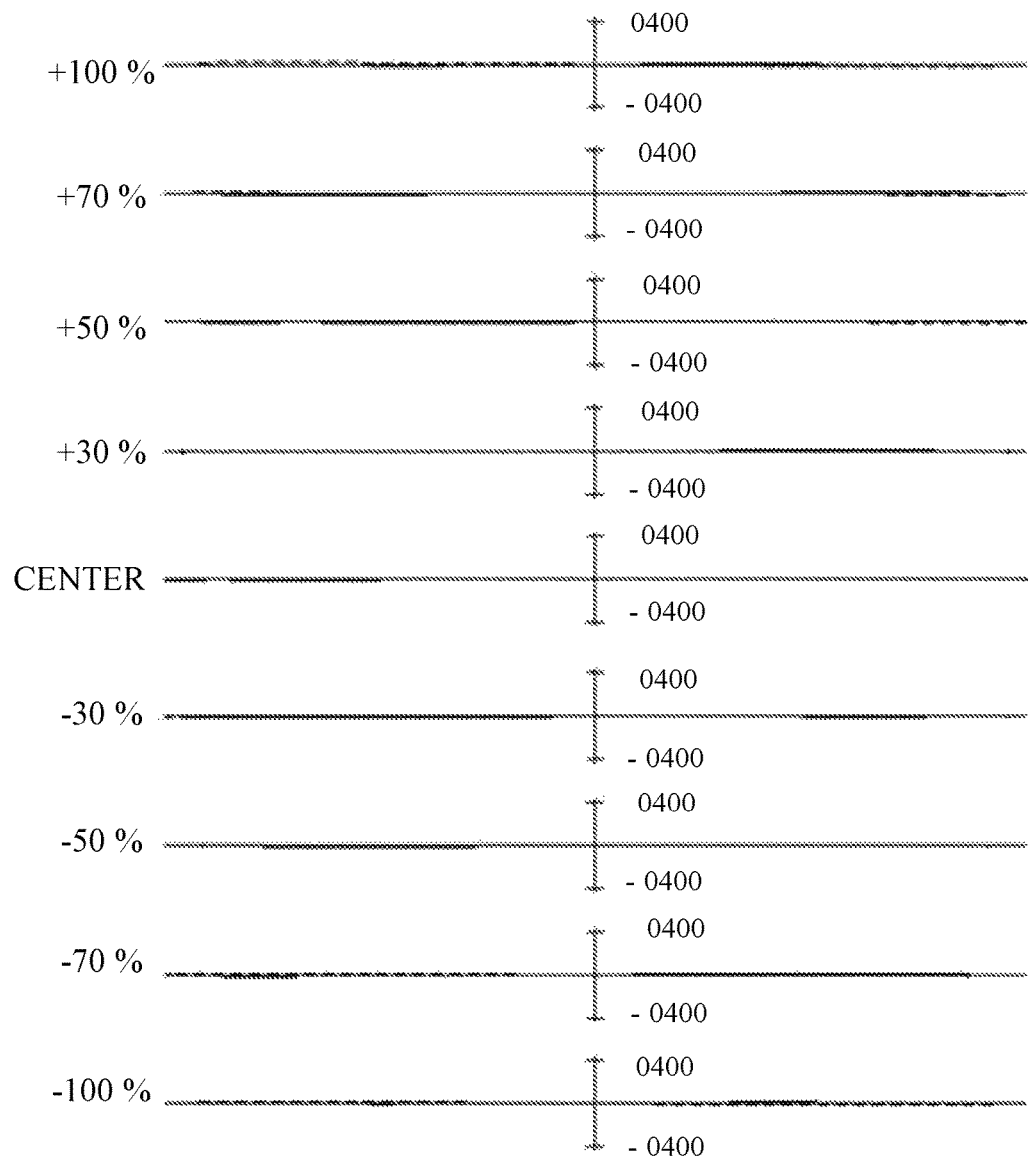
FIG. 26B is a lateral aberration diagram at the telephoto end in Embodiment 5 (reference state).
Figure 27A:
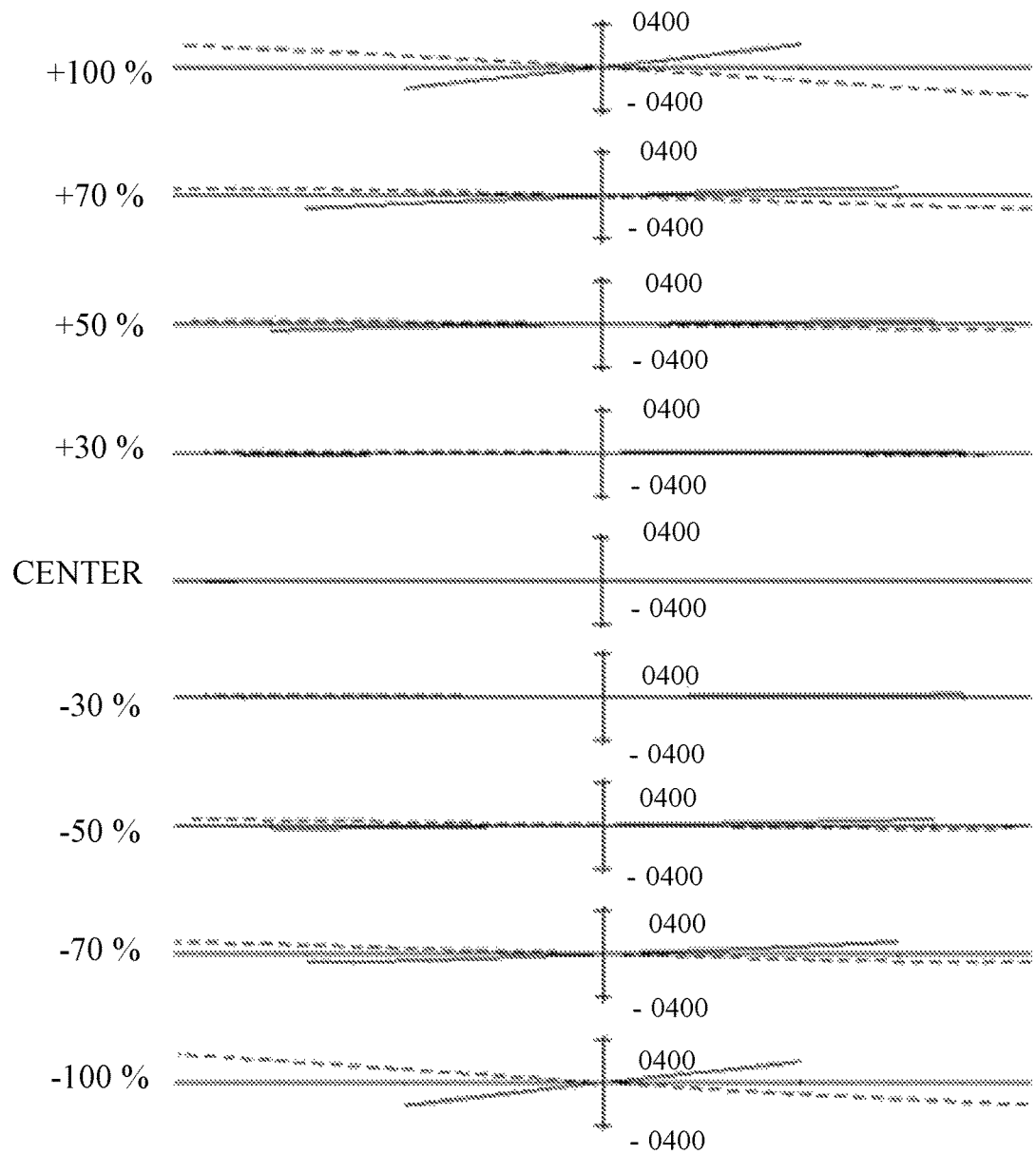
FIG. 27A is a lateral aberration diagram at the wide-angle end in Embodiment 5 (state where the lens a2 is rotated by 20 degrees from the reference state).
Figure 27B:
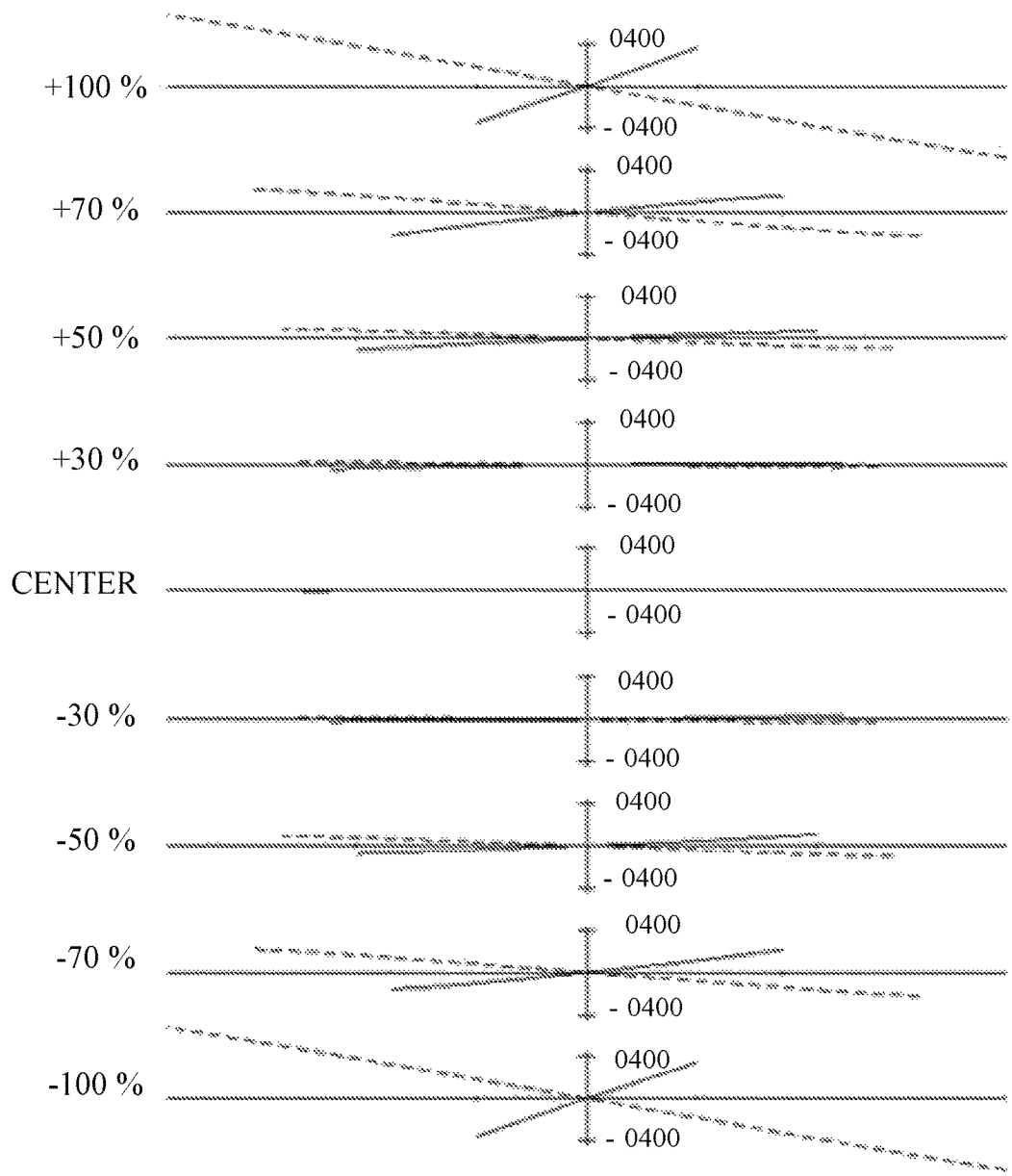
FIG. 27B is a lateral aberration diagram at the wide-angle end in Embodiment 5 (state where the lens a2 is rotated by 45 degrees from the reference state).

FIG. 26A is a lateral aberration diagram at the wide-angle end in the reference state. FIG. 26B is a lateral aberration diagram at the telephoto end in the reference state. FIG. 27A is a lateral aberration diagram at the wide-angle end in a state where the lens a2 is rotated around the optical axis by 20 degrees with respect to the reference state. FIG. 27B is a lateral aberration diagram at the wide-angle end in a state where the lens a2 is rotated around the optical axis by 45 degrees with respect to the reference state.

Embodiment 6

Figure 28:
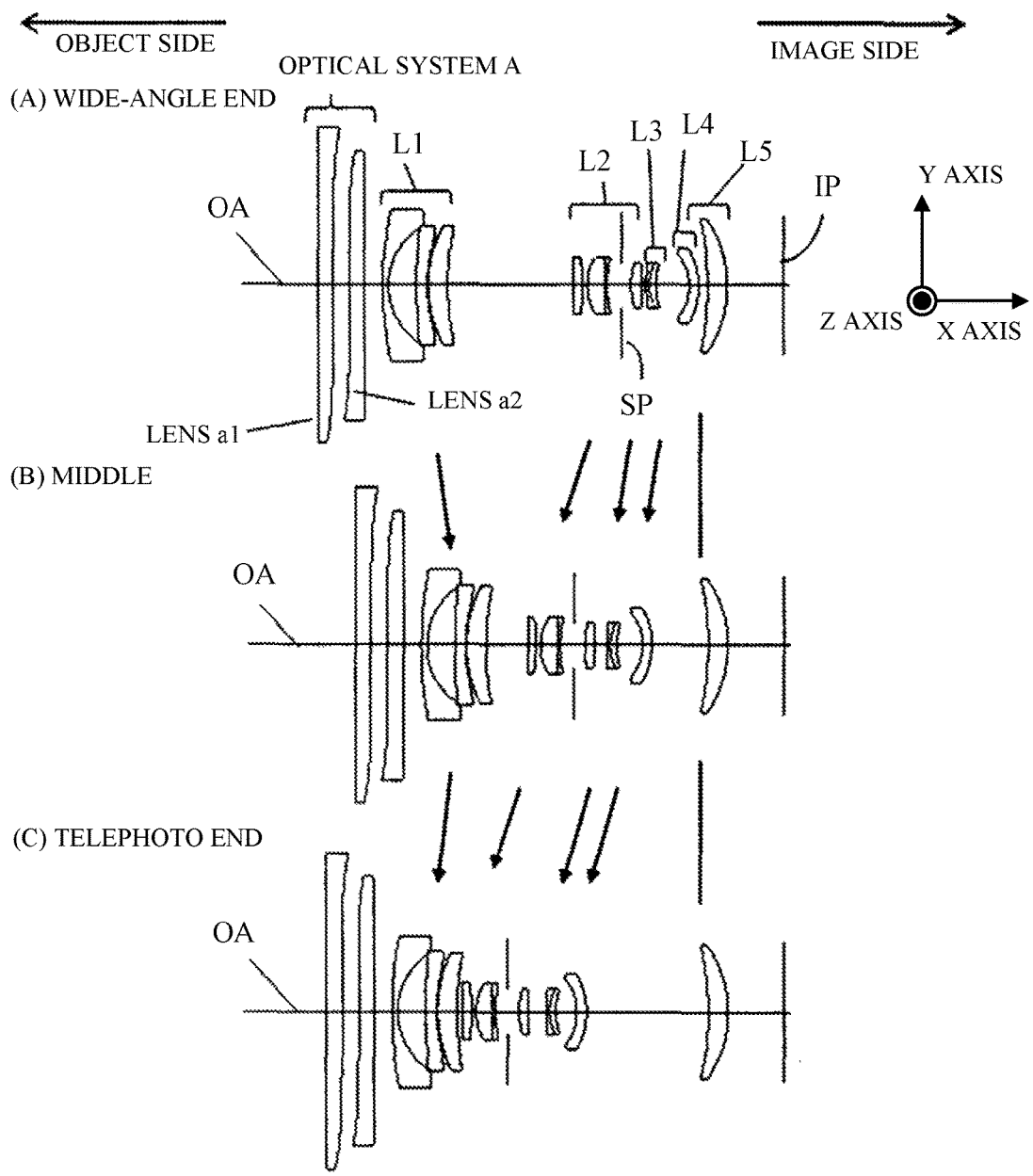
FIG. 28 is a cross-sectional view of lenses of an image capturing optical system in Embodiment 6.

Next, referring to FIG. 28, an image capturing optical system in Embodiment 6 (Numerical example 6) of the present invention will be described. FIG. 28 is a cross-sectional view of lenses (A) at the wide-angle end, (B) at the middle position, and (C) at the telephoto end of the zoom position of the image capturing optical system of Numerical example 6. The image capturing optical system of this embodiment is a zoom lens having a zoom ratio of 2.83 and an aperture ratio of about 3.55 to 6.44.

In the cross-sectional view of the lenses of FIG. 28, symbol L1 denotes a first lens unit having a negative refractive power, symbol L2 denotes a second lens unit having a positive refractive power, symbol L3 denotes a third lens unit having a negative refractive power, symbol L4 denotes a fourth lens unit having a negative refractive power, and symbol L5 denotes a fifth lens unit having a positive refractive power.

In the zoom lens of FIG. 28, at the time of zooming, at the telephoto end relative to the wide-angle end, the zoom lens (the first lens unit L1, the second lens unit L2, the third lens unit L3, and the fourth lens unit L4) moves so as to narrow a space between the first lens unit L1 and the second lens unit L2. Further, the zoom lens moves so as to widen a space between the second lens unit L2 and the third lens unit L3 and moves so as to narrow a space between the third lens unit L3 and the fourth lens unit L4. Further, the zoom lens moves so as to widen a space between the fourth lens unit L4 and the fifth lens unit L5. The aperture stop SP moves integrally with the second lens unit L2.

At the telephoto end, compared to the case of the wide-angle end, the second lens unit L2, the third lens unit L3, and the fourth lens unit L4 are located on the object side, and the first lens unit L1 is located on the image side. The first lens unit L1 moves with a locus convex toward the image side. Focus adjustment (focusing) is performed by appropriately moving the third lens unit L3 (focus lens unit). As described above, the image capturing optical system of this embodiment achieves reduction in size and increase in variable power by appropriately moving each lens unit.

The optical system A is located closest to the object side of the image capturing optical system and moves integrally with the first lens unit L1 during zooming. The optical system A is composed of two optical lenses of a lens a1 (first lens) and a lens a2 (second lens) in order from the object side. Each of the image side surface (first aspherical surface) of the lens a1 and the object side surface (second aspherical surface) of the lens a2 has an aspherical surface shape including a plurality of concave portions and convex portions formed in the rotation direction with respect to the optical axis OA (X axis).

Figure 29:
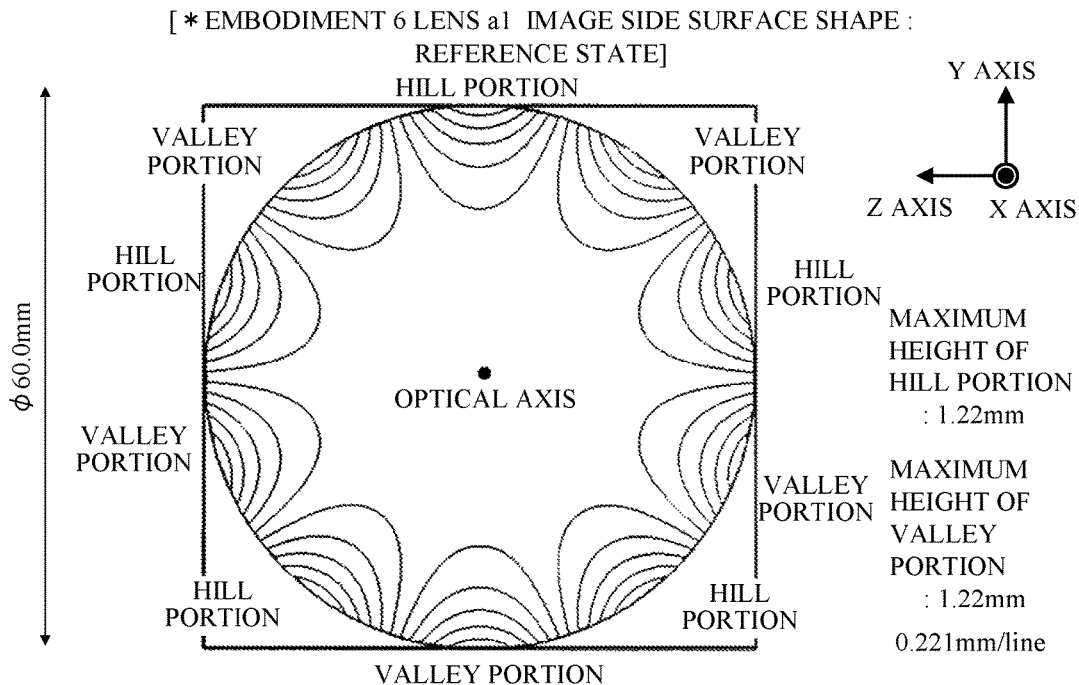
FIG. 29 is an image side surface shape of a lens a1 in Embodiment 6 (reference state).
Figure 30A:
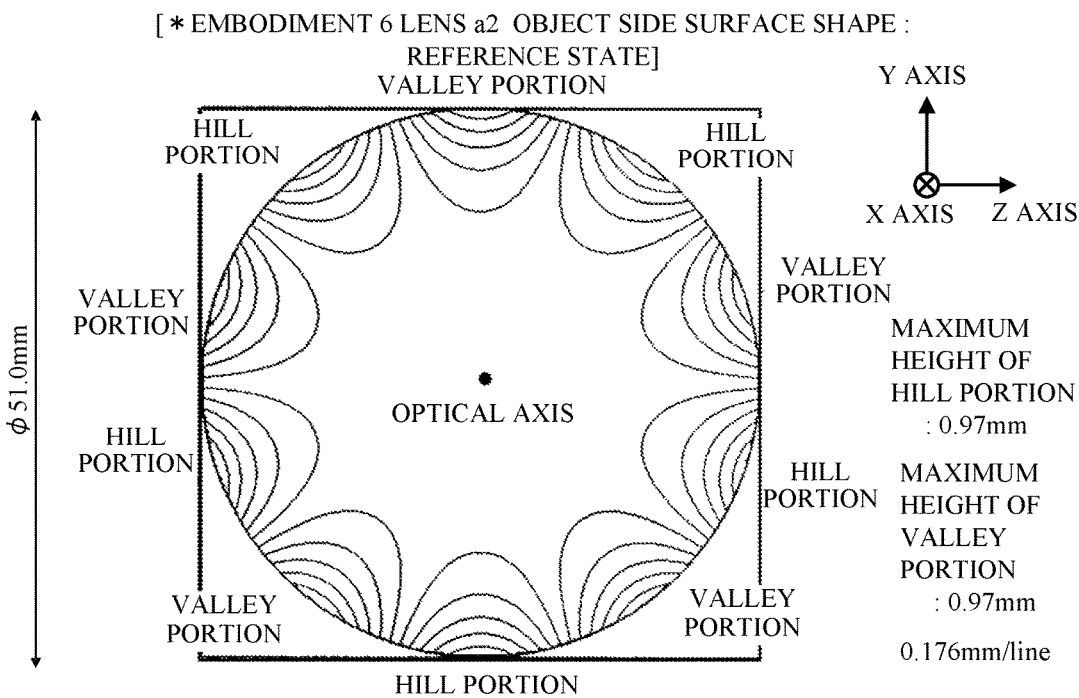
FIG. 30A is an object side surface shape of a lens a2 in Embodiment 6 (reference state).

Next, referring to FIG. 29 and FIGS. 30A to 30C, the image side surface shape of the lens a1 and the image side surface shape of the lens a2 in this embodiment will be described. FIGS. 29 and 30A illustrate the image side surface shape of the lens a1 and the image side surface shape of the lens a2 as contour maps, respectively, in the reference state. As illustrated in FIGS. 29 and 30A, the center portions (first region, or region near the center) of each of the lenses a1 and a2 are substantially planar. On the other hand, hill portions (convex portions) and valley portions (concave portions) are periodically formed alternately around the surface center (circumferential direction) in a peripheral portion (second region) of the lenses a1 and a2. Furthermore, the positional relationship (phase state) of the lenses a1 and a2 illustrated in FIGS. 29 and 30A is defined as a reference state. In the reference state, phases (phase states in the circumferential direction) with respect to the center of the surface of the hill portions and the valley portions of the lenses a1 and a2 are arranged to be aligned. In the reference state, the surface centers of the lenses a1 and a2 and the position of the optical axis OA coincide with each other.

Figure 30B:
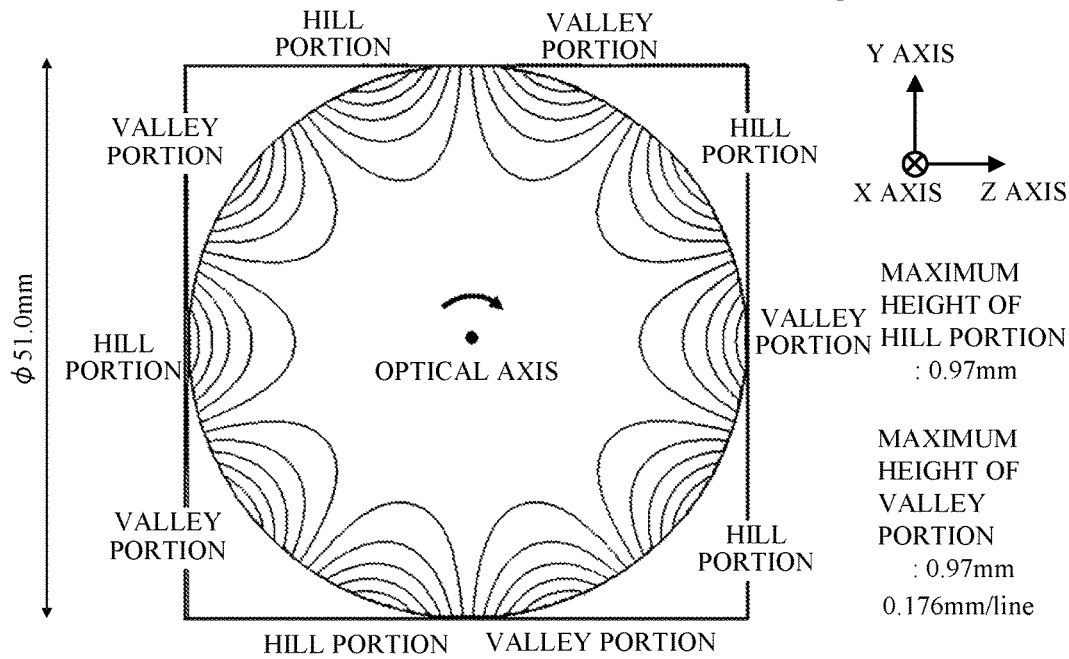
FIG. 30B is the object side surface shape of the lens a2 in Embodiment 6 (state rotated by 18 degrees from the reference state).
Figure 30C:
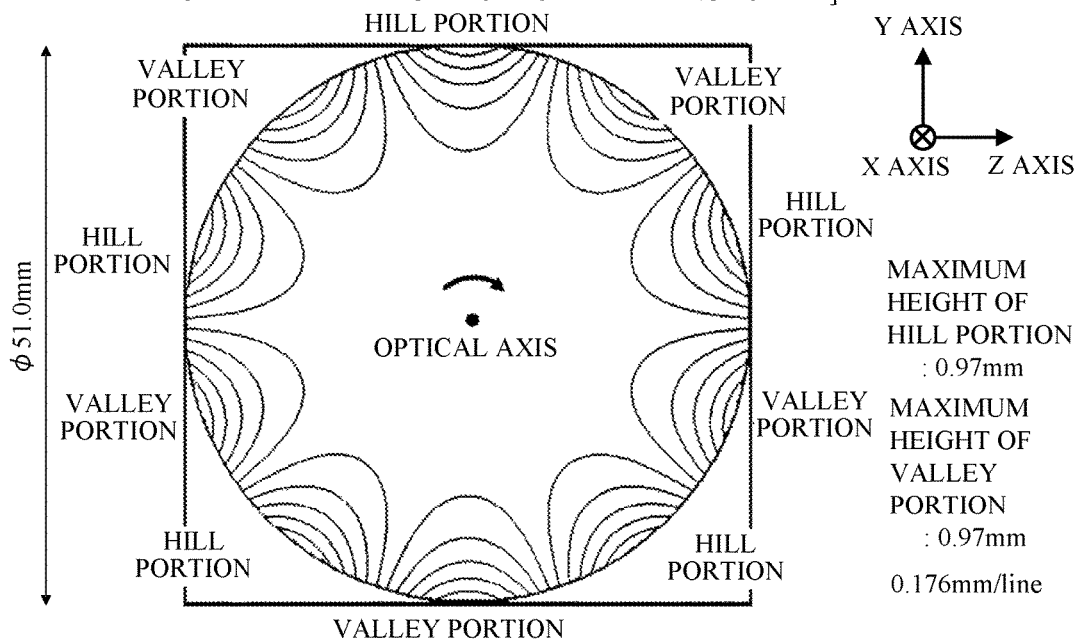
FIG. 30C is the object side surface shape of the lens a2 in Embodiment 6 (state rotated by 36 degrees from the reference state).

FIG. 30B illustrates a contour map of the object side surface shape of the lens a2 in a state where the lens a2 is rotated around the optical axis by 18 degrees with respect to the reference state. FIG. 30C illustrates a contour map of the object side surface shape of the lens a2 in a state where the lens a2 is rotated around the optical axis by 36 degrees with respect to the reference state. The rotation direction is indicated by an arrow in the drawing.

In this embodiment, each of the lenses a1 and a2 has five hill portions (convex portions) and five valley portions (concave portions) alternately formed in the circumferential direction of the lens. In this embodiment, when the lens a2 is rotated by 36 degrees around the optical axis with respect to the reference state, the position relation (phase state) of the lenses a1 and a2 is the most distant from the reference state (i.e., the state is the most different from the reference state). In other words, the hill portion of the lens a1 and the hill portion of the lens a2 correspond to each other, and the valley portion of the lens a1 and the valley portion of the lens a2 correspond to each other. In this state, the distance in the optical axis direction between the lens a1 and the lens a2 is the smallest at the position where the hill portion of the lens a1 and the hill portion of the lens a2 in the second region are opposed to (i.e., face) each other (smaller than the distance in the optical axis direction related to the first region). On the other hand, the distance between the lens a1 and the lens a2 in the optical axis direction is the largest at the position where the valley portion of the lens a1 and the valley portion of the lens a2 in the second area are opposed to (face) each other.

Figure 31A:
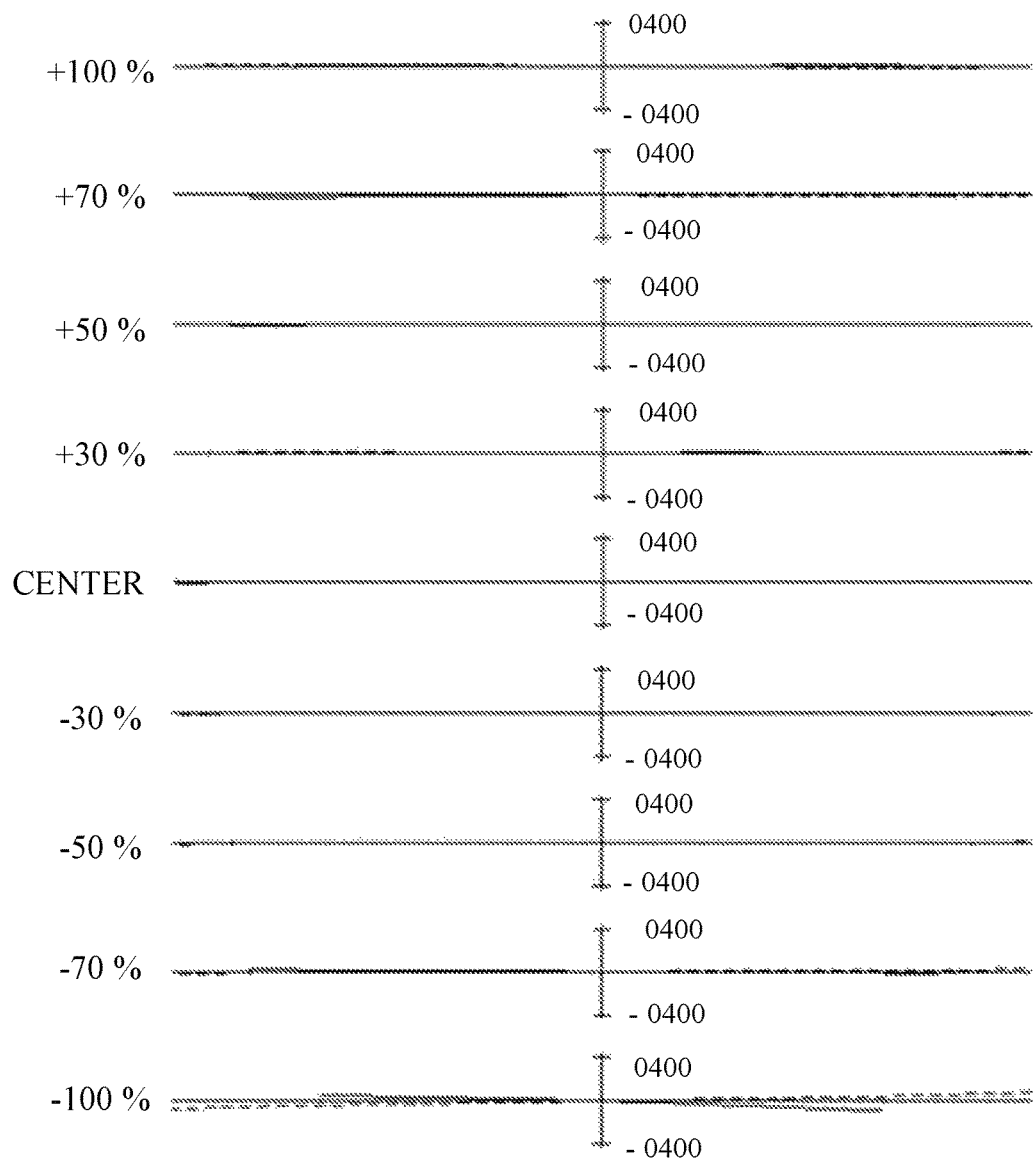
FIG. 31A is a lateral aberration diagram at the wide-angle end in Embodiment 6 (reference state).
Figure 31B:
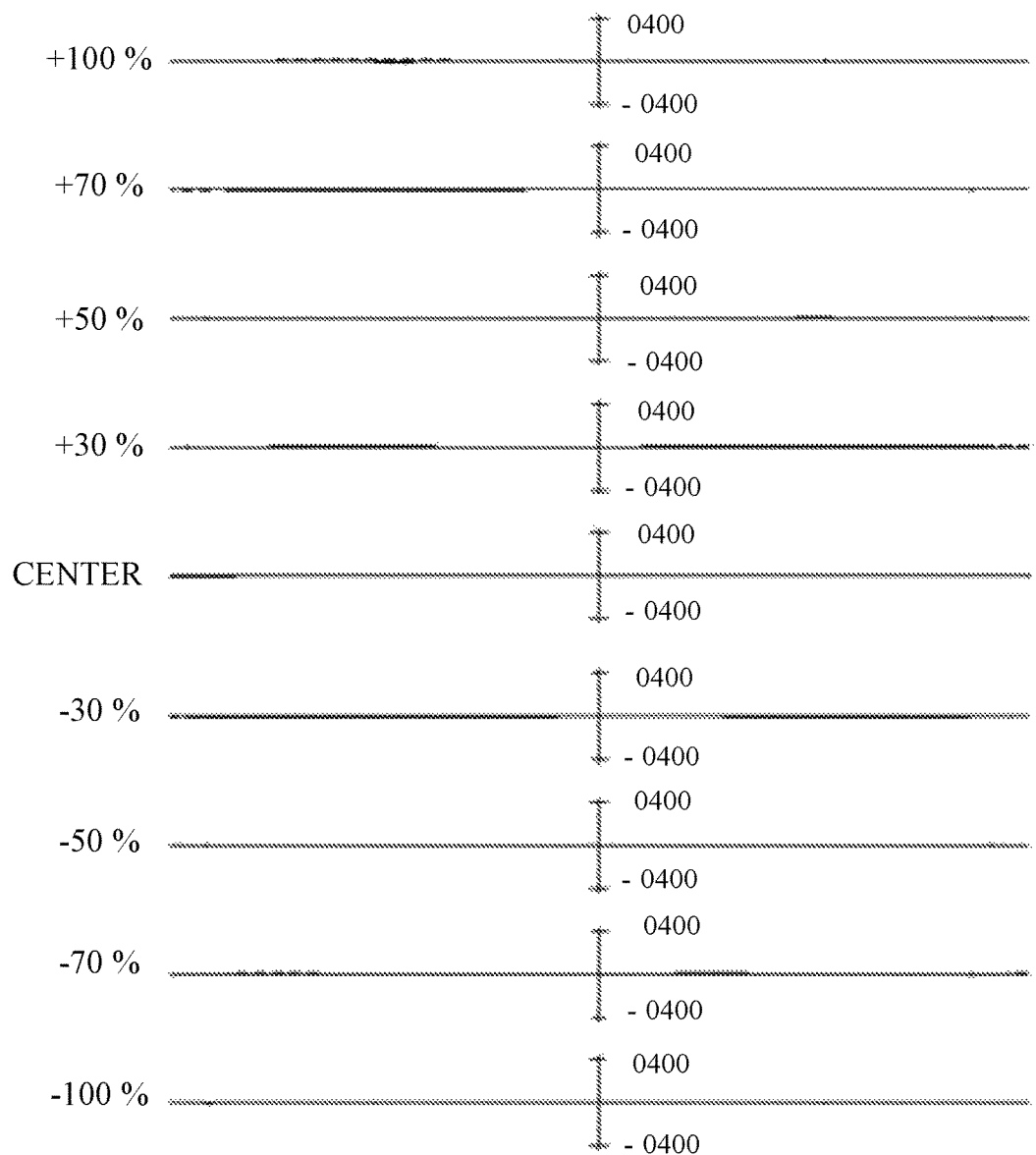
FIG. 31B is a lateral aberration diagram at the telephoto end in Embodiment 6 (reference state).
Figure 32A:
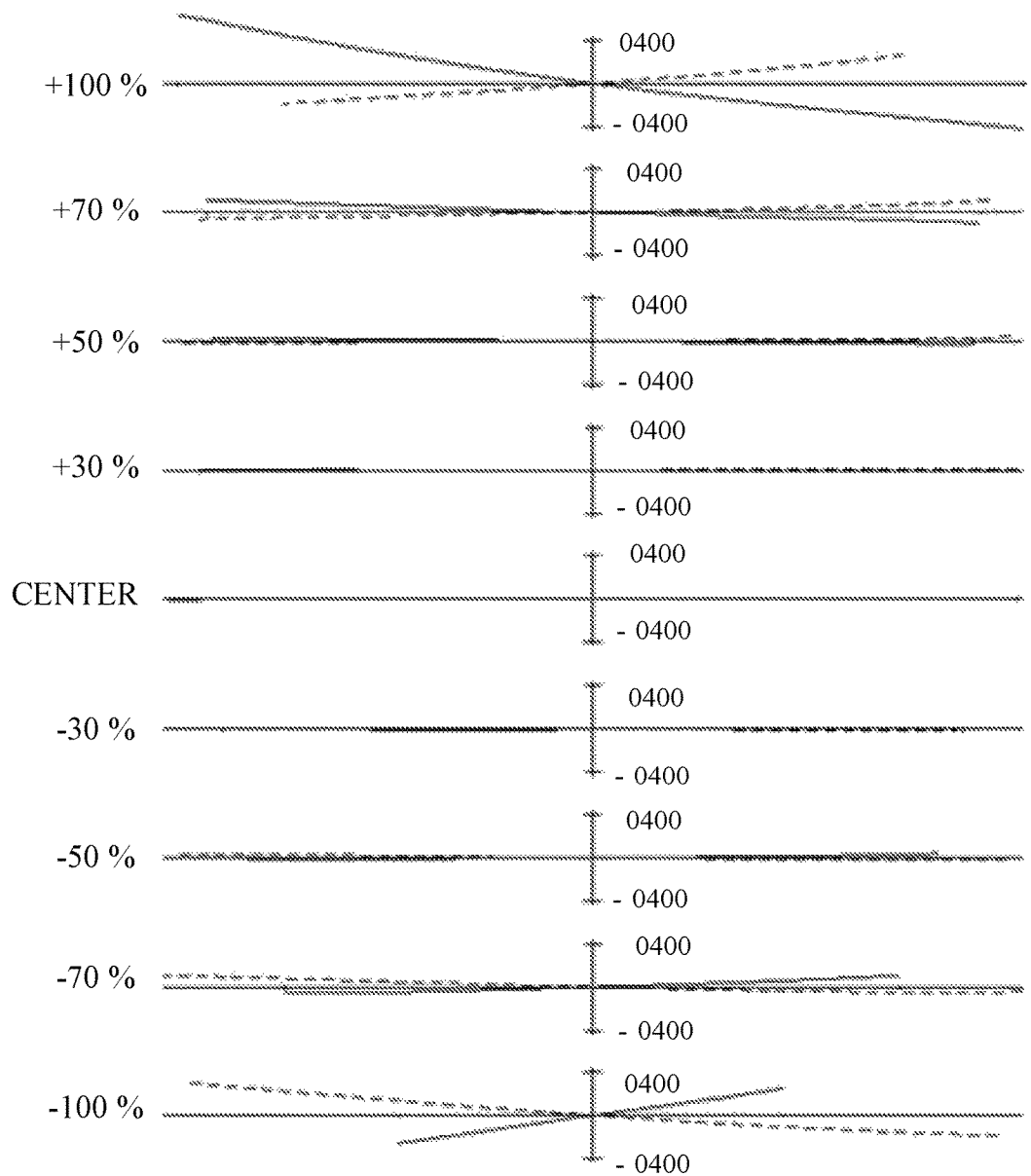
FIG. 32A is a lateral aberration diagram at the wide-angle end in Embodiment 6 (state where the lens a2 is rotated y 18 degrees from the reference state).
Figure 32B:
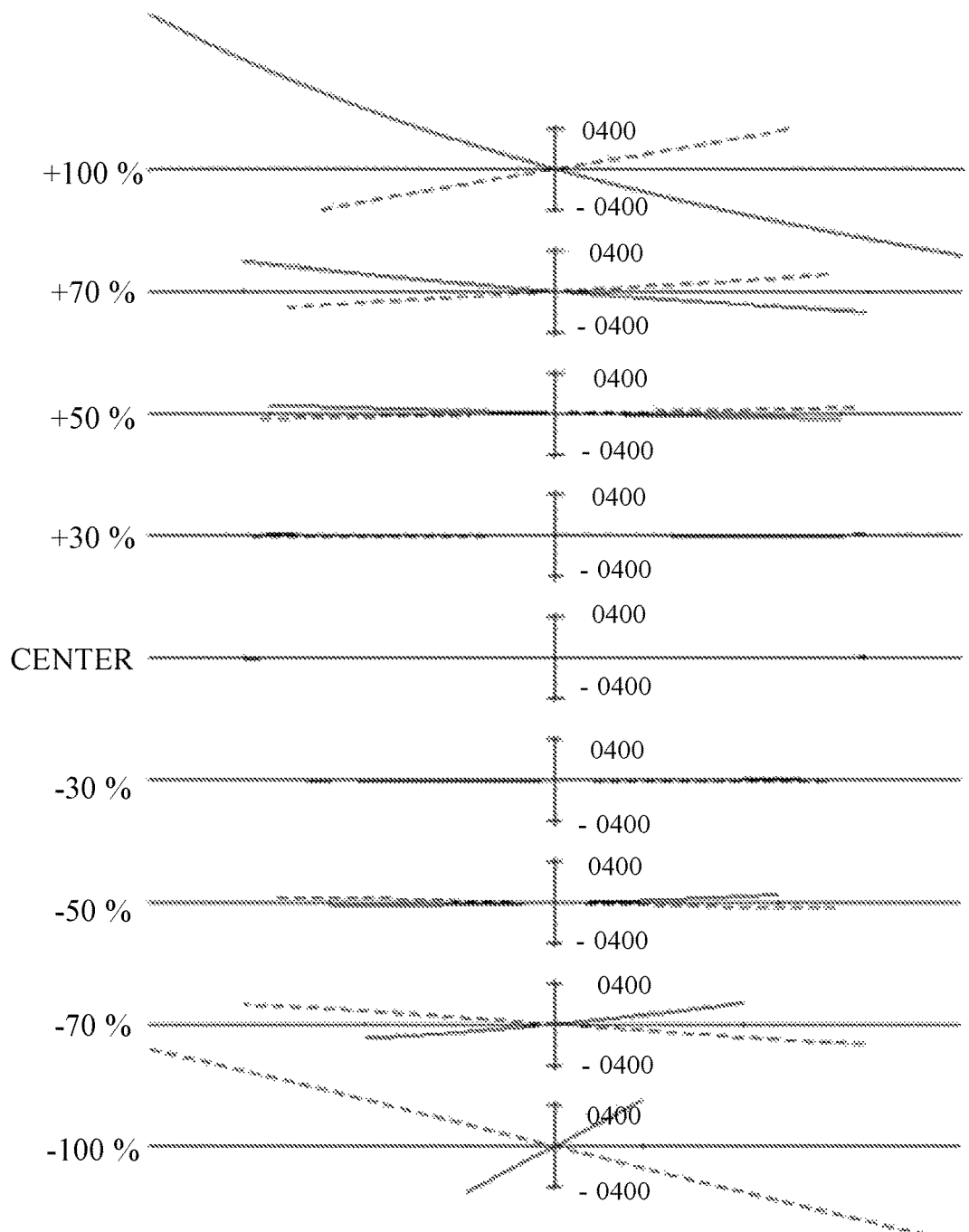
FIG. 32B is a lateral aberration diagram at the wide-angle end in Embodiment 6 (state where the lens a2 is rotated by 36 degrees from the reference state).

FIG. 31A is a lateral aberration diagram at the wide-angle end in the reference state. FIG. 31B is a lateral aberration diagram at the telephoto end in the reference state. FIG. 32A is a lateral aberration diagram at the wide-angle end in a state where the lens a2 is rotated around the optical axis by 18 degrees with respect to the reference state. FIG. 32B is a lateral aberration diagram at the wide-angle end in a state where the lens a2 is rotated around the optical axis by 36 degrees with respect to the reference state.

In each of the cross-sectional views of the lenses in each embodiment, symbol i indicates the order of each lens unit from the object side to the image side, and symbol Li denotes an i-th lens unit. The X axis, the Y axis, and the Z axis are defined as illustrated in each of the cross-sectional views and the contour maps. The optical axis OA is parallel to the X axis, and the traveling direction of light traveling from the object side to the image side is a positive direction. The lateral aberration diagram of each embodiment illustrates the aberration of each image height in the Y axis direction, and it illustrates an aberration diagram for d line at the image height of +100%, +70%, +50%, +30%, center, −30%, −50%, −70%, and −100%. A dashed line represents a sagittal image plane and a solid line represents a meridional image plane.

Next, numerical examples (Numerical examples 1 to 6) of the respective embodiments of the present invention will be described. In each numerical example, symbol i indicates the order of the surface from the object side. In each numerical example, symbol ri is the radius of curvature of the i-th lens surface in order from the object side. Symbol di is the thickness of the i-th lens or air space in order from the object side. Symbols ndi and vdi are the refractive index and the Abbe number for the d line of the glass of the material of the i-th lens in order from the object side, respectively.

The rotationally-symmetric aspherical shape is represented as conditional expression (7) below, where the X axis is the optical axis direction, the H axis is the direction perpendicular to the optical axis, the positive direction from the object side to the image side is positive, symbol r is the paraxial radius of curvature, symbol K is the conic constant, and symbols A4, A6, A8, A10, and A12 are aspherical coefficients.

$$X = \frac{(1/R)H^2}{1+\sqrt{1-(1+K)(H/R)^2}} + \\ A4 \times H^4 + A6 \times H^6 + A8 + A10 \times H^{10} + A12 \times H^{12}$$ (7)

Symbol BF is a value obtained by converting the distance (back focus) from the final lens surface to the paraxial image surface by air. The total length of the lens is a value obtained by adding BF to the distance from the foremost surface of the lens to the final surface of the lens. For rotationally-symmetric aspherical surfaces, symbol * is added after the surface number. For an aspherical surface including a plurality of concave portions and convex portions formed in the rotation direction with respect to the optical axis, "**" is added after the surface number.

The aspherical surface shape including a plurality of concave portions and convex portions formed in the rotation direction with respect to the optical axis is represented by expression (8) or (9) below. In expression (8) and (9), symbols B4 and B5 are aspherical coefficients, and θ is a rotation angle around the optical axis.

$$X = B4(H^4 \cos 4\theta)$$ (8)

$$X = B5(H^5 \cos 5\theta)$$ (9)

Numerical Example 1

| | UNIT mm | | | | |
|---|---|---|---|---|---|
| | Surface data | | | | |
| Surface number | r | d | nd | vd | effective diameter |
| 1 | ∞ | 2.00 | 1.53160 | 55.8 | 37.00 |
| 2** | ∞ | 1.00 | | | 37.00 |
| 3** | ∞ | 2.00 | 1.53160 | 55.8 | 37.00 |
| 4 | ∞ | 1.00 | | | 37.00 |
| 5 | 32.903 | 0.85 | 1.94595 | 18.0 | 23.11 |
| 6 | 23.697 | 3.39 | 1.80420 | 46.5 | 22.16 |
| 7 | 239.525 | (variable) | | | 21.67 |
| 8 | 104.318 | 0.67 | 1.77250 | 49.6 | 17.70 |
| 9 | 9.356 | 4.75 | | | 13.33 |
| 10* | −18.059 | 0.40 | 1.76802 | 49.2 | 12.53 |
| 11 | 116.691 | 0.10 | | | 12.34 |
| 12 | 30.603 | 1.20 | 1.95906 | 17.5 | 12.27 |
| 13 | 717.339 | (variable) | | | 12.12 |
| 14(stop) | ∞ | (variable) | | | 10.62 |
| 15* | 15.470 | 2.65 | 1.76802 | 49.2 | 12.97 |
| 16* | −45.132 | 0.10 | | | 12.82 |
| 17 | 11.775 | 2.52 | 1.83481 | 42.7 | 11.79 |
| 18 | 230.169 | 0.45 | 1.85478 | 24.8 | 11.01 |
| 19 | 8.338 | (variable) | | | 9.56 |
| 20 | 30.731 | 2.88 | 1.49700 | 81.5 | 11.95 |
| 21 | −17.952 | (variable) | | | 12.20 |
| 22 | −22.355 | 0.40 | 1.85135 | 40.1 | 12.30 |
| 23* | 444.580 | 0.10 | | | 12.75 |
| 24 | 21.426 | 1.94 | 1.63854 | 55.4 | 13.57 |
| 25 | −542.945 | (variable) | | | 13.69 |
| Image plane | ∞ | | | | |

| Aspherical data |
|---|
| Tenth surface |
| K = 0.00000e+000 A 4 = −2.29119e−005 A 6 = 8.28299e−008 A 8 = −1.20260e−008 A10 = 1.04155e−010 |
| Fifteenth surface |
| K = 0.00000e+000 A 4 = −4.42389e−005 A 6 = 1.20948e−007 |

-continued

UNIT mm

Sixteenth surface

K = 0.00000e+000 A 4 = 1.80026e−005 A 6 = 3.00368e−007
A 8 = −3.24113e−009 A10 = 2.62387e−011
Twenty-third surface K = 0.00000e+000 A 4 = 5.63992e−005 A 6 = −4.35159e−008
A 8 = −9.87071e−010 A10 = 8.77351e−012

Various data
Zoom ratio 3.94

|  | Wide-angle | Middle | Telephoto |
| --- | --- | --- | --- |
| Focal length | 9.06 | 16.39 | 35.69 |
| F number | 1.85 | 2.54 | 2.88 |
| Half angle of view | 35.52 | 25.03 | 12.46 |
| Image height | 6.47 | 7.65 | 7.89 |
| Total lens length | 64.97 | 64.94 | 73.77 |
| BF | 8.90 | 13.30 | 12.40 |
| d7 | 0.31 | 4.81 | 15.34 |
| d13 | 12.26 | 3.51 | 0.70 |
| d14 | 5.34 | 4.39 | 0.31 |
| d19 | 8.38 | 7.60 | 6.58 |
| d21 | 1.40 | 2.95 | 10.04 |
| d25 | 8.90 | 13.30 | 12.40 |

Zoom lens unit data

| Unit | Start surface | Focal length |
| --- | --- | --- |
| 1 | 5 | 50.83 |
| 2 | 8 | −10.03 |
| 3 | 15 | 17.24 |
| 4 | 20 | 23.26 |
| 5 | 22 | −115.71 |

Optical system A first to fourth surfaces

Aspherical expression of the second surface $X = B4(H^4 \cos 4\theta)$
Aspherical coefficient of the second surface B4 = 3.4e−6
Aspherical expression of the third surface $X = B4(H^4 \cos 4\theta)$
Aspherical coefficient of the third surface B4 = 3.4e−6

Numerical Example 2

UNIT mm
Surface data

| Surface number | r | d | nd | vd | effective diameter |
| --- | --- | --- | --- | --- | --- |
| 1 | 32.903 | 0.85 | 1.94595 | 18.0 | 23.11 |
| 2 | 23.697 | 3.39 | 1.80420 | 46.5 | 22.16 |
| 3 | 239.525 | (variable) |  |  | 21.67 |
| 4 | 104.318 | 0.67 | 1.77250 | 49.6 | 17.70 |
| 5 | 9.356 | 4.75 |  |  | 13.33 |
| 6* | −18.059 | 0.40 | 1.76802 | 49.2 | 12.53 |
| 7 | 116.691 | 0.10 |  |  | 12.34 |
| 8 | 30.603 | 1.20 | 1.95906 | 17.5 | 12.27 |
| 9 | 717.339 | (variable) |  |  | 12.12 |
| 10(stop) | ∞ | (variable) |  |  | 10.62 |
| 11* | 15.470 | 2.65 | 1.76802 | 49.2 | 12.97 |
| 12* | −45.132 | 0.10 |  |  | 12.82 |
| 13 | 11.775 | 2.52 | 1.83481 | 42.7 | 11.79 |
| 14 | 230.169 | 0.45 | 1.85478 | 24.8 | 11.01 |
| 15 | 8.338 | (variable) |  |  | 9.56 |
| 16 | 30.731 | 2.88 | 1.49700 | 81.5 | 11.95 |
| 17 | −17.952 | (variable) |  |  | 12.20 |
| 18 | −22.355 | 0.40 | 1.85135 | 40.1 | 12.30 |
| 19* | 444.580 | 0.10 |  |  | 12.75 |
| 20 | 21.426 | 1.94 | 1.63854 | 55.4 | 13.57 |
| 21 | −542.945 | (variable) |  |  | 13.69 |
| 22 | ∞ | 1.00 | 1.51633 | 64.1 | 16.00 |
| 23** | ∞ | 0.80 |  |  | 16.00 |
| 24** | ∞ | 1.00 | 1.51633 | 64.1 | 16.00 |
| 25 | ∞ | 4.78 |  |  | 16.00 |
| Image plane | ∞ |  |  |  |  |

Aspherical data

Sixth surface

K = 0.00000e+000 A 4 = −2.29119e−005 A 6 = 8.28299e−008
A 8 = −1.20260e−008 A10 = 1.04155e−010
Eleventh surface K = 0.00000e+000 A 4 = −4.42389e−005 A 6 = 1.20948e−007
Twelfth surface K = 0.00000e+000 A 4 = 1.80026e−005 A 6 = 3.00368e−007
A 8 = −3.24113e−009 A10 = 2.62387e−011
Nineteenth surface K = 0.00000e+000 A 4 = 5.63992e−005 A 6 = −4.35159e−008
A 8 = −9.87071e−010 A10 = 8.77351e−012

Various data
Zoom ratio 3.94

|  | Wide-angle | Middle | Telephoto |
| --- | --- | --- | --- |
| Focal length | 9.06 | 16.39 | 35.69 |
| F number | 1.85 | 2.54 | 2.88 |
| Half angle of view | 35.52 | 25.03 | 12.46 |
| Image height | 6.47 | 7.65 | 7.89 |
| Total lens length | 59.65 | 59.63 | 68.45 |
| BF | 4.78 | 4.78 | 4.78 |
| d 3 | 0.31 | 4.81 | 15.34 |
| d 9 | 12.26 | 3.51 | 0.70 |
| d10 | 5.34 | 4.39 | 0.31 |
| d15 | 8.38 | 7.60 | 6.58 |
| d17 | 1.40 | 2.95 | 10.04 |
| d21 | 2.00 | 6.40 | 5.50 |

Zoom lens unit data

| Unit | Start surface | Focal length |
| --- | --- | --- |
| 1 | 1 | 50.83 |
| 2 | 4 | −10.03 |
| 3 | 11 | 17.24 |
| 4 | 16 | 23.26 |
| 5 | 18 | −115.71 |

Optical system A twenty-second to twenty-fifth surfaces

Aspherical expression of the twenty-third surface $X = B4(H^4 \cos 4\theta)$
Aspherical coefficient of the twenty-third surface B4 = 6.1e−5
Aspherical expression of the twenty-fourth surface $X = B4(H^4 \cos 4\theta)$
Aspherical coefficient of the twenty-fourth surface B4 = 6.1e−5

Numerical Example 3

UNIT mm

Surface data

| Surface number | r | d | nd | vd | effective diameter |
|---|---|---|---|---|---|
| 1 | 32.903 | 0.85 | 1.94595 | 18.0 | 23.11 |
| 2 | 23.697 | 3.39 | 1.80420 | 46.5 | 22.16 |
| 3 | 239.525 | (variable) | | | 21.67 |
| 4 | 104.318 | 0.67 | 1.77250 | 49.6 | 17.70 |
| 5 | 9.356 | 4.75 | | | 13.33 |
| 6* | −18.059 | 0.40 | 1.76802 | 49.2 | 12.53 |
| 7 | 116.691 | 0.10 | | | 12.34 |
| 8 | 30.603 | 1.20 | 1.95906 | 17.5 | 12.27 |
| 9 | 717.339 | (variable) | | | 12.12 |
| 10(stop) | ∞ | 1.00 | | | 10.62 |
| 11 | ∞ | 1.00 | 1.51633 | 64.1 | 13.00 |
| 12** | ∞ | 0.30 | | | 13.00 |
| 13** | ∞ | 1.00 | 1.51633 | 64.1 | 13.00 |
| 14 | ∞ | (variable) | | | 13.00 |
| 15* | 15.470 | 2.65 | 1.76802 | 49.2 | 12.97 |
| 16* | −45.132 | 0.10 | | | 12.82 |
| 17 | 11.775 | 2.52 | 1.83481 | 42.7 | 11.79 |
| 18 | 230.169 | 0.45 | 1.85478 | 24.8 | 11.01 |
| 19 | 8.338 | (variable) | | | 9.56 |
| 20 | 30.731 | 2.88 | 1.49700 | 81.5 | 11.95 |
| 21 | −17.952 | (variable) | | | 12.20 |
| 22 | −22.355 | 0.40 | 1.85135 | 40.1 | 12.30 |
| 23* | 444.580 | 0.10 | | | 12.75 |
| 24 | 21.426 | 1.94 | 1.63854 | 55.4 | 13.57 |
| 25 | 542.945 | (variable) | | | 13.69 |
| Image plane | ∞ | | | | |

Aspherical data

Sixth surface $K = 0.00000e+000$ $A\,4 = -2.29119e-005$ $A\,6 = 8.28299e-008$
$A\,8 = -1.20260e-008$ $A10 = 1.04155e-010$ Fifteenth surface $K = 0.00000e+000$ $A\,4 = -4.42389e-005$ $A\,6 = 1.20948e-007$ Sixteenth surface $K = 0.00000e+000$ $A\,4 = 1.80026e-005$ $A\,6 = 3.00368e-007$
$A\,8 = -3.24113e-009$ $A10 = 2.62387e-011$ Twenty-third surface $K = 0.00000e+000$ $A\,4 = 5.63992e-005$ $A\,6 = -4.35159e-008$
$A\,8 = -9.87071e-010$ $A10 = 8.77351e-012$

Various data
Zoom ratio 2.74

| | Wide-angle | Middle | Telephoto |
|---|---|---|---|
| Focal length | 9.07 | 16.39 | 24.85 |
| F number | 1.85 | 2.54 | 2.88 |
| Half angle of view | 35.50 | 25.03 | 17.62 |
| Image height | 6.47 | 7.65 | 7.89 |
| Total lens length | 59.64 | 59.61 | 64.62 |
| BF | 8.91 | 13.31 | 14.64 |
| d 3 | 0.31 | 4.79 | 10.55 |
| d 9 | 12.26 | 3.52 | 0.99 |
| d14 | 2.70 | 1.75 | 0.43 |
| d19 | 8.38 | 7.60 | 7.20 |
| d21 | 1.40 | 2.95 | 5.12 |
| d25 | 8.91 | 13.31 | 14.64 |

Zoom lens unit data

| Unit | Start surface | Focal length |
|---|---|---|
| 1 | 1 | 50.83 |
| 2 | 4 | −10.03 |
| 3 | 15 | 17.24 |
| 4 | 20 | 23.26 |
| 5 | 22 | −115.71 |

Optical system A eleventh to fourteenth surfaces

Aspherical expression of the twelfth surface $X = B4(H^4\cos 4\theta)$
Aspherical coefficient of the twelfth surface $B4 = 1.7e-5$
Aspherical expression of the thirteenth surface $X = B4(H^4\cos 4\theta)$
Aspherical coefficient of the thirteenth surface $B4 = 1.7e-5$

Numerical Example 4

UNIT mm

Surface data

| Surface number | r | d | nd | vd | effective diameter |
|---|---|---|---|---|---|
| 1 | ∞ | 3.00 | 1.53160 | 55.8 | 60.00 |
| 2** | ∞ | 2.80 | | | 60.00 |
| 3** | ∞ | 3.00 | 1.53160 | 55.8 | 51.00 |
| 4 | ∞ | 3.50 | | | 51.00 |
| 5 | 74.240 | 1.10 | 1.77250 | 49.6 | 28.00 |
| 6 | 13.575 | 5.43 | | | 22.11 |
| 7* | 90.868 | 2.11 | 1.52996 | 55.8 | 22.09 |
| 8* | 28.303 | 0.20 | | | 21.76 |
| 9 | 25.310 | 3.76 | 1.84666 | 23.9 | 21.69 |
| 10 | 56.582 | (variable) | | | 20.66 |
| 11 | 806.621 | 1.76 | 1.48749 | 70.2 | 10.17 |
| 12 | −29.802 | 0.80 | | | 10.31 |
| 13 | 10.514 | 3.32 | 1.60311 | 60.6 | 10.30 |
| 14 | −147.363 | 0.50 | 1.90366 | 31.3 | 9.53 |
| 15 | 23.292 | 2.69 | | | 9.18 |
| 16(stop) | ∞ | 2.02 | | | 8.73 |
| 17* | 14.472 | 1.88 | 1.58313 | 59.4 | 8.33 |
| 18 | 354.379 | (variable) | | | 7.95 |
| 19 | 41.527 | 0.62 | 1.70000 | 48.1 | 7.79 |
| 20 | 8.797 | 1.29 | 1.53775 | 74.7 | 7.96 |
| 21 | 13.459 | (variable) | | | 8.20 |
| 22* | −11.998 | 1.86 | 1.52996 | 55.8 | 11.48 |
| 23* | −16.160 | (variable) | | | 13.52 |
| 24 | −58.903 | 3.84 | 1.58913 | 61.1 | 23.74 |
| 25 | −22.779 | 11.05 | | | 24.57 |
| Image plane | ∞ | | | | |

Aspherical data

Seventh surface $K = 0.00000e+000$ $A\,4 = -3.78582e-005$ $A\,6 = 5.37905e-007$
$A\,8 = -5.04609e-009$ $A10 = 2.55009e-011$ $A12 = -5.86232e-014$ Eighth surface $K = 0.00000e+000$ $A\,4 = -6.09920e-005$ $A\,6 = 4.97325e-007$
$A\,8 = -6.17039e-009$ $A10 = 3.51824e-011$ $A12 = -1.05215e-013$ Seventeenth surface $K = 0.00000e+000$ $A\,4 = -1.05211e-004$ $A\,6 = -7.51239e-007$
$A\,8 = -1.59107e-008$ Twenty-second surface $K = 0.00000e+000$ $A\,4 = -4.49801e-004$ $A\,6 = 9.96347e-006$
$A\,8 = -3.67378e-007$ $A10 = 4.59367e-009$ $A12 = 3.77288e-011$ -continued UNIT mm Twenty-third surface K = 0.00000e+000 A 4 = −2.25814e−004 A 6 = 5.01006e−006
A 8 = −9.37488e−008 A10 = 1.00770e−009 A12 = 4.04325e−012

Various data
Zoom ratio 2.83

|  | Wide-angle | Middle | Telephoto |
|---|---|---|---|
| Focal length | 15.45 | 27.69 | 43.66 |
| F number | 3.55 | 4.74 | 6.44 |
| Half angle of view | 41.48 | 26.26 | 17.37 |
| Image height | 13.66 | 13.66 | 13.66 |
| Total lens length | 90.41 | 83.09 | 88.74 |
| BF | 11.05 | 11.05 | 11.05 |
| d10 | 24.71 | 8.18 | 1.12 |
| d18 | 1.00 | 2.45 | 3.36 |
| d21 | 6.45 | 4.99 | 4.09 |
| d23 | 1.73 | 10.94 | 23.65 |

Zoom lens unit data

| Unit | Start surface | Focal length |
|---|---|---|
| 1 | 5 | −25.29 |
| 2 | 11 | 15.51 |
| 3 | 19 | −24.25 |
| 4 | 22 | −104.00 |
| 5 | 24 | 60.66 |

Optical system A first to fourth surfaces

Aspherical expression of the second surface $X = B4(H^4 \cos 4\theta)$
Aspherical coefficient of the second surface B4 = 1.7e−6
Aspherical expression of the third surface $X = B4(H^4 \cos 4\theta)$
Aspherical expression of the third surface B4 = 2.1e−6

Numerical Example 5

UNIT mm

Surface data

| Surface number | r | d | nd | vd | effective diameter |
|---|---|---|---|---|---|
| 1 | 1000.000 | 3.00 | 1.53160 | 55.8 | 60.00 |
| 2** | ∞ | 2.70 |  |  | 60.00 |
| 3 | −775.000 | 3.00 | 1.53160 | 55.8 | 53.00 |
| 4** | ∞ | 4.50 |  |  | 53.00 |
| 5 | 74.240 | 1.10 | 1.77250 | 49.6 | 28.00 |
| 6 | 13.575 | 5.43 |  |  | 22.11 |
| 7* | 90.868 | 2.11 | 1.52996 | 55.8 | 22.09 |
| 8* | 28.303 | 0.20 |  |  | 21.76 |
| 9 | 25.310 | 3.76 | 1.84666 | 23.9 | 21.69 |
| 10 | 56.582 | (variable) |  |  | 20.66 |
| 11 | 806.621 | 1.76 | 1.48749 | 70.2 | 10.17 |
| 12 | −29.802 | 0.80 |  |  | 10.31 |
| 13 | 10.514 | 3.32 | 1.60311 | 60.6 | 10.30 |
| 14 | −147.363 | 0.50 | 1.90366 | 31.3 | 9.53 |
| 15 | 23.292 | 2.69 |  |  | 9.18 |
| 16(stop) | ∞ | 2.02 |  |  | 8.73 |
| 17* | 14.472 | 1.88 | 1.58313 | 59.4 | 8.33 |
| 18 | 354.379 | (variable) |  |  | 7.95 |
| 19 | 41.527 | 0.62 | 1.70000 | 48.1 | 7.79 |
| 20 | 8.797 | 1.29 | 1.53775 | 74.7 | 7.96 |
| 21 | 13.459 | (variable) |  |  | 8.20 |
| 22* | −11.998 | 1.86 | 1.52996 | 55.8 | 11.48 |
| 23* | −16.160 | (variable) |  |  | 13.52 |
| 24 | −58.903 | 3.84 | 1.58913 | 61.1 | 23.74 |
| 25 | −22.779 | 11.08 |  |  | 24.57 |
| Image plane | ∞ |  |  |  |  |

Aspherical data

Seventh surface

K = 0.00000e+000 A 4 = −3.78582e−005 A 6 = 5.37905e−007
A 8 = −5.04609e−009 A10 = 2.55009e−011 A12 = −5.86232e−014
Eighth surface K = 0.00000e+000 A 4 = −6.09920e−005 A 6 = 4.97325e−007
A 8 = −6.17039e−009 A10 = 3.51824e−011 A12 = −1.05215e−013
Seventeenth surface K = 0.00000e+000 A 4 = −1.05211e−004 A 6 = −7.51239e−007
A 8 = −1.59107e−008
Twenty-second surface K = 0.00000e+000 A 4 = −4.49801e−004 A 6 = 9.96347e−006
A 8 = −3.67378e−007 A10 = 4.59367e−009 A12 = 3.77288e−011
Twenty-third surface K = 0.00000e+000 A 4 = −2.25814e−004 A 6 = 5.01006e−006
A 8 = −9.37488e−008 A10 = 1.00770e−009 A12 = 4.04325e−012

Various data
Zoom ratio 2.82

|  | Wide-angle | Middle | Telephoto |
|---|---|---|---|
| Focal length | 15.45 | 27.65 | 43.58 |
| F number | 3.55 | 4.74 | 6.44 |
| Half angle of view | 41.48 | 26.29 | 17.41 |
| Image height | 13.66 | 13.66 | 13.66 |
| Total lens length | 91.34 | 84.10 | 89.77 |
| BF | 11.08 | 11.08 | 11.08 |
| d10 | 24.71 | 8.25 | 1.21 |
| d18 | 1.00 | 2.45 | 3.36 |
| d21 | 6.45 | 4.99 | 4.09 |
| d23 | 1.73 | 10.94 | 23.65 |

Zoom lens unit data

| Unit | Start surface | Focal length |
|---|---|---|
| 1 | 5 | −25.29 |
| 2 | 11 | 15.51 |
| 3 | 19 | −24.25 |
| 4 | 22 | −104.00 |
| 5 | 24 | 60.66 |

Optical system A first to fourth surfaces

Aspherical expression of the second surface $X = B4(H^4 \cos 4\theta)$
Aspherical coefficient of the second surface B4 = 1.7e−6
Aspherical expression of the fourth surface $X = B4(H^4 \cos 4\theta)$
Aspherical coefficient of the fourth surface B4 = −2.0e−6

Numerical Example 6

UNIT mm
Surface data

| Surface number | r | d | nd | vd | effective diameter |
|---|---|---|---|---|---|
| 1 | ∞ | 3.00 | 1.53160 | 55.8 | 60.00 |
| 2** | ∞ | 3.20 | | | 60.00 |
| 3** | ∞ | 3.00 | 1.53160 | 55.8 | 51.00 |
| 4 | ∞ | 3.50 | | | 51.00 |
| 5 | 74.240 | 1.10 | 1.77250 | 49.6 | 28.00 |
| 6 | 13.575 | 5.43 | | | 22.11 |
| 7* | 90.868 | 2.11 | 1.52996 | 55.8 | 22.09 |
| 8* | 28.303 | 0.20 | | | 21.76 |
| 9 | 25.310 | 3.76 | 1.84666 | 23.9 | 21.69 |
| 10 | 56.582 | (variable) | | | 20.66 |
| 11 | 806.621 | 1.76 | 1.48749 | 70.2 | 10.17 |
| 12 | −29.802 | 0.80 | | | 10.31 |
| 13 | 10.514 | 3.32 | 1.60311 | 60.6 | 10.30 |
| 14 | −147.363 | 0.50 | 1.90366 | 31.3 | 9.53 |
| 15 | 23.292 | 2.69 | | | 9.18 |
| 16(stop) | ∞ | 2.02 | | | 8.73 |
| 17* | 14.472 | 1.88 | 1.58313 | 59.4 | 8.33 |
| 18 | 354.379 | (variable) | | | 7.95 |
| 19 | 41.527 | 0.62 | 1.70000 | 48.1 | 7.79 |
| 20 | 8.797 | 1.29 | 1.53775 | 74.7 | 7.96 |
| 21 | 13.459 | (variable) | | | 8.20 |
| 22* | −11.998 | 1.86 | 1.52996 | 55.8 | 11.48 |
| 23* | −16.160 | (variable) | | | 13.52 |
| 24 | −58.903 | 3.84 | 1.58913 | 61.1 | 23.74 |
| 25 | −22.779 | 11.05 | | | 24.57 |
| Image plane | ∞ | | | | |

Aspherical data

Seventh surface $K = 0.00000e+000$ $A 4 = -3.78582e-005$ $A 6 = 5.37905e-007$
$A 8 = -5.04609e-009$ $A10 = 2.55009e-011$ $A12 = -5.86232e-014$ Eighth surface $K = 0.00000e+000$ $A 4 = -6.09920e-005$ $A 6 = 4.97325e-007$
$A 8 = -6.17039e-009$ $A10 = 3.51824e-011$ $A12 = -1.05215e-013$ Seventeenth surface $K = 0.00000e+000$ $A 4 = -1.05211e-004$ $A 6 = -7.51239e-007$
$A 8 = -1.59107e-008$ Twenty-second surface $K = 0.00000e+000$ $A 4 = -4.49801e-004$ $A 6 = 9.96347e-006$
$A 8 = -3.67378e-007$ $A10 = 4.59367e-009$ $A12 = 3.77288e-011$ Twenty-third surface $K = 0.00000e+000$ $A 4 = -2.25814e-004$ $A 6 = 5.01006e-006$
$A 8 = -9.37488e-008$ $A10 = 1.00770e-009$ $A12 = 4.04325e-012$

Various data
Zoom ratio 2.83

| | Wide-angle | Middle | Telephoto |
|---|---|---|---|
| Focal length | 15.45 | 27.69 | 43.66 |
| F number | 3.55 | 4.74 | 6.44 |
| Half angle of view | 41.48 | 26.26 | 17.37 |
| Image height | 13.66 | 13.66 | 13.66 |
| Total lens length | 90.81 | 83.49 | 89.14 |
| BF | 11.05 | 11.05 | 11.05 |
| d10 | 24.71 | 8.18 | 1.12 |
| d18 | 1.00 | 2.45 | 3.36 |
| d21 | 6.45 | 4.99 | 4.09 |
| d23 | 1.73 | 10.94 | 23.65 |

Zoom lens unit data

| Unit | Start surface | Focal length |
|---|---|---|
| 1 | 5 | −25.29 |
| 2 | 11 | 15.51 |
| 3 | 19 | −24.25 |
| 4 | 22 | −104.00 |
| 5 | 24 | 60.66 |

Optical system A first to fourth surfaces

Aspherical expression of the second surface $X = B5(H^5 \cos 5\theta)$
Aspherical coefficient of the second surface $B5 = 5.0e-8$
Aspherical expression of the third surface $X = B5(H^5 \cos 5\theta)$
Aspherical coefficient of the third surface $B5 = 9.0e-8$ Table 1 represents specific numerical values of conditional expressions (1) to (6) related to Embodiments 1 to 6 (Numerical examples 1 to 6).

TABLE 1

| | | CONDITIONAL EXPRESSION | | | | | |
|---|---|---|---|---|---|---|---|
| | | (1X) | (1Y) | (2X) | (2Y) | (3X) | (3Y) |
| EMBODIMENT | 1 | 4 | 4 | 0.080 | 0.080 | 0.159 | 0.159 |
| | 2 | 4 | 4 | 0.089 | 0.089 | 0.178 | 0.178 |
| | 3 | 4 | 4 | 0.013 | 0.013 | 0.026 | 0.026 |
| | 4 | 4 | 4 | 0.156 | 0.101 | 0.313 | 0.202 |
| | 5 | 4 | 4 | 0.158 | 0.113 | 0.317 | 0.227 |
| | 6 | 5 | 5 | 0.132 | 0.105 | 0.264 | 0.211 |

| | | CONDITIONAL EXPRESSION | | |
|---|---|---|---|---|
| | | (4) | (5) | (6) |
| EMBODIMENT | 1 | 0.200 | 0.000 | 1.00 (0.0 < h ≤ 18.5) |
| | 2 | 0.286 | 0.000 | 1.00 (0.0 < h ≤ 8.0) |
| | 3 | 0.130 | 0.000 | 1.00 (0.0 < h ≤ 6.5) |
| | 4 | 0.318 | 0.000 | 1.24 (0.0 < h ≤ 25.5) |
| | 5 | 0.655 | 0.000 | 1.18 (0.0 < h ≤ 26.5) |
| | 6 | 0.348 | 0.000 | 1.80 (0.0 < h ≤ 25.5) |

Figure 33:
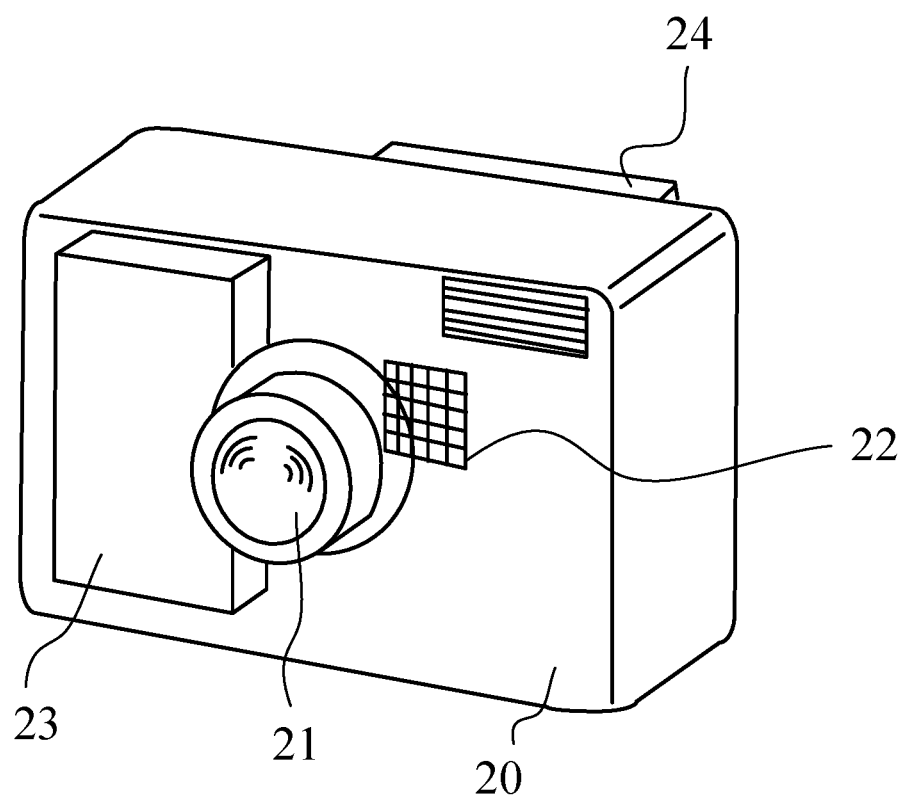
FIG. 33 is a schematic diagram of the image capturing apparatus in each embodiment.

Next, referring to FIG. 33, an embodiment of a digital camera (image capturing apparatus) using the image capturing optical system in each embodiment will be described. FIG. 33 is a schematic diagram of the image capturing apparatus.

In FIG. 33, reference numeral 20 denotes a digital camera body, reference numeral 21 denotes an image capturing optical system of each embodiment, reference numeral 22 denotes an image sensor (photoelectric conversion element, or image pickup device) such as a CCD sensor and a CMOS sensor that is included in the digital camera body 20 and that receives an optical image (object image) formed via the image capturing optical system 21. Reference numeral 23 denotes a storage unit (memory) that records information corresponding to the object image photoelectrically converted by the image sensor 22, and reference numeral 24 denotes a display device (viewfinder) that includes a liquid crystal display panel or the like and that is used for observing the object image formed on the image sensor 22.

According to each embodiment, the attachment optical system, the image capturing optical system, and the image capturing apparatus which are capable of performing continuous control from the resolution state to the blurred state with respect to the background while maintaining the resolution state of the object with a compact and simple configuration can be provided. Furthermore, according to each embodiment, it is possible to achieve the optical system and the image capturing apparatus having such functions with a compact and simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-128332, filed on Jun. 29, 2016, and No. 2017-109596, filed on Jun. 2, 2017, which are hereby incorporated by reference herein in their entirety.

What is claimed is:

1. An attachment optical system detachably attached to an image capturing optical system, the attachment optical system comprising:
   a first lens provided with a first aspherical surface, the first aspherical surface including a plurality of concave portions and a plurality of convex portions that are formed in a rotation direction with respect to an optical axis of the attachment optical system; and
   a second lens provided with a second aspherical surface, the second aspherical surface including a plurality of concave portions and a plurality of convex portions that are formed in the rotation direction,
   wherein, by relatively rotating the first lens and the second lens around the optical axis, a distance between the first aspherical surface and the second aspherical surface in a direction of the optical axis changes while a combined focal length of the first and the second lenses is unchanged.

2. The attachment optical system according to claim 1, wherein the first lens and the second lens are disposed so that the first aspherical surface and the second aspherical surface are opposed to each other.

3. The attachment optical system according to claim 1, wherein a field curvature of the image capturing optical system changes by relatively rotating the first lens and the second lens around the optical axis.

4. The attachment optical system according to claim 1, wherein a distance between the first aspherical surface and the second aspherical surface in a first region in the direction of the optical axis does not change and a distance between the first aspherical surface and the second aspherical surface in a second region different from the first region in the direction of the optical axis changes by relatively rotating the first lens and the second lens around the optical axis.

5. The attachment optical system according to claim 4, wherein the first region is a region including the optical axis, and the second region is a region farther from the optical axis than the first region.

6. The attachment optical system according to claim 5, wherein each of the first aspherical surface and the second aspherical surface in the first region has a planer shape or a spherical shape.

7. The attachment optical system according to claim 1, a center region of each of the first aspherical surface and the second aspherical surface is perpendicular to the optical axis.

8. The attachment optical system according to claim 1, wherein the first aspherical surface and the second aspherical surface have identical shapes to each other at a predetermined phase obtained by rotation around the optical axis.

9. The attachment optical system according to claim 1, wherein the first lens and the second lens are integrally movable in a perpendicular direction with respect to the optical axis.

10. The attachment optical system according to claim 1, wherein the plurality of convex portions and the plurality of concave portions in each of the first aspherical surface and the second aspherical surface are repeatedly arrayed with a predetermined distance along the rotation direction.

11. The attachment optical system according to claim 10, wherein an expression below is satisfied:

$$0.010 < |\Delta K1/DA| < 1.000,$$

where $\Delta K1$ is a maximum value of a difference of heights of the convex portion and the concave portion at the same diameter position of the first aspherical surface, and DA is a distance on the optical axis between a lens surface at an object side of the first lens and a lens surface at an image side of the second lens.

12. The attachment optical system according to claim 10, wherein an expression below is satisfied:

$$0.010 < |\Delta K2/DA| < 1.000,$$

where $\Delta K2$ is a maximum value of a difference of heights of the convex portion and the concave portion at the same diameter position of the second aspherical surface, and DA is a distance on the optical axis between a lens surface at an object side of the first lens and a lens surface at an image side of the second lens.

13. The attachment optical system according to claim 10, wherein an expression below is satisfied:

$$3 \le K1 \le 10,$$

where K1 is the number of units of the first aspherical surface, wherein each of the units is a combination of the convex portion and the concave portion.

14. The attachment optical system according to claim 10, wherein an expression below is satisfied:

$$3 \le K2 \le 10,$$

where K2 is the number of units of the second aspherical surface, wherein each of the units is a combination of the convex portion and the concave portion.

15. The attachment optical system according to claim 1, wherein an expression below is satisfied:

$$0.005 < |\Delta H1/DA| < 0.500,$$

where $\Delta H1$ is a maximum value of a sag amount of the first aspherical surface, and DA is a distance on the optical axis between a lens surface at an object side of the first lens and a lens surface at an image side of the second lens.

16. The attachment optical system according to claim 1, wherein an expression below is satisfied:

$$0.005 < |\Delta H2/DA| < 0.500,$$

where $\Delta H2$ is a maximum value of a sag amount of the second aspherical surface, and DA is a distance on the optical axis between a lens surface at an object side of the first lens and a lens surface at an image side of the second lens.

17. The attachment optical system according to claim 1, wherein an expression below is satisfied:

$$0.020 < |D/DA| < 1.000,$$

where D is a distance on the optical axis between the first aspherical surface and the second aspherical surface, and DA is a distance in the optical axis between a lens surface at an object side of the first lens and a lens surface at an image side of the second lens.

18. The attachment optical system according to claim 1, wherein an expression below is satisfied:

$$|DA/fA|<0.020,$$

where DA is a distance on the optical axis between a lens surface at an object side of the first lens and a lens surface at an image side of the second lens, and fA is a combined focal length of the first lens and the second lens.

19. The attachment optical system according to claim 1, wherein an expression below is satisfied:

$$0.8<|K2h|/|K1h|<3.0,$$

where K1h is a maximum aspherical amount of the first aspherical surface at a height h in a radial direction from the optical axis, and K2h is a maximum aspherical amount of the second aspherical surface at the height h.

20. An image capturing optical system comprising:
a first lens provided with a first aspherical surface, the first aspherical surface including a plurality of concave portions and a plurality of convex portions that are formed in a rotation direction with respect to an optical axis of the image capturing optical system; and
a second lens provided with a second aspherical surface, the second aspherical surface including a plurality of concave portions and a plurality of convex portions that are formed in the rotation direction,
wherein, by relatively rotating the first lens and the second lens around the optical axis, a distance between the first aspherical surface and the second aspherical surface in a direction of the optical axis changes while a combined focal length of the first and the second lenses is unchanged.

21. The image capturing optical system according to claim 20, wherein the first lens and the second lens are disposed so that the first aspherical surface and the second aspherical surface are opposed to each other.

22. The image capturing optical system according to claim 20, wherein one of the first lens and the second lens is disposed closest to an object side of the image capturing optical system.

23. The image capturing optical system according to claim 20, wherein one of the first lens and the second lens is disposed closest to an image plane side of the image capturing optical system.

24. The image capturing optical system according to claim 20, further comprising an aperture stop,
wherein one of the first lens and the second lens is disposed adjacent to the aperture stop.

25. The image capturing optical system according to claim 20, further comprising a focus unit configured to move in the direction of the optical axis in focusing.

26. An image capturing apparatus comprising:
an image capturing optical system; and
an image pickup device configured to receive an optical image formed via the image capturing optical system,
wherein the image capturing optical system includes:
a first lens provided with a first aspherical surface, the first aspherical surface including a plurality of concave portions and a plurality of convex portions that are formed in a rotation direction with respect to an optical axis of the image capturing optical system; and
a second lens provided with a second aspherical surface, the second aspherical surface including a plurality of concave portions and a plurality of convex portions that are formed in the rotation direction,
wherein, by relatively rotating the first lens and the second lens around the optical axis, a distance between the first aspherical surface and the second aspherical surface in a direction of the optical axis changes while a combined focal length of the first and the second lenses is unchanged.

* * * * *